(12) United States Patent
Gao

(10) Patent No.: US 12,200,710 B2
(45) Date of Patent: Jan. 14, 2025

(54) RESOURCE DETERMINATION METHOD AND APPARATUS

(71) Applicant: DATANG MOBILE COMMUNICATIONS EQUIPMENT CO., LTD., Beijing (CN)

(72) Inventor: Xuejuan Gao, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 312 days.

(21) Appl. No.: 17/762,077

(22) PCT Filed: Aug. 11, 2020

(86) PCT No.: PCT/CN2020/108500
§ 371 (c)(1),
(2) Date: Mar. 20, 2022

(87) PCT Pub. No.: WO2021/052064
PCT Pub. Date: Mar. 25, 2021

(65) Prior Publication Data
US 2022/0386300 A1    Dec. 1, 2022

(30) Foreign Application Priority Data

Sep. 20, 2019   (CN) .......................... 201910894530.8

(51) Int. Cl.
*H04J 3/00*   (2006.01)
*H04L 5/00*   (2006.01)
(Continued)

(52) U.S. Cl.
CPC ........... *H04W 72/21* (2023.01); *H04L 5/0053* (2013.01); *H04W 72/0446* (2013.01)

(58) Field of Classification Search
CPC . H04W 72/21; H04W 72/0446; H04W 72/23; H04L 5/0053; H04L 5/0094; H04L 5/0078
(Continued)

(56) References Cited

U.S. PATENT DOCUMENTS

2019/0140785 A1   5/2019 Li et al.
2020/0221445 A1*  7/2020 Tsai ...................... H04L 1/0026
(Continued)

FOREIGN PATENT DOCUMENTS

CN   105430750 A   3/2016
CN   109152029 A   1/2019
(Continued)

OTHER PUBLICATIONS

Vivo, "UCI enhancements for URLLC", 3GPP TSG RAN WG1 #97, Reno, USA, May 13-17, 2019, total 11 pages, R1-1906147.
(Continued)

*Primary Examiner* — Chuong T Ho
(74) *Attorney, Agent, or Firm* — Kilpatrick Townsend & Stockton LLP

(57) ABSTRACT

Disclosed are a resource determination method and apparatus for flexible acquisition of a PUCCH resource by a terminal at each sub-slot or each TRP. At a terminal side, a resource determination method provided in the present disclosure includes receiving configuration signaling, and acquiring at least one physical uplink control channel (PUCCH) resource set on the basis of the configuration signaling, determining a target PUCCH resource set; and according to a PUCCH resource indication domain and the serial number of a target corresponding to the PUCCH, determining a PUCCH resource from the target PUCCH resource set, and the target includes a sub-slot where
(Continued)

Receive configuration signaling, and obtain at least one PUCCH resource set according to the configuration signaling — S101

Determine a target PUCCH resource set in the at least one PUCCH resource set, and determine a PUCCH resource from the target PUCCH resource set according to an index of a target corresponding to a PUCCH and a PUCCH resource indicator, wherein the target comprises a sub-slot in which PUCCH transmission is performed and/or a TRP corresponding to the PUCCH — S102

PUCCH transmission is located and/or a transmission receiving point (TRP) corresponding to the PUCCH.

17 Claims, 2 Drawing Sheets

(51) Int. Cl.
  *H04W 72/0446* (2023.01)
  *H04W 72/21* (2023.01)

(58) Field of Classification Search
  USPC .......................................................... 370/336
  See application file for complete search history.

(56) References Cited

U.S. PATENT DOCUMENTS

| | | | |
|---|---|---|---|
| 2020/0260433 A1* | 8/2020 | Tang | H04W 72/56 |
| 2020/0304267 A1* | 9/2020 | Lin | H04L 5/0055 |
| 2021/0136749 A1* | 5/2021 | Matsumura | H04W 72/02 |
| 2021/0160909 A1* | 5/2021 | Matsumura | H04L 5/0053 |
| 2021/0204276 A1* | 7/2021 | Ge | H04W 72/23 |
| 2021/0258965 A1* | 8/2021 | Shen | H04W 72/0446 |
| 2021/0266946 A1* | 8/2021 | Li | H04L 1/1854 |
| 2022/0030443 A1* | 1/2022 | Chen | H04W 72/21 |
| 2022/0045729 A1* | 2/2022 | Li | H04L 5/00 |
| 2022/0256463 A1* | 8/2022 | Mu | H04W 52/0219 |

FOREIGN PATENT DOCUMENTS

| | | |
|---|---|---|
| CN | 110034903 A | 7/2019 |
| CN | 110535608 A | 12/2019 |
| CN | 111416691 A | 7/2020 |
| EP | 3681072 A1 | 7/2020 |

OTHER PUBLICATIONS

Vivo, "Further discussion on Multi-TRP/Panel transmission", 3GPP TSG RAN WG1 #97, Reno, USA, May 13-17, 2019, total 18 pages, R1-1906159.

Vivo, "UCI enhancements for URLLC", 3GPP TSG RAN WG1 Ad-Hoc Meeting 1901, Taipei, Jan. 21-25, 2019, total 6 pages, R1-1900127.

Samsung, "UL Control for URLLC", 3GPP TSG RAN WG1 #98, Prague, Czech Republic, Aug. 26-30, 2019, total 6 pages, R1-1908491.

* cited by examiner

RESOURCE DETERMINATION METHOD AND APPARATUS

CROSS-REFERENCE TO RELATED APPLICATIONS

The present disclosure is a National Stage of International Application No. PCT/CN2020/108500, filed on Aug. 11, 2020, which claims priority to the Chinese Patent Application No. 201910894530.8, filed to China National Intellectual Property Administration on Sep. 20, 2019, the entire contents of which are incorporated herein by reference.

FIELD

The present disclosure relates to the field of communication, in particular to a resource determination method and apparatus.

BACKGROUND

In a fifth-generation (5G) new radio (NR) system, in a release-15 (Rel-15) stage, only one physical uplink control channel (PUCCH) carrying hybrid automatic repeat request acknowledge (HARQ-ACK) is supported to be transmitted in one slot. High-layer signaling configures 1 to 4 PUCCH resource sets, different PUCCH resource sets correspond to different quantities of transmission bits, and each PUCCH resource set includes multiple PUCCH resources. A first PUCCH resource set is configured to carry no more than 2 bits of uplink control information (UCI) transmission, a second PUCCH resource set is configured to carry 3 to N1 bits of UCI transmission, a third PUCCH resource set is configured to carry N1+1 to N2 bits of UCI transmission, a fourth PUCCH resource set is configured to carry N2+1 to 1706 bits of UCI transmission, and N1 and N2 are configured by the high-layer signaling. If no more than 2 sets are configured, N1 does not need to be configured. When 2 sets are configured, N1 is fixed at 1706. If no more than 3 sets are configured, N2 does not need to be configured. When 3 sets are configured, N2 is fixed at 1706. The first PUCCH resource set may include at most 32 PUCCH resources, and the remaining PUCCH resource sets may include at most 8 PUCCH resources.

In the Rel-15 stage, when HARQ-ACK is transmitted on the PUCCH, a PUCCH resource set is selected first according to the quantity of bits of HARQ-ACK transmitted; then in the selected PUCCH resource set, one of the PUCCH resources is determined according to a PUCCH resource indicator (PRI) in a physical downlink control channel (PDCCH) corresponding to a physical downlink shared channel (PDSCH) needing to transmit HARQ-ACK on the PUCCH or semi-persistent scheduling (SPS) PDSCH release, and HARQ-ACK is transmitted on the determined PUCCH resource. If there is other UCI, for example, scheduling request (SR) and/or channel state information (CSI) and HARQ-ACK are transmitted at the same time, in the above process, the quantity of bits of the UCI of the PUCCH resource set is determined as a total quantity of bits of all multiplexed and transmitted UCI. Since there is only one PUCCH carrying the HARQ-ACK in one slot, the above PUCCH resource configuration and indication are performed for one slot, that is, the determined PUCCH resource may be in any one or more symbols in the slot in which PUCCH transmission is performed.

In a Rel-16 stage, in order to support faster HARQ-ACK feedback, it is supported to transmit multiple PUCCHs carrying HARQ-ACK with non-overlapping time domain resources in one slot. One slot is divided into multiple sub-slots, and the PUCCH transmission may be performed in each sub-slot. The quantity of sub-slots that one slot may be divided into is variable, for example, is configured through high-layer signaling. For example, one slot (14 symbols) may be divided into two sub-slots, and a symbol length of each sub-slot is 7. For another example, one slot may be divided into 4 sub-slots, a symbol length of each of two sub-slots is 3, and a symbol length of each of the other two sub-slots is 4. For another example, one slot may be divided into 7 sub-slots, and a symbol length of each sub-slot is 2.

In the Rel-16 stage, in order to obtain spatial transmission gain, multiple transmission reception points (TRPs) are supported for transmission, that is, a terminal may maintain communication with multiple TRPs, and beams used by different TRPs may be different. The SPS PDSCH releases or PDSCHs from different TRPs may perform HARQ-ACK feedback on the same PUCCH, or on different PUCCHs, that is, the PDSCH or SPS PDSCH release from a TRP1 is transmitted on the PUCCH corresponding to TRP1, the PDSCH or SPS PDSCH release from a TRP2 is transmitted on the PUCCH corresponding to the TRP2, and at this time, different TRPs are required to correspond to different PUCCH resources.

In summary, in Rel-16, when it is supported to transmit multiple PUCCHs carrying HARQ-ACK in one slot according to a sub-slot manner, there is no solution for how to configure the PUCCH resources; and when multiple TRPs are supported, there is also no clear solution for how to configure the PUCCH resources for different TRPs.

SUMMARY

Embodiments of the present disclosure provide a resource determination method and apparatus, to realize that a terminal flexibly obtains PUCCH resources in each sub-slot or for each TRP.

At a terminal side, a resource determination method provided by an embodiment of the present disclosure includes: receiving configuration signaling; obtaining at least one physical uplink control channel (PUCCH) resource set according to the configuration signaling; determining a target PUCCH resource set in the at least one PUCCH resource set, and determining a PUCCH resource from the target PUCCH resource set according to an index of a target corresponding to a PUCCH and a PUCCH resource indicator, and the target includes a sub-slot in which PUCCH transmission is performed and/or a transmission reception point (TRP) corresponding to the PUCCH.

In the method, by only configuring the PUCCH resource set shared for all sub-slots or all TRPs, and combining with indexes of the sub-slots or indexes of the TRPs, distinguishing of PUCCH resources corresponding to different sub-slots or TRPs in the same PUCCH resource set is achieved, and according to not modifying PUCCH resource configuration, it is ensured that the PUCCH resource can be flexibly obtained by the terminal on each sub-slot or each TRP.

In one embodiment, the determining the PUCCH resource from the target PUCCH resource set according to the index of the target corresponding to the PUCCH and the PUCCH resource indicator, includes: in a condition that the target is the sub-slot in which the PUCCH transmission is performed: dividing M PUCCH resources in the target PUCCH resource set into N subsets, and each of the subsets corresponds to one sub-slot in one slot, and N is a quantity of sub-slots contained in one slot; determining a subset, corresponding to the sub-slot, in the target PUCCH resource set according to an index of the sub-slot in which the PUCCH transmission is performed; and determining one PUCCH resource from the determined subset according to the PUCCH resource indicator, and the PUCCH resource indicator indicates an index of the PUCCH resource in one subset; or in a condition that the target is the TRP corresponding to the PUCCH, dividing M PUCCH resources in the target PUCCH resource set into N subsets, and each of the subsets corresponds to one TRP in TRPs, and N is a quantity of TRPs corresponding to a terminal; determining a subset, corresponding to the TRP, in the target PUCCH resource set according to an index of the TRP corresponding to the PUCCH; and determining one PUCCH resource from the determined subset according to the PUCCH resource indicator, and the PUCCH resource indicator indicates an index of the PUCCH resource in one subset; or in a condition that the target includes the sub-slot in which the PUCCH transmission is performed and the TRP corresponding to the PUCCH, dividing M PUCCH resources in the target PUCCH resource set into N1*N2 subsets, and each of the subsets corresponds to one sub-slot in one slot and one TRP, N1 is a quantity of sub-slots contained in one slot, and N2 is a quantity of TRPs corresponding to a terminal; determining one joint index according to an index of the sub-slot in which the PUCCH transmission is performed and an index of the TRP corresponding to the PUCCH; determining a subset, corresponding to the TRP and the sub-slot, in the target PUCCH resource set according to the joint index; and determining one PUCCH resource from the determined subset according to the PUCCH resource indicator, and the PUCCH resource indicator indicates an index of the PUCCH resource in one subset.

In one embodiment, the dividing the M PUCCH resources in the target PUCCH resource set into the N subsets, includes one of the following manners: Manner 1: the M PUCCH resources contained in the target PUCCH resource set are evenly divided into the N subsets, and M is an integer multiple of N; Manner 2: a first or last subset includes $$M - \left\lfloor \frac{M}{N} \right\rfloor$$

PUCCH resources, and remaining subsets include $$\left\lfloor \frac{M}{N} \right\rfloor$$

PUCCH resources; or Manner 3: first (M mod N) or last (M mod N) subsets include $$\left\lceil \frac{M}{N} \right\rceil$$

PUCCH resources, and remaining subsets include $$\left\lfloor \frac{M}{N} \right\rfloor$$

PUCCH resources.

In one embodiment, the determining the PUCCH resource from the target PUCCH resource set according to the index of the target corresponding to the PUCCH and the PUCCH resource indicator, includes: determining P PUCCH resources from the target PUCCH resource set according to the PUCCH resource indicator, and one state of the PUCCH resource indicator corresponds to $$P = \left\lceil \frac{R_{PUCCH}}{K} \right\rceil \text{ or } \left\lfloor \frac{R_{PUCCH}}{K} \right\rfloor \text{ or } \frac{R_{PUCCH}}{K}$$

PUCCH resources, and determining one PUCCH resource from the P PUCCH resources according to the index of the target corresponding to the PUCCH, and $R_{PUCCH}$ is a quantity of PUCCH resources contained in the target PUCCH resource set, and K is a preset positive integer or a numerical value related to a quantity of bits of the PUCCH resource indicator.

In one embodiment, in a condition of P>N, a one-to-many relationship is between the index of the target and multiple PUCCH resources in the P PUCCH resources, and the method further includes: determining one PUCCH resource from the one-to-many relationship according to an index of a control channel element (CCE) of a PDCCH carrying the PUCCH resource indicator; or in a condition of P=N, a one-to-one relationship is between the index of the target and one PUCCH resource in the P PUCCH resources, and the method further includes: determining one PUCCH resource corresponding to the index of the target according to the one-to-one relationship; or in a condition of P<N, multiple indexes of of multiple targets corresponding to PUCCHs correspond to one PUCCH resource in the P PUCCH resources, and the method further includes: determining, according to an index of one of the targets and N, a correspondence relationship between the multiple indexes of the multiple targets and one PUCCH resource of the P PUCCH resources; and, in a condition that the target is the sub-slot in which the PUCCH transmission is performed, N is a quantity of sub-slots contained in one slot; or in a condition that the target is the TRP corresponding to the PUCCH, N is a quantity of TRPs corresponding to a terminal; or in a condition that the target is the sub-slot in which the PUCCH transmission is performed and the TRP corresponding to the PUCCH, N is a product of a quantity of sub-slots contained in one slot and a quantity of TRPs corresponding to a terminal.

In one embodiment, an index of the finally determined PUCCH resource in the target PUCCH resource set is calculated according to one of the following formulas:

Formula 1

$$r_{PUCCH} = \begin{cases} \left\lfloor \frac{n_{index} \cdot \left\lceil R_{PUCCH}/K \right\rceil}{N} \right\rfloor + \Delta_{PRI} \cdot \left\lceil \frac{R_{PUCCH}}{K} \right\rceil & \text{if } \Delta_{PRI} < R_{PUCCH} \bmod K \\ \left\lfloor \frac{n_{index} \cdot \left\lfloor R_{PUCCH}/K \right\rfloor}{N} \right\rfloor + \Delta_{PRI} \cdot \left\lfloor \frac{R_{PUCCH}}{K} \right\rfloor + R_{PUCCH} \bmod K & \text{if } \Delta_{PRI} \geq R_{PUCCH} \bmod K \end{cases}$$

$$r_{PUCCH} = \left\lfloor \frac{n_{index} \cdot \lfloor R_{PUCCH}/K \rfloor}{N} \right\rfloor + \Delta_{PRI} \cdot \left\lfloor \frac{R_{PUCCH}}{K} \right\rfloor \quad \text{Formula 2}$$

$$r_{PUCCH} = \left\lfloor \frac{n_{index} \cdot R_{PUCCH}/K}{N} \right\rfloor + \Delta_{PRI} \cdot \frac{R_{PUCCH}}{K}; \text{ or,} \quad \text{Formula 3}$$

when $\Delta_{PRI} < R_{PUCCH} \bmod K$ and $\left\lfloor \frac{R_{PUCCH}}{K} \right\rfloor > N$, $\quad$ Formula 4

$$r_{PUCCH} = \begin{cases} \left\lfloor \frac{n_{index} \cdot \lceil R_{PUCCH}/K \rceil}{N} \right\rfloor + \left\lfloor \frac{n_{CCE,p} \cdot \lceil \lceil R_{PUCCH}/K \rceil/N \rceil}{N_{CCE,p}} \right\rfloor + \Delta_{PRI} \cdot \left\lceil \frac{R_{PUCCH}}{K} \right\rceil & \text{if } n_{index} < \left\lceil \frac{R_{PUCCH}}{K} \right\rceil \bmod N \\ \left\lfloor \frac{n_{index} \cdot \lceil R_{PUCCH}/K \rceil}{N} \right\rfloor + \left\lfloor \frac{n_{CCE,p} \cdot \lfloor \lceil R_{PUCCH}/K \rceil/N \rfloor}{N_{CCE,p}} \right\rfloor + \Delta_{PRI} \cdot \left\lceil \frac{R_{PUCCH}}{K} \right\rceil + \left\lceil \frac{R_{PUCCH}}{K} \right\rceil \bmod N & \text{if } n_{index} \geq \left\lceil \frac{R_{PUCCH}}{K} \right\rceil \bmod N \end{cases}$$

when $\Delta_{PRI} < R_{PUCCH} \bmod K$ and $\left\lfloor \frac{R_{PUCCH}}{K} \right\rfloor \leq N$, $$r_{PUCCH} = \left\lfloor \frac{n_{index} \cdot \lceil R_{PUCCH}/K \rceil}{N} \right\rfloor + \Delta_{PRI} \cdot \left\lceil \frac{R_{PUCCH}}{K} \right\rceil$$

when $\Delta_{PRI} \geq R_{PUCCH} \bmod K$ and $\left\lfloor \frac{R_{PUCCH}}{K} \right\rfloor > N$, $$r_{PUCCH} = \begin{cases} \left\lfloor \frac{n_{index} \cdot \lfloor R_{PUCCH}/K \rfloor}{N} \right\rfloor + \left\lfloor \frac{n_{CCE,p} \cdot \lceil \lfloor R_{PUCCH}/K \rfloor/N \rceil}{N_{CCE,p}} \right\rfloor + \Delta_{PRI} \cdot \left\lfloor \frac{R_{PUCCH}}{K} \right\rfloor & \text{if } n_{index} < \left\lfloor \frac{R_{PUCCH}}{K} \right\rfloor \bmod N \\ \left\lfloor \frac{n_{index} \cdot \lfloor R_{PUCCH}/K \rfloor}{N} \right\rfloor + \left\lfloor \frac{n_{CCE,p} \cdot \lfloor \lfloor R_{PUCCH}/K \rfloor/N \rfloor}{N_{CCE,p}} \right\rfloor + \Delta_{PRI} \cdot \left\lfloor \frac{R_{PUCCH}}{K} \right\rfloor + \left\lfloor \frac{R_{PUCCH}}{K} \right\rfloor \bmod N + R_{PUCCH} \bmod K & \text{if } n_{index} \geq \left\lfloor \frac{R_{PUCCH}}{K} \right\rfloor \bmod N \end{cases}$$

and when $\Delta_{PRI} \geq R_{PUCCH} \bmod K$ and $\left\lfloor \frac{R_{PUCCH}}{K} \right\rfloor \leq N$, $$r_{PUCCH} = \left\lfloor \frac{n_{index} \cdot \lfloor R_{PUCCH}/K \rfloor}{N} \right\rfloor + \Delta_{PRI} \cdot \left\lfloor \frac{R_{PUCCH}}{K} \right\rfloor + R_{PUCCH} \bmod K;$$

and, $r_{PUCCH}$ is an index of each PUCCH resource in the target PUCCH resource set, $\Delta_{PRI}$ is a value of the PUCCH resource indicator, a range of the value is 0 to K−1, in a condition that the target is the sub-slot in which the PUCCH transmission is performed, $n_{index}$ is an index of each sub-slot in one slot, or in a condition that the target is the TRP corresponding to the PUCCH, $n_{index}$ is an index of each TRP in the N TRPs corresponding to the terminal, or in a condition that the target includes the sub-slot in which the PUCCH transmission is performed and the TRP corresponding to the PUCCH, $n_{index}$ is a joint index of the sub-slots contained in one slot and the TRPs corresponding to the terminal.

In one embodiment, the determining the PUCCH resource from the target PUCCH resource set according to the index of the target corresponding to the PUCCH and the PUCCH resource indicator, includes: determining T PUCCH resources corresponding to K states of the PUCCH resource indicator according to the index of the target, and $$T = \left\lceil \frac{R_{PUCCH}}{N} \right\rceil \text{ or } \left\lfloor \frac{R_{PUCCH}}{N} \right\rfloor \text{ or } \left\lfloor \frac{R_{PUCCH}}{N} \right\rfloor,$$

and determining one PUCCH resource from the T PUCCH resources according to the PUCCH resource indicator; and, in a condition that the target is the sub-slot in which the PUCCH transmission is performed, N is a quantity of sub-slots contained in one slot; or in a condition that the target is the TRP corresponding to the PUCCH, N is a quantity of TRPs corresponding to a terminal; or in a condition that the target includes the sub-slot in which the PUCCH transmission is performed and the TRP corresponding to the PUCCH, N is a product of a quantity of sub-slots contained in one slot and a quantity of TRPs corresponding to a terminal.

In one embodiment, in a condition of T>K, the method further includes: determining, according to an index of a control channel element (CCE) of a PDCCH carrying the PUCCH resource indicator, one PUCCH resource corresponding to the index of the CCE from the T PUCCH resources; in a condition of T=K, a one-to-one relationship is between the K states of the PUCCH resource indicator and the T PUCCH resources, and the method further includes: determining one PUCCH resource according to the one-to-one relationship; or in a condition of T<K, some of the K states of the PUCCH resource indicator are reserved and a one-to-one relationship is between T states of the K states and the T PUCCH resources, and the method further includes: determining one PUCCH resource according to the one-to-one relationship.

In one embodiment, an index of the finally determined PUCCH resource in the target PUCCH resource set is calculated according to one of the following formulas:

$$r_{PUCCH} = n_{index} \cdot A + \Delta_{PRI}, \text{ and } A = K \text{ or } \frac{R_{PUCCH}}{N} \text{ or } \left\lceil \frac{R_{PUCCH}}{N} \right\rceil \text{ or } \left\lfloor \frac{R_{PUCCH}}{N} \right\rfloor; \quad \text{Formula 5}$$

-continued $$r_{PUCCH} = \begin{cases} n_{index} \cdot \left\lceil \frac{R_{PUCCH}}{N} \right\rceil + \Delta_{PRI} & \text{if } n_{index} < R_{PUCCH} \bmod N \\ n_{index} \cdot \left\lfloor \frac{R_{PUCCH}}{N} \right\rfloor + R_{PUCCH} \bmod N + \Delta_{PRI} & \text{if } n_{index} \geq R_{PUCCH} \bmod N \end{cases}; \text{ or} \quad \text{Formula 6}$$

when $n_{index} < R_{PUCCH} \bmod N$ and $\left\lceil \frac{R_{PUCCH}}{N} \right\rceil > K$, Formula 7

$$r_{PUCCH} = \begin{cases} n_{index} \cdot \left\lceil \frac{R_{PUCCH}}{N} \right\rceil + \left\lfloor \frac{n_{CCE,p} \cdot \lceil \lceil R_{PUCCH}/N \rceil /K \rceil}{N_{CCE,p}} \right\rfloor + \Delta_{PRI} \cdot \lceil \lceil R_{PUCCH}/N \rceil /K \rceil & \text{if } \Delta_{PRI} < \left\lceil \frac{R_{PUCCH}}{N} \right\rceil \bmod K \\ n_{index} \cdot \left\lceil \frac{R_{PUCCH}}{N} \right\rceil + \left\lfloor \frac{n_{CCE,p} \cdot \lfloor \lceil R_{PUCCH}/N \rceil /K \rfloor}{N_{CCE,p}} \right\rfloor + \Delta_{PRI} \cdot \lfloor \lceil R_{PUCCH}/N \rceil /K \rfloor + \left\lceil \frac{R_{PUCCH}}{N} \right\rceil \bmod K & \text{if } \Delta_{PRI} \geq \left\lceil \frac{R_{PUCCH}}{N} \right\rceil \bmod K \end{cases};$$

when $n_{index} < R_{PUCCH} \bmod N$ and $\left\lceil \frac{R_{PUCCH}}{N} \right\rceil \leq K$, $$r_{PUCCH} = n_{index} \cdot \left\lceil \frac{R_{PUCCH}}{N} \right\rceil + \Delta_{PRI};$$

when $n_{index} \geq R_{PUCCH} \bmod N$ and $\left\lfloor \frac{R_{PUCCH}}{N} \right\rfloor > K$, $$r_{PUCCH} = \begin{cases} n_{index} \cdot \left\lfloor \frac{R_{PUCCH}}{N} \right\rfloor + R_{PUCCH} \bmod N + \left\lfloor \frac{n_{CCE,p} \cdot \lceil \lfloor R_{PUCCH}/N \rfloor /K \rceil}{N_{CCE,p}} \right\rfloor + \Delta_{PRI} \cdot \lceil \lfloor R_{PUCCH}/N \rfloor /K \rceil & \text{if } \Delta_{PRI} < \left\lfloor \frac{R_{PUCCH}}{N} \right\rfloor \bmod K \\ n_{index} \cdot \left\lfloor \frac{R_{PUCCH}}{N} \right\rfloor + R_{PUCCH} \bmod N + \left\lfloor \frac{n_{CCE,p} \cdot \lfloor \lfloor R_{PUCCH}/N \rfloor /K \rfloor}{N_{CCE,p}} \right\rfloor + \Delta_{PRI} \cdot \lfloor \lfloor R_{PUCCH}/N \rfloor /K \rfloor + \left\lfloor \frac{R_{PUCCH}}{N} \right\rfloor \bmod K & \text{if } \Delta_{PRI} \geq \left\lfloor \frac{R_{PUCCH}}{K} \right\rfloor \bmod K \end{cases};$$

and when $n_{index} \geq R_{PUCCH} \bmod N$ and $\left\lfloor \frac{R_{PUCCH}}{N} \right\rfloor \leq K$, $$r_{PUCCH} = n_{index} \cdot \left\lfloor \frac{R_{PUCCH}}{N} \right\rfloor + R_{PUCCH} \bmod N + \Delta_{PRI};$$

and, $r_{PUCCH}$ is an index of each PUCCH resource in the target PUCCH resource set, $0 \leq r_{PUCCH} \leq R_{PUCCH}-1$, $R_{PUCCH}$ is a quantity of PUCCH resources contained in the target PUCCH resource set, $\Delta_{PRI}$ is a value of the PUCCH resource indicator, a vrange of the value is 0 to K−1, K is a preset positive integer value or a numerical value related to a quantity of bits of the PUCCH resource indicator; in a condition that the target is the sub-slot in which the PUCCH transmission is performed, $n_{index}$ is an index of each sub-slot in the one slot, or in a condition that the target is the TRP corresponding to the PUCCH, $n_{index}$ is an index of each TRP in the N TRPs corresponding to the terminal, or in a condition that the target is the sub-slot in which the PUCCH transmission is performed and the TRP corresponding to the PUCCH, $n_{index}$ is a joint index of the sub-slots contained in the one slot and the TRPs corresponding to the terminal.

In one embodiment, the configuration signaling is high-layer signaling or signaling carried by a physical downlink control channel (PDCCH).

In one embodiment, the PUCCH resource set is shared for sub-slots in one slot or configured for each of sub-slots in one slot; or, the PUCCH resource set is shared for TRPs corresponding to a terminal or configured for each of TRPs.

At a network side, a resource determination method provided by an embodiment of the present disclosure includes: sending configuration signaling to indicate a terminal to obtain at least one physical uplink control channel (PUCCH) resource set according to the configuration signaling; determining a target PUCCH resource set in the at least one PUCCH resource set; determining a PUCCH resource from the target PUCCH resource set according to an index of a target corresponding to a PUCCH of the terminal, generating a PUCCH resource indicator corresponding to the determined PUCCH resource, and sending the PUCCH resource indicator to the terminal, for the terminal to determine the PUCCH resource from the target PUCCH resource set according to the index of the target corresponding to the PUCCH and the PUCCH resource indicator, and the target includes a sub-slot in which PUCCH transmission is performed and/or a transmission reception point (TRP) corresponding to the PUCCH.

In one embodiment, the determining the PUCCH resource from the target PUCCH resource set according to the index of the target corresponding to the PUCCH and the PUCCH resource indicator, includes: in a condition that the target is the sub-slot in which the PUCCH transmission is performed: dividing M PUCCH resources in the target PUCCH resource set into N subsets, and each of the subsets corresponds to one sub-slot in one slot, and N is a quantity of sub-slots contained in one slot; determining a subset, corresponding to the sub-slot, in the target PUCCH resource set according to an index of the sub-slot in which the PUCCH transmission is performed; and determining one PUCCH resource from the determined subset according to the PUCCH resource indicator, and the PUCCH resource indicator indicates an index of the PUCCH resource in one subset; or in a condition that the target is the TRP corresponding to the PUCCH, dividing M PUCCH resources in the target PUCCH resource set into N subsets, and each of the subsets corresponds to one TRP in TRPs, and N is a quantity of TRPs corresponding to a terminal; determining a subset, corresponding to the TRP, in the target PUCCH resource set according to an index of the TRP corresponding to the PUCCH; and determining one PUCCH resource from the determined subset according to the PUCCH resource indicator, and the PUCCH resource indicator indicates an index of the PUCCH resource in one subset; or in a condition that the target includes the sub-slot in which the PUCCH transmission is performed and the TRP corresponding to the PUCCH, dividing M PUCCH resources in the target PUCCH resource set into N1*N2 subsets, and each of the subsets corresponds to one sub-slot in one slot and one TRP, N1 is a quantity of sub-slots contained in one slot, and N2 is a quantity of TRPs corresponding to a terminal; determining one joint index according to an index of the sub-slot in which the PUCCH transmission is performed and an index of the TRP corresponding to the PUCCH; determining a subset, corresponding to the TRP and the sub-slot, in the target PUCCH resource set according to the joint index; and determining one PUCCH resource from the determined subset according to the PUCCH resource indicator, and the PUCCH resource indicator indicates an index of the PUCCH resource in one subset.

In one embodiment, the dividing the M PUCCH resources in the target PUCCH resource set into the N subsets, includes one of the following manners:

Manner 1: the M PUCCH resources contained in the target PUCCH resource set are evenly divided into the N subsets, and M is an integer multiple of N;

Manner 2: a first or last subset includes $$M - \left\lfloor \frac{M}{N} \right\rfloor$$

PUCCH resources, and remaining subsets include $$\left\lfloor \frac{M}{N} \right\rfloor$$

PUCCH resources; or

Manner 3: first (M mod N) or last (M mod N) subsets include $$\left\lceil \frac{M}{N} \right\rceil$$

PUCCH resources, and remaining subsets include $$\left\lfloor \frac{M}{N} \right\rfloor$$

PUCCH resources.

In one embodiment, the determining the PUCCH resource from the target PUCCH resource set according to the index of the target corresponding to the PUCCH and the PUCCH resource indicator, includes:

determining P PUCCH resources from the target PUCCH resource set according to the PUCCH resource indicator, and one state of the PUCCH resource indicator corresponds to $$P = \left\lceil \frac{R_{PUCCH}}{K} \right\rceil \text{ or } \left\lfloor \frac{R_{PUCCH}}{K} \right\rfloor \text{ or } \frac{R_{PUCCH}}{K}$$

PUCCH resources, and determining one PUCCH resource from the P PUCCH resources according to the index of the target corresponding to the PUCCH, and $R_{PUCCH}$ is a quantity of PUCCH resources contained in the target PUCCH resource set, and K is a preset positive integer or a numerical value related to a quantity of bits of the PUCCH resource indicator.

In one embodiment, in a condition of P>N, a one-to-many relationship is between the index of the target and multiple PUCCH resources in the P PUCCH resources, and the method further includes: determining one PUCCH resource from the one-to-many relationship according to an index of a control channel element (CCE) of a PDCCH carrying the PUCCH resource indicator; or in a condition of P=N, a one-to-one relationship is between the index of the target and one PUCCH resource in the P PUCCH resources, and the method further includes: determining one PUCCH resource corresponding to the index of the target according to the one-to-one relationship; or in a condition of P<N, multiple indexes of multiple targets corresponding to PUCCHs correspond to one PUCCH resource in the P PUCCH resources, and the method further includes: determining, according to an index of one of the targets and N, a correspondence relationship between the multiple indexes of the multiple targets and one PUCCH resource of the P PUCCH resources; and, in a condition that the target is the sub-slot in which the PUCCH transmission is performed, N is a quantity of sub-slots contained in one slot; or in a condition that the target is the TRP corresponding to the PUCCH, N is a quantity of TRPs corresponding to a terminal; or in a condition that the target is the sub-slot in which the PUCCH transmission is performed and the TRP corresponding to the PUCCH, N is a product of a quantity of sub-slots contained in one slot and a quantity of TRPs corresponding to a terminal.

In one embodiment, an index of the finally determined PUCCH resource in the target PUCCH resource set is calculated according to one of the following formulas:

$$r_{PUCCH} = \begin{cases} \left\lfloor \frac{n_{index} \cdot \lceil R_{PUCCH}/K \rceil}{N} \right\rfloor + \Delta_{PRI} \cdot \left\lceil \frac{R_{PUCCH}}{K} \right\rceil & \text{if } \Delta_{PRI} < R_{PUCCH} \bmod K \\ \left\lfloor \frac{n_{index} \cdot \lfloor R_{PUCCH}/K \rfloor}{N} \right\rfloor + \Delta_{PRI} \cdot \left\lfloor \frac{R_{PUCCH}}{K} \right\rfloor + R_{PUCCH} \bmod K & \text{if } \Delta_{PRI} \geq R_{PUCCH} \bmod K \end{cases}$$

Formula 1

$$r_{PUCCH} = \left\lfloor \frac{n_{index} \cdot \lfloor R_{PUCCH}/K \rfloor}{N} \right\rfloor + \Delta_{PRI} \cdot \left\lfloor \frac{R_{PUCCH}}{K} \right\rfloor$$

Formula 2

$$r_{PUCCH} = \left\lfloor \frac{n_{index} \cdot R_{PUCCH}/K}{N} \right\rfloor + \Delta_{PRI} \cdot \frac{R_{PUCCH}}{K}; \text{ or,}$$

Formula 3 when $\Delta_{PRI} < R_{PUCCH} \bmod K$ and $\left\lceil \frac{R_{PUCCH}}{K} \right\rceil > N$, Formula 4

$$r_{PUCCH} = \begin{cases} \left\lfloor \frac{n_{index} \cdot \lceil R_{PUCCH}/K \rceil}{N} \right\rfloor + \left\lfloor \frac{n_{CCE,p} \cdot \lceil \lceil R_{PUCCH}/K \rceil/N \rceil}{N_{CCE,p}} \right\rfloor + \Delta_{PRI} \cdot \left\lceil \frac{R_{PUCCH}}{K} \right\rceil & \text{if } n_{index} < \left\lceil \frac{R_{PUCCH}}{K} \right\rceil \bmod N \\ \left\lfloor \frac{n_{index} \cdot \lceil R_{PUCCH}/K \rceil}{N} \right\rfloor + \left\lfloor \frac{n_{CCE,p} \cdot \lfloor \lceil R_{PUCCH}/K \rceil/N \rfloor}{N_{CCE,p}} \right\rfloor + \Delta_{PRI} \cdot \left\lceil \frac{R_{PUCCH}}{K} \right\rceil + \left\lceil \frac{R_{PUCCH}}{K} \right\rceil \bmod N & \text{if } n_{index} \geq \left\lceil \frac{R_{PUCCH}}{K} \right\rceil \bmod N \end{cases}$$

-continued when $\Delta_{PRI} < R_{PUCCH} \bmod K$ and $\left\lceil \frac{R_{PUCCH}}{K} \right\rceil \leq N$, $$r_{PUCCH} = \left\lfloor \frac{n_{index} \cdot \lceil R_{PUCCH}/K \rceil}{N} \right\rfloor + \Delta_{PRI} \cdot \left\lceil \frac{R_{PUCCH}}{K} \right\rceil$$

when $\Delta_{PRI} \geq R_{PUCCH} \bmod K$ and $\left\lfloor \frac{R_{PUCCH}}{K} \right\rfloor > N$, $$r_{PUCCH} = \begin{cases} \left\lfloor \frac{n_{index} \cdot \lfloor R_{PUCCH}/K \rfloor}{N} \right\rfloor + \left\lfloor \frac{n_{CCE,p} \cdot \lceil \lfloor R_{PUCCH}/K \rfloor/N \rceil}{N_{CCE,p}} \right\rfloor + \Delta_{PRI} \cdot \left\lfloor \frac{R_{PUCCH}}{K} \right\rfloor \text{ if } n_{index} < \left\lfloor \frac{R_{PUCCH}}{K} \right\rfloor \bmod N \\ \left\lfloor \frac{n_{index} \cdot \lfloor R_{PUCCH}/K \rfloor}{N} \right\rfloor + \left\lfloor \frac{n_{CCE,p} \cdot \lfloor \lfloor R_{PUCCH}/K \rfloor/N \rfloor}{N_{CCE,p}} \right\rfloor + \Delta_{PRI} \cdot \left\lfloor \frac{R_{PUCCH}}{K} \right\rfloor + \left\lfloor \frac{R_{PUCCH}}{K} \right\rfloor \bmod N + R_{PUCCH} \bmod K \text{ if } n_{index} \geq \left\lfloor \frac{R_{PUCCH}}{K} \right\rfloor \bmod N \end{cases}$$

and when $\Delta_{PRI} \geq R_{PUCCH} \bmod K$ and $\left\lfloor \frac{R_{PUCCH}}{K} \right\rfloor \leq N$, $$r_{PUCCH} = \left\lfloor \frac{n_{index} \cdot \lfloor R_{PUCCH}/K \rfloor}{N} \right\rfloor + \Delta_{PRI} \cdot \left\lfloor \frac{R_{PUCCH}}{K} \right\rfloor + R_{PUCCH} \bmod K;$$

and, $r_{PUCCH}$ is an index of each PUCCH resource in the target PUCCH resource set, $\Delta_{PRI}$ is a value of the PUCCH resource indicator, a range of the value is 0 to K−1, in a condition that the target is the sub-slot in which the PUCCH transmission is performed, $n_{index}$ is an index of each sub-slot in one slot, or in a condition that the target is the TRP corresponding to the PUCCH, $n_{index}$ is an index of each TRP in the N TRPs corresponding to the terminal, or in a condition that the target includes the sub-slot in which the PUCCH transmission is performed and the TRP corresponding to the PUCCH, $n_{index}$ is a joint index of the sub-slots contained in one slot and the TRPs corresponding to the terminal.

In one embodiment, the determining the PUCCH resource from the target PUCCH resource set according to the index of the target corresponding to the PUCCH and the PUCCH resource indicator, includes: determining T PUCCH resources corresponding to K states of the PUCCH resource indicator according to the index of the target, and $$T = \left\lceil \frac{R_{PUCCH}}{N} \right\rceil \text{ or } \left\lfloor \frac{R_{PUCCH}}{N} \right\rfloor \text{ or } \frac{R_{PUCCH}}{N},$$

and determining one PUCCH resource from the T PUCCH resources according to the PUCCH resource indicator; and, in a condition that the target is the sub-slot in which the PUCCH transmission is performed, N is a quantity of sub-slots contained in one slot; or in a condition that the target is the TRP corresponding to the PUCCH, N is a quantity of TRPs corresponding to a terminal; or in a condition that the target includes the sub-slot in which the PUCCH transmission is performed and the TRP corresponding to the PUCCH, N is a product of a quantity of sub-slots contained in one slot and a quantity of TRPs corresponding to a terminal.

In one embodiment, in a condition of T>K, the method further includes: determining, according to an index of a control channel element (CCE) of a PDCCH carrying the PUCCH resource indicator, one PUCCH resource corresponding to the index of the CCE from the T PUCCH resources; or in a condition of T=K, a one-to-one relationship is between the K states of the PUCCH resource indicator and the T PUCCH resources, and the method further includes: determining one PUCCH resource according to the one-to-one relationship; or in a condition of T<K, some of the K states of the PUCCH resource indicator are reserved and a one-to-one relationship is between T states of the K states and the T PUCCH resources, and the method further includes: determining one PUCCH resource according to the one-to-one relationship.

In one embodiment, an index of the finally determined PUCCH resource in the target PUCCH resource set is calculated according to one of the following formulas:

$$r_{PUCCH} = n_{index} \cdot A + \Delta_{PRI}, \text{ and } A = K \text{ or } \frac{R_{PUCCH}}{N} \text{ or } \left\lceil \frac{R_{PUCCH}}{N} \right\rceil \text{ or } \left\lfloor \frac{R_{PUCCH}}{N} \right\rfloor;$$ Formula 5

$$r_{PUCCH} = \begin{cases} n_{index} \cdot \left\lceil \frac{R_{PUCCH}}{N} \right\rceil + \Delta_{PRI} \text{ if } n_{index} < R_{PUCCH} \bmod N \\ n_{index} \cdot \left\lfloor \frac{R_{PUCCH}}{N} \right\rfloor + R_{PUCCH} \bmod N + \Delta_{PRI} \text{ if } n_{index} \geq R_{PUCCH} \bmod N \end{cases}; \text{ or}$$ Formula 6 when $n_{index} < R_{PUCCH} \bmod N$ and $\left\lceil \frac{R_{PUCCH}}{N} \right\rceil > K$, Forrmula 7

$$r_{PUCCH} = \begin{cases} n_{index} \cdot \left\lceil \frac{R_{PUCCH}}{N} \right\rceil + \left\lfloor \frac{n_{CCE,p} \cdot \lceil \lceil R_{PUCCH}/N \rceil/K \rceil}{N_{CCE,p}} \right\rfloor + \Delta_{PRI} \cdot \lceil \lceil R_{PUCCH}/N \rceil/K \rceil \text{ if } \Delta_{PRI} < \left\lceil \frac{R_{PUCCH}}{N} \right\rceil \bmod K \\ n_{index} \cdot \left\lceil \frac{R_{PUCCH}}{N} \right\rceil + \left\lfloor \frac{n_{CCE,p} \cdot \lfloor \lceil R_{PUCCH}/N \rceil/K \rfloor}{N_{CCE,p}} \right\rfloor + \Delta_{PRI} \cdot \lfloor \lceil R_{PUCCH}/N \rceil/K \rfloor + \left\lceil \frac{R_{PUCCH}}{N} \right\rceil \bmod K \text{ if } \Delta_{PRI} \geq \left\lceil \frac{R_{PUCCH}}{N} \right\rceil \bmod K \end{cases};$$

when $n_{index} < R_{PUCCH} \bmod N$ and $\left\lceil \frac{R_{PUCCH}}{N} \right\rceil \leq K$, -continued $$r_{PUCCH} = n_{index} \cdot \left\lceil \frac{R_{PUCCH}}{N} \right\rceil + \Delta_{PRI};$$

when $n_{index} \geq R_{PUCCH} \bmod N$ and $\left\lfloor \frac{R_{PUCCH}}{N} \right\rfloor > K$, $$r_{PUCCH} = \begin{cases} n_{index} \cdot \left\lfloor \frac{R_{PUCCH}}{N} \right\rfloor + R_{PUCCH} \bmod N + \left\lfloor \frac{n_{CCE,p} \cdot \lceil \lfloor R_{PUCCH}/N \rfloor / K \rceil}{N_{CCE,p}} \right\rfloor + \Delta_{PRI} \cdot \lceil \lfloor R_{PUCCH}/N \rfloor / K \rceil & \text{if } \Delta_{PRI} < \left\lfloor \frac{R_{PUCCH}}{N} \right\rfloor \bmod K \\ n_{index} \cdot \left\lfloor \frac{R_{PUCCH}}{N} \right\rfloor + R_{PUCCH} \bmod N + \left\lfloor \frac{n_{CCE,p} \cdot \lfloor \lfloor R_{PUCCH}/N \rfloor / K \rfloor}{N_{CCE,p}} \right\rfloor + \Delta_{PRI} \cdot \lfloor \lfloor R_{PUCCH}/N \rfloor / K \rfloor + \left\lfloor \frac{R_{PUCCH}}{N} \right\rfloor \bmod K & \text{if } \Delta_{PRI} \geq \left\lfloor \frac{R_{PUCCH}}{N} \right\rfloor \bmod K \end{cases};$$

and when $n_{index} \geq R_{PUCCH} \bmod N$ and $\left\lfloor \frac{R_{PUCCH}}{N} \right\rfloor \leq K$, $$r_{PUCCH} = n_{index} \cdot \left\lfloor \frac{R_{PUCCH}}{N} \right\rfloor + R_{PUCCH} \bmod N + \Delta_{PRI};$$

and, $r_{PUCCH}$ is an index of each PUCCH resource in the target PUCCH resource set, $0 \leq r_{PUCCH} \leq R_{PUCCH} - 1$, $R_{PUCCH}$ is a quantity of PUCCH resources contained in the target PUCCH resource set, $\Delta_{PRI}$ is a value of the PUCCH resource indicator, a vrange of the value is 0 to K−1, K is a preset positive integer value or a numerical value related to a quantity of bits of the PUCCH resource indicator; in a condition that the target is the sub-slot in which the PUCCH transmission is performed, $n_{index}$ is an index of each sub-slot in the one slot, or in a condition that the target is the TRP corresponding to the PUCCH, $n_{index}$ is an index of each TRP in the N TRPs corresponding to the terminal, or in a condition that the target is the sub-slot in which the PUCCH transmission is performed and the TRP corresponding to the PUCCH, $n_{index}$ is a joint index of the sub-slots contained in the one slot and the TRPs corresponding to the terminal.

In one embodiment, the configuration signaling is high-layer signaling or signaling carried by a physical downlink control channel (PDCCH).

In one embodiment, the PUCCH resource set is shared for sub-slots in one slot or configured for each of sub-slots in one slot; or, the PUCCH resource set is shared for TRPs corresponding to a terminal or configured for each of TRPs.

A resource determination apparatus provided by an embodiment of the present disclosure, includes: a memory, configured to store a program instruction; and a processor, configured to call the program instruction stored in the memory, to execute any method provided by the embodiments of the present disclosure according to the called program instruction.

At a terminal side, another resource determination apparatus provided by an embodiment of the present disclosure, includes: a receiving device, configured to receive configuration signaling, and obtain at least one PUCCH resource set according to the configuration signaling; and a determining device, configured to determine a target PUCCH resource set, and determine a PUCCH resource from the target PUCCH resource set according to an index of a target corresponding to a PUCCH and a PUCCH resource indicator, and the target includes a sub-slot in which PUCCH transmission is performed and/or a TRP corresponding to the PUCCH.

At a network side, another resource determination apparatus provided by an embodiment of the present disclosure, includes: a sending device, configured to send configuration signaling to indicate a terminal to obtain at least one PUCCH resource set according to the configuration signaling; and a determining device, configured to determine a target PUCCH resource set, determine a PUCCH resource from the target PUCCH resource set according to an index of a target corresponding to a PUCCH of the terminal, generate a PUCCH resource indicator corresponding to the determined PUCCH resource, and send the PUCCH resource indicator to the terminal, for the terminal to determine the PUCCH resource from the target PUCCH resource set according to the index of the target corresponding to the PUCCH and the PUCCH resource indicator, and the target includes a sub-slot in which PUCCH transmission is performed and/or a TRP corresponding to the PUCCH.

Another embodiment of the present disclosure provides a computer storage medium, the computer storage medium stores a computer executable instruction, and the computer executable instruction is configured to cause a computer to execute any method described above when the computer executable instruction is performed.

BRIEF DESCRIPTION OF THE DRAWINGS

In order to more clearly illustrate the embodiments of the present disclosure, the drawings used in the description of the embodiments are briefly described below, and that the drawings in the description below are only some embodiments of the present disclosure, and other drawings can be obtained.

DETAILED DESCRIPTION OF THE EMBODIMENTS

Figure 1:
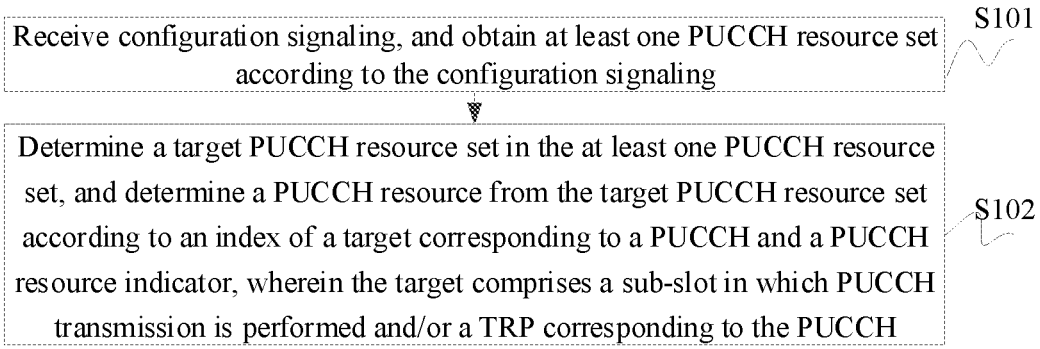
FIG. 1 is a schematic flowchart of a resource determination method at a terminal side provided according to an embodiment of the present disclosure.

The embodiments of the present disclosure will be described in further detail below with reference to the accompanying drawings of the embodiments of the present disclosure.

Apparently, the described embodiments are merely some, but not all embodiments of this disclosure.

The embodiments of the present disclosure provide a resource determination method and apparatus, to realize that a terminal flexibly obtains PUCCH resources in each sub-slot or for each TRP.

The method and the apparatus are based on the same application concept. Since the method and the apparatus have similar principles for solving the problem, the implementation of the apparatus and the implementation of the method may be referred to each other, and the repetition will not be repeated.

The embodiments of the present disclosure may be applied to various systems, especially 5G systems. For example, the applicable systems may be global systems of mobile communication (GSM), code division multiple access (CDMA) systems, wideband code division multiple access (WCDMA) general packet radio service (GPRS) systems, long term evolution (LTE) systems, LTE frequency division duplex (FDD) systems, LTE time division duplex (TDD), universal mobile telecommunication systems (UMTSs), worldwide interoperability for microwave access (WiMAX) systems, 5G systems and 5G NR systems, etc.

These various systems each include a terminal device and a network device.

The terminal device involved in the embodiments of the present disclosure may be a device that provides voice and/or data connectivity to a user, a handheld device with a wireless connection function, or other processing devices connected to a wireless modem. In different systems, the name of the terminal device may be different. For example, in a 5G system, the terminal device may be referred to as user equipment (UE). A wireless terminal device may communicate with one or more core networks via a radio access network (RAN). The wireless terminal device may be a mobile terminal device, such as a mobile phone (or a "cellular" phone) and a computer with the mobile terminal device, for example, may be a portable, pocket-sized, hand-held, computer built-in or vehicle-mounted mobile device, which exchanges language and/or data with the radio access network. For example, the wireless terminal device may be personal communication service (PCS) phones, cordless phones, session initiated protocol (SIP) phones, wireless local loop (WLL) stations, personal digital assistants (PDA) and other devices. The wireless terminal device may also be called a system, a subscriber device, a subscriber station, a mobile station, a mobile, a remote station, an access point, a remote terminal, an access terminal, a user terminal, a user agent, and a user device, which are not limited in the embodiments of the present disclosure.

The network device involved in the embodiments of the present disclosure may be a base station, and the base station may include cells. Depending on specific application scenarios, the base station may also be called an access point, or may refer to a device that communicates with the wireless terminal device through one or more sectors on an air interface in an access network, or other names. The network device may be configured to convert received air frames and internet protocol (IP) packets to each other, as a router between the wireless terminal device and the rest of the access network, and the rest of the access network may include an internet protocol (IP) communication network. The network device may also coordinate with the attribute management of the air interface. For example, the network device involved in the embodiments of the present disclosure may be a network device (base transceiver station, BTS) in GSM or CDMA, or a network device (NodeB) in WCDM, or an evolutional node B (eNB or e-NodeB) in an LTE system, or a 5G base station in a 5G network architecture (next generation system), and may also be a home evolved node B (HeNB), a relay node, a home base station (femto), a pico base station (pico), etc., which is not limited in the embodiments of the present disclosure.

Hereinafter, each embodiment of the present disclosure will be described in detail with reference to the accompanying drawings of the specification. It should be noted that the display order of the embodiments of the present disclosure only represents the sequence of the embodiments.

In the embodiments of the present disclosure, at least one PUCCH resource set is configured through configuration signaling (for example, high-layer signaling), each PUCCH resource set includes M quantity of PUCCH resources, the M resources in each PUCCH resource set are further divided into N subsets, each subset corresponds to a sub-slot in a slot or corresponds to a TRP, N is the quantity of sub-slots in one slot or N is the quantity of TRPs, that is, one subset correspondingly provides PUCCH resources for PUCCH transmission in one sub-slot, or one subset correspondingly provides PUCCH resources for PUCCH transmission corresponding to one TRP. Both M and N are integers greater than or equal to 1. The quantity of the TRPs is the quantity of TRPs corresponding to one UE, and the TRPs corresponding to one UE may be in the same cell/carrier or in different cells/carriers. For example, during carrier aggregation, a carrier 1 corresponds to a TRP1 (that is, the terminal may be in the carrier 1 to communicate with the TRP1, such as sending uplink transmission to the TRP1, or receiving downlink transmission sent by the TRP1, and the following is similar and will not be repeated here), a carrier 2 corresponds to a TRP2, or the carrier 1 corresponds to the TRP1 and the TRP2 at the same time, and the carrier 2 corresponds to the TRP1 and the TRP2 at the same time.

The embodiments of the present disclosure are introduced below from a terminal side and a network side respectively.

Terminal Side Behaviors

Referring to FIG. 1, a resource determination method provided by an embodiment of the present disclosure includes the following.

S101, configuration signaling sent by the network side is received, and a PUCCH resource set is obtained according to the configuration signaling.

In one embodiment, the configuration signaling is high-layer signaling or signaling carried through a PDCCH.

In one embodiment, the PUCCH resource set includes one or more resource sets.

In one embodiment, the PUCCH resource set is shared for sub-slots in one slot.

In one embodiment, the PUCCH resource set is shared for TRPs corresponding to a terminal.

S102, a target PUCCH resource set is determined, and a PUCCH resource is determined from the target PUCCH resource set according to a PUCCH resource indicator (this indicator is carried in DCI used by a PDCCH corresponding to the PUCCH) and an index of a target corresponding to the PUCCH.

The determining the target PUCCH resource set, for example, includes: according to the quantity of bits of UCI transmitted on the PUCCH, a PUCCH resource set, corresponding to the quantity of the bits, in the obtained PUCCH resource set is determined as the target PUCCH resource set.

The target is a sub-slot in which PUCCH transmission is performed (for example, the sub-slot determined according to a K0 value indicated by a timing indicator fed back in the PDCCH corresponding to the PUCCH, or by a feedback timing K0 value configured by a high level), or a TRP corresponding to the PUCCH (for example, according to a beam used by the PUCCH, it may be determined which TRP corresponds to PUCCH transmission, or according to a control-resource set (CORESET) in which the PDCCH transmission corresponding to the PUCCH is performed, it may be determined which TRP corresponds to the PUCCH, there is a pair relationship between the CORESETs and the TRPs, for example, if the PDCCH corresponding to the PUCCH is transmitted in a CORESET1, the PUCCH corresponds to a TRP1, and the CORESET1 corresponds to the TRP1).

In the embodiment of the present disclosure, the determining the PUCCH resource from the target PUCCH resource set according to the PUCCH resource indicator and the index of the target corresponding to the PUCCH, includes methods.

Method 1-1: in the condition that the target corresponding to the PUCCH is the sub-slot in which the PUCCH transmission is performed, M PUCCH resources in the target PUCCH resource set are divided into N subsets, each subset corresponds to one sub-slot in one slot, and N is the quantity of the sub-slots contained in the slot; and a subset, corresponding to the sub-slot, in the target PUCCH resource set is determined according to an index of the sub-slot in which the PUCCH transmission is performed, and one PUCCH resource is determined from the determined subset according to the PUCCH resource indicator. The PUCCH resource indicator indicates an index of the PUCCH resource in one subset (this index is the index of the PUCCH resource in the subset, not the index in the target PUCCH resource set in the subset, that is, if a PUCCH resource is a first resource in the subset, the index of the PUCCH resource is 0, regardless of which PUCCH resource the PUCCH resource is in the target PUCCH resource set, and so on; and the following similar situations are the same as those described here, which will not be repeated).

Method 1-2: in the condition that the target corresponding to the PUCCH is the TRP corresponding to the PUCCH, M PUCCH resources in the target PUCCH resource set are divided into N subsets, each subset corresponds to one TRP in TRPs, and N is the quantity of the TRPs corresponding to the terminal; and a subset, corresponding to the TRP, in the target PUCCH resource set is determined according to an index of the TRP corresponding to the PUCCH, and one PUCCH resource is determined from the determined subset according to the PUCCH resource indicator. The PUCCH resource indicator indicates an index of the PUCCH resource in one subset.

In the above method 1-1 and the above method 1-2, the dividing the M PUCCH resources in the target PUCCH resource set into the N subsets, for example, includes one of the following manners.

Manner 1: the M PUCCH resources contained in the target PUCCH resource set are evenly divided into the N subsets. M is an integer multiple of N.

Manner 2: a first or last subset includes $$M - \left\lfloor \frac{M}{N} \right\rfloor$$

PUCCH resources and remaining subsets include $$\left\lfloor \frac{M}{N} \right\rfloor$$

PUCCH resources (when M is or is not an integer multiple of N, this manner may be applied).

Manner 3: first (M mod N) or last (M mod N) subsets include $$\left\lceil \frac{M}{N} \right\rceil$$

PUCCH resources, and remaining subsets include $$\left\lfloor \frac{M}{N} \right\rfloor$$

PUCCH resources.

In one embodiment, for the above manners 1-3, each subset is divided in the order of the PUCCH resources contained in the target PUCCH resource set, and the N subsets correspond to N sub-slots in one slot or N TRPs in order, that is, assuming that each subset includes M/N PUCCH resources, the first subset is the first M/N PUCCH resources (for example, the first resource to the (M/N)th resource), corresponding to the first in the N TRPs or the N sub-slots, in the target PUCCH resource set, the second subset is the (M/N+1)th to (2*M/N)$^{th}$ PUCCH resources, corresponding to the second in the N TRPs or the N sub-slots, in the target PUCCH resource set, and so on.

Method 2: continuous P PUCCH resources are determined from the target PUCCH resource set according to the PUCCH resource indicator. One state of the PUCCH resource indicator corresponds to $$P = \left\lceil \frac{R_{PUCCH}}{K} \right\rceil \text{ or } \left\lfloor \frac{R_{PUCCH}}{K} \right\rfloor \text{ or } \frac{R_{PUCCH}}{K}$$

PUCCH resources. One PUCCH resource is determined from the P quantity of PUCCH resources according to the index of the target corresponding to the PUCCH.

In one embodiment, if P>N, it is necessary to further determine one PUCCH resource from the P PUCCH resources according to an index of a control channel element (CCE) of a PDCCH carrying the PUCCH resource indicator, that is, each index of the index of the target corresponding to the PUCCH may correspond to multiple PUCCH resources, and which one of the multiple PUCCH resources to be selected is further determined according to the index of the CCE.

If P=N, each index of the index of the target corresponding to the PUCCH corresponds to one PUCCH resource in the P PUCCH resources, and the PUCCH resource corresponding to one index of the target is determined according to a one-to-one relationship.

If P<N, erial numbers of targets corresponding to multiple PUCCHs correspond to the one PUCCH resource in the P PUCCH resources, and according to the indexes of the targets and a total index, a correspondence relationship between the indexes of the targets and one PUCCH resource of the P PUCCH resources is determined.

For example, an index of the PUCCH resource (for example, the PUCCH resource that needs to be determined finally, namely, the PUCCH resource configured to send the PUCCH) in the target PUCCH resource set may be calculated according to one of the following Formulas 1-4 (for example, in the target PUCCH resource set, the PUCCH resources are numbered consecutively starting from 0). $r_{PUCCH}$ is an index of a PUCCH resource in the target PUCCH resource set, $0 \leq r_{PUCCH} \leq R_{PUCCH}-1$, $R_{PUCCH}$ is the quantity of the PUCCH resources contained in the target PUCCH resource set, $\Delta_{PRI}$ is a value of the PUCCH resource indicator, a range of the value is 0 to K−1, and K is a preset positive integer value (for example may be 8) or a numerical value related to the quantity of bits of the PUCCH resource indicator (for example, the quantity of combined states corresponding to the quantity of the bits of the PUCCH resource indicator, for example, in the case of an A-bit PUCCH resource indicator, $K=2^A$). In Formulas 1-3, it is assumed that P will not exceed N, therefore, the PUCCH resource may be determined directly according to the PUCCH resource indicator and the index of the target corresponding to the PUCCH for PUCCH transmission, without further determining the PUCCH resource according to the CCE. Formula 4 gives different formulas for P not exceeding N and P exceeding N. Of course, the formulas changed to when $\Delta_{PRI} < R_{PUCCH}$ mod K, always use the first formula in Formula 4, no matter $$\left\lceil \frac{R_{PUCCH}}{K} \right\rceil > N \text{ or } \left\lceil \frac{R_{PUCCH}}{K} \right\rceil \leq N,$$

and when $\Delta_{PRI} \geq R_{PUCCH}$ mod K, always use the third formula in Formula 4, no matter $$\left\lfloor \frac{R_{PUCCH}}{K} \right\rfloor > N \text{ or } \left\lfloor \frac{R_{PUCCH}}{K} \right\rfloor \leq N.$$

In the following formulas, if there is always a multiple relationship between $R_{PUCCH}$ and K, operations of round-up $\lceil \; \rceil$, round-down $\lfloor \; \rfloor$ and $R_{PUCCH}$ modK related to the $R_{PUCCH}$ and K operations ("A mod B" is a modulo operation, that is, a remainder obtained by A divided by B) may be removed, and it does not need to be divided into different formulas according to the relationship between $\Delta_{PRI}$ and $R_{PUCCH}$ modK, and calculation is always performed according to the formula of $\Delta_{PRI} \geq R_{PUCCH}$ mod K.

$$r_{PUCCH} = \begin{cases} \left\lfloor \frac{n_{index} \cdot \lceil R_{PUCCH}/K \rceil}{N} \right\rfloor + \Delta_{PRI} \cdot \left\lceil \frac{R_{PUCCH}}{K} \right\rceil & \text{if } \Delta_{PRI} < R_{PUCCH} \text{mod} K \\ \left\lfloor \frac{n_{index} \cdot \lfloor R_{PUCCH}/K \rfloor}{N} \right\rfloor + \Delta_{PRI} \cdot \left\lfloor \frac{R_{PUCCH}}{K} \right\rfloor + R_{PUCCH} \text{mod} K & \text{if } \Delta_{PRI} \geq R_{PUCCH} \text{mod} K \end{cases}$$ Formula 1

$$r_{PUCCH} = \left\lfloor \frac{n_{index} \cdot \lfloor R_{PUCCH}/K \rfloor}{N} \right\rfloor + \Delta_{PRI} \cdot \left\lfloor \frac{R_{PUCCH}}{K} \right\rfloor.$$ Formula 2

$$r_{PUCCH} = \left\lfloor \frac{n_{index} \cdot R_{PUCCH}/K}{N} \right\rfloor + \Delta_{PRI} \cdot \frac{R_{PUCCH}}{K}.$$ Formula 3 when $\Delta_{PRI} < R_{PUCCH} \text{mod} K$ and $\left\lceil \frac{R_{PUCCH}}{K} \right\rceil > N,$ Formula 4

$$r_{PUCCH} = \begin{cases} \left\lfloor \frac{n_{index} \cdot \lceil R_{PUCCH}/K \rceil}{N} \right\rfloor + \left\lfloor \frac{n_{CCE,p} \cdot \lceil \lceil R_{PUCCH}/K \rceil/N \rceil}{N_{CCE,p}} \right\rfloor + \Delta_{PRI} \cdot \left\lceil \frac{R_{PUCCH}}{K} \right\rceil & \text{if } n_{index} < \left\lceil \frac{R_{PUCCH}}{K} \right\rceil \text{mod} N \\ \left\lfloor \frac{n_{index} \cdot \lceil R_{PUCCH}/K \rceil}{N} \right\rfloor + \left\lfloor \frac{n_{CCE,p} \cdot \lfloor \lceil R_{PUCCH}/K \rceil/N \rfloor}{N_{CCE,p}} \right\rfloor + \Delta_{PRI} \cdot \left\lceil \frac{R_{PUCCH}}{K} \right\rceil + \left\lceil \frac{R_{PUCCH}}{K} \right\rceil \text{mod} N & \text{if } n_{index} \geq \left\lceil \frac{R_{PUCCH}}{K} \right\rceil \text{mod} N \end{cases};$$

when $\Delta_{PRI} < R_{PUCCH} \text{mod} K$ and $\left\lceil \frac{R_{PUCCH}}{K} \right\rceil \leq N,$ $$r_{PUCCH} = \left\lfloor \frac{n_{index} \cdot \lceil R_{PUCCH}/K \rceil}{N} \right\rfloor + \Delta_{PRI} \cdot \left\lceil \frac{R_{PUCCH}}{K} \right\rceil;$$

when $\Delta_{PRI} \geq R_{PUCCH} \text{mod} K$ and $\left\lfloor \frac{R_{PUCCH}}{K} \right\rfloor > N,$ $$r_{PUCCH} = \begin{cases} \left\lfloor \frac{n_{index} \cdot \lfloor R_{PUCCH}/K \rfloor}{N} \right\rfloor + \left\lfloor \frac{n_{CCE,p} \cdot \lceil \lfloor R_{PUCCH}/K \rfloor/N \rceil}{N_{CCE,p}} \right\rfloor + \Delta_{PRI} \cdot \left\lfloor \frac{R_{PUCCH}}{K} \right\rfloor & \text{if } n_{index} < \left\lfloor \frac{R_{PUCCH}}{K} \right\rfloor \text{mod} N \\ \left\lfloor \frac{n_{index} \cdot \lfloor R_{PUCCH}/K \rfloor}{N} \right\rfloor + \left\lfloor \frac{n_{CCE,p} \cdot \lfloor \lfloor R_{PUCCH}/K \rfloor/N \rfloor}{N_{CCE,p}} \right\rfloor + \Delta_{PRI} \cdot \left\lfloor \frac{R_{PUCCH}}{K} \right\rfloor + \left\lfloor \frac{R_{PUCCH}}{K} \right\rfloor \text{mod} N + R_{PUCCH} \text{mod} K & \text{if } n_{index} \geq \left\lfloor \frac{R_{PUCCH}}{K} \right\rfloor \text{mod} N \end{cases};$$

and when $\Delta_{PRI} \geq R_{PUCCH} \text{mod} K$ and $\left\lfloor \frac{R_{PUCCH}}{K} \right\rfloor \leq N,$ $$r_{PUCCH} = \left\lfloor \frac{n_{index} \cdot \lfloor R_{PUCCH}/K \rfloor}{N} \right\rfloor + \Delta_{PRI} \cdot \left\lfloor \frac{R_{PUCCH}}{K} \right\rfloor + R_{PUCCH} \text{mod} K.$$

involving the CCE in Formula 4 may also be applied to the case and P does not exceed N, that is, the formulas not containing CCE information in Formula 4, in fact, are obtained by simplification based on the formulas containing CCE information. Therefore, Formula 4 may also be In one embodiment, in the condition that the target corresponding to the PUCCH is the sub-slot in which the PUCCH transmission is performed, $n_{index}$ is an index of each sub-slot in the slot, a range of the value is 0 to N−1, and N is the quantity of sub-slots in one slot.

When the target corresponding to the PUCCH is the TRP corresponding to the PUCCH, $n_{index}$ is an index of each TRP of the N TRPs corresponding to the terminal, a range of the value is 0 to N−1, and N is the quantity of the TRPs corresponding to the terminal.

In one case, $R_{PUCCH}$ is an integer multiple of K, that is, the target PUCCH resource set always includes resources of an integer multiple of K, to ensure that each $\Delta_{PRI}$ state always corresponds to the same quantity of resources, but if the quantity of resources corresponding to each $\Delta_{PRI}$ state is less than N, it means that some of sub-slots in N sub-slots need to correspond to the one resource, and another some of sub-slots each correspond to an independent resource.

In another case, $R_{PUCCH}$=K*N, that is, the target PUCCH resource set always includes K*N resources and it can be guaranteed that one $\Delta_{PRI}$ state always corresponds to N resources, and each resource in the N resources corresponds to one sub-slot in the N sub-slots.

In another case, if the quantity of $R_{PUCCH}$ is not limited, the above case may occur, or the quantity of resources corresponding to different $\Delta_{PRI}$ states may be different, so when determining the PUCCH resources in one sub-slot and the resources are indicated by different $\Delta_{PRI}$ states, correspondence relationships between the sub-slots and the resources are different.

Method 3: T PUCCH resources are determined according to the index of the target corresponding to the PUCCH, the T PUCCH resources correspond to K states of the PUCCH resource indicator, $$T = \left\lceil \frac{R_{PUCCH}}{N} \right\rceil \text{ or } \left\lfloor \frac{R_{PUCCH}}{N} \right\rfloor \text{ or } \frac{R_{PUCCH}}{N},$$

and one PUCCH resource is determined from the T PUCCH resources according to the PUCCH resource indicator.

In one embodiment, if T>K, according to an index of a control channel element (CCE) of the PDCCH providing the PUCCH resource indicator, one PUCCH resource is determined from the T PUCCH resources, that is, each index of the index of the target corresponding to the PUCCH may correspond to multiple PUCCH resources, and which one of the multiple PUCCH resources to be selected is further determined according to the index of the CCE.

If T=K, a state indicated by each PUCCH resource corresponds to one PUCCH resource of the T PUCCH resources, and one PUCCH resource is determined according to a one-to-one relationship.

If T<K, some of the K states of the PUCCH resource indicator are reserved, T states of the K states each correspond to one resource of the T PUCCH resources, and one PUCCH resource is determined according to the one-to-one relationship.

For example, an index of the PUCCH resource in the target PUCCH resource set may be calculated according to one of the following Formulas. $r_{PUCCH}$ is an index of each PUCCH resource in the target PUCCH resource set, $0 \le r_{PUCCH} \le R_{PUCCH}-1$, $R_{PUCCH}$ is the quantity of PUCCH resources contained in the target PUCCH resource set, $\Delta_{PRI}$ is a value of the PUCCH resource indicator, a range of the value is 0 to K−1, K is a preset positive integer value or a numerical value related to the quantity of bits of the PUCCH resource indicator (for example, the quantity of combined states corresponding to the quantity of the bits of the PUCCH resource indicator, for example, in the case of an A-bit PUCCH resource indicator, K=$2^A$), and the specific description of $n_{index}$ is the same as that of the above method 2. In Formulas 5 and 6, it is assumed that T will not exceed K, therefore, the PUCCH resource may be determined directly according to the PUCCH resource indicator and the index of the target corresponding to the PUCCH for PUCCH transmission, without further determining the PUCCH resource according to the CCE. Formula 7 gives different formulas for T (namely $$\left\lceil \frac{R_{PUCCH}}{N} \right\rceil \text{ and } \left\lfloor \frac{R_{PUCCH}}{N} \right\rfloor)$$

not exceeding K and T exceeding K. Of course, the formulas involving the CCE in Formula 7 may also be applied to the case and T does not exceed K, that is, the formulas not containing CCE information in Formula 7, in fact, are obtained by simplification based on the formulas containing CCE information. Therefore, Formula 7 may also be changed to: when $n_{index}$<$R_{PUCCH}$ mod N, always use the first formula in Formula 7, no matter $$\left\lceil \frac{R_{PUCCH}}{N} \right\rceil > K \text{ or } \left\lceil \frac{R_{PUCCH}}{N} \right\rceil \le K,$$

and when $n_{index} \ge R_{PUCCH}$ mod N, always use the third formula in Formula 7, no matter $$\left\lfloor \frac{R_{PUCCH}}{N} \right\rfloor > K \text{ OR } \left\lfloor \frac{R_{PUCCH}}{N} \right\rfloor \le K.$$

In the following formulas, if there is always a multiple relationship between $R_{PUCCH}$ and N, operations of round-up $\lceil \ \rceil$, round-down $\lfloor \ \rfloor$ and $R_{PUCCH}$ modN related to the $R_{PUCCH}$ and N operations may be removed, and it does not need to be divided into different formulas according to the relationship between $n_{index}$ and $R_{PUCCH}$ modN, and calculation is always performed according to the formula of $n_{index} \ge R_{PUCCH}$ mod N.

Formula 5 (assuming $R_{PUCCH}$=K*N, the value of one PUCCH resource indicator corresponds to N resources, and each PUCCH resource corresponds to one target index):

$$r_{PUCCH} = n_{index} \cdot A + \Delta_{PRI},$$

and $$A = K \text{ or } \frac{R_{PUCCH}}{N} \text{ or } \left\lceil \frac{R_{PUCCH}}{N} \right\rceil \text{ or } \left\lfloor \frac{R_{PUCCH}}{N} \right\rfloor.$$

Formula 6 (assuming that $$\left\lceil \frac{R_{PUCCH}}{N} \right\rceil \text{ and } \left\lfloor \frac{R_{PUCCH}}{N} \right\rfloor$$

do not exceed K):

$$r_{PUCCH} = \begin{cases} n_{index} \cdot \left\lceil \frac{R_{PUCCH}}{N} \right\rceil + \Delta_{PRI} & \text{if } n_{index} < R_{PUCCH} \bmod N \\ n_{index} \cdot \left\lfloor \frac{R_{PUCCH}}{N} \right\rfloor + R_{PUCCH} \bmod N + \Delta_{PRI} & \text{if } n_{index} \geq R_{PUCCH} \bmod N \end{cases}$$

Formula 7

$\left( \text{assuming that at least one of } \left\lceil \frac{R_{PUCCH}}{N} \right\rceil \text{ or } \left\lfloor \frac{R_{PUCCH}}{N} \right\rfloor \text{ exceeds } K \right)$:

when $n_{index} < R_{PUCCH} \bmod N$ and $\left\lceil \frac{R_{PUCCH}}{N} \right\rceil > K$, $$r_{PUCCH} = \begin{cases} n_{index} \cdot \left\lceil \frac{R_{PUCCH}}{N} \right\rceil + \left\lfloor \frac{n_{CCE,p} \cdot \lceil \lceil R_{PUCCH}/N \rceil / K \rceil}{N_{CCE,p}} \right\rfloor + \Delta_{PRI} \cdot \lceil \lceil R_{PUCCH}/N \rceil / K \rceil & \text{if } \Delta_{PRI} < \left\lceil \frac{R_{PUCCH}}{N} \right\rceil \bmod K \\ n_{index} \cdot \left\lceil \frac{R_{PUCCH}}{N} \right\rceil + \left\lfloor \frac{n_{CCE,p} \cdot \lfloor \lceil R_{PUCCH}/N \rceil / K \rfloor}{N_{CCE,p}} \right\rfloor + \Delta_{PRI} \cdot \lfloor \lceil R_{PUCCH}/N \rceil / K \rfloor + \left\lceil \frac{R_{PUCCH}}{N} \right\rceil \bmod K & \text{if } \Delta_{PRI} \geq \left\lceil \frac{R_{PUCCH}}{N} \right\rceil \bmod K \end{cases};$$

when $n_{index} < R_{PUCCH} \bmod N$ and $\left\lceil \frac{R_{PUCCH}}{N} \right\rceil \leq K$, $$r_{PUCCH} = n_{index} \cdot \left\lceil \frac{R_{PUCCH}}{N} \right\rceil + \Delta_{PRI};$$

when $n_{index} \geq R_{PUCCH} \bmod N$ and $\left\lfloor \frac{R_{PUCCH}}{N} \right\rfloor > K$, $$r_{PUCCH} = \begin{cases} n_{index} \cdot \left\lfloor \frac{R_{PUCCH}}{N} \right\rfloor + \left\lfloor \frac{n_{CCE,p} \cdot \lceil \lfloor R_{PUCCH}/N \rfloor / K \rceil}{N_{CCE,p}} \right\rfloor + \Delta_{PRI} \cdot \lceil \lfloor R_{PUCCH}/N \rfloor / K \rceil & \text{if } \Delta_{PRI} < \left\lfloor \frac{R_{PUCCH}}{N} \right\rfloor \bmod K \\ n_{index} \cdot \left\lfloor \frac{R_{PUCCH}}{N} \right\rfloor + \left\lfloor \frac{n_{CCE,p} \cdot \lfloor \lfloor R_{PUCCH}/N \rfloor / K \rfloor}{N_{CCE,p}} \right\rfloor + \Delta_{PRI} \cdot \lfloor \lfloor R_{PUCCH}/N \rfloor / K \rfloor + \left\lfloor \frac{R_{PUCCH}}{N} \right\rfloor \bmod K & \text{if } \Delta_{PRI} \geq \left\lfloor \frac{R_{PUCCH}}{N} \right\rfloor \bmod K \end{cases};$$

and when $n_{index} \geq R_{PUCCH} \bmod N$ and $\left\lfloor \frac{R_{PUCCH}}{N} \right\rfloor \leq K$, $$r_{PUCCH} = n_{index} \cdot \left\lfloor \frac{R_{PUCCH}}{N} \right\rfloor + R_{PUCCH} \bmod N + \Delta_{PRI}.$$

Base Station Side Behaviors

Figure 2:
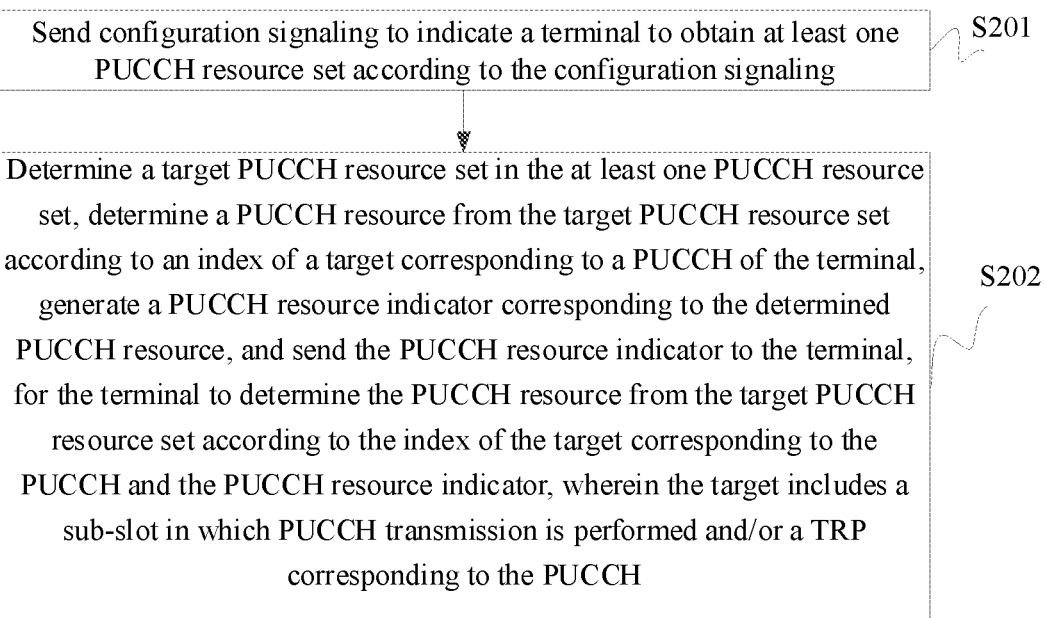
FIG. 2 is a schematic flowchart of a resource determination method at a network side provided according to an embodiment of the present disclosure.

Referring to FIG. 2, a resource determination method provided by an embodiment of the present disclosure, includes the following.

S201, configuration signaling is sent to indicate a terminal to obtain at least one PUCCH resource set according to the configuration signaling.

S202, a target PUCCH resource set is determined, a PUCCH resource is determined from the target PUCCH resource set according to an index of a target corresponding to a PUCCH of the terminal, a PUCCH resource indicator corresponding to the determined PUCCH resource is generated, and the PUCCH resource indicator is sent to the terminal, for the terminal to determine the PUCCH resource from the target PUCCH resource set according to the PUCCH resource indicator and the index of the target corresponding to the PUCCH. The target includes a sub-slot in which PUCCH transmission is performed and/or a TRP corresponding to the PUCCH.

Other behaviors are the same as those at the terminal side, and will not be repeated here.

Exaples of several specific embodiments are given below.

Embodiment 1 (corresponding to the above Method 1-1): assuming that a determined target PUCCH resource set includes M=16 resources and one slot includes N=2 sub-slots, then the first sub-slot corresponds to the 1st to 8th resources in the 16 resources, and the second sub-slot corresponds to the 9th to 16th resources in the 16 resources, and a 3-bit PUCCH resource indicator may indicate indexes 0 to 7, corresponding to 8 resources in the subset corresponding to each sub-slot, as shown in Table 1. For example, if it is determined that a PUCCH is transmitted in the second sub-slot, then the following is performed.

At the base station side: according to the sub-slot corresponding to the PUCCH as the second sub-slot, one PUCCH resource configured to transmit the PUCCH in the second sub-slot is determined from the 8 PUCCH resources (that is, the 9th to 16th resources in the target PUCCH resource set) corresponding to the second sub-slot in the target PUCCH resource set, and a PUCCH resource indicator corresponding to the determined PUCCH resource is generated, for example, the 1st PUCCH resource (that is, the 9th PUCCH resource in the target PUCCH resource set) in the subset corresponding to the second sub-slot is determined, a base station generates "000" as the PUCCH resource indicator, and sends it to a terminal through a PDCCH corresponding to the PUCCH; and the base station receives the PUCCH sent by the terminal in the second sub-slot according to the PUCCH resource determined above.

At the terminal side: the PDCCH corresponding to the PUCCH is received, the PUCCH resource indicator carried in the PDCCH is obtained (when there are PDCCHs corresponding to the PUCCH, the PUCCH resource is determined according to the PUCCH resource indicator carried in the last PDCCH of PDCCHs). According to the sub-slot corresponding to the PUCCH as the second sub-slot, one resource, indicated by the PUCCH resource indicator, of the 8 resources is determined from the 8 PUCCH resources, corresponding to the second sub-slot, in the target PUCCH resource set. According to the PUCCH resource indicator indicated as "000", it is determined that the 1st PUCCH resource in the subset corresponding to the second sub-slot is configured to transmit the PUCCH, that is, the 9th PUCCH resource in the target PUCCH resource set is used for PUCCH transmission.

TABLE 1

| 3-bit PUCCH resource indicator | Index of sub-slot | Index of subset | Subset | Target PUCCH resource set |
|---|---|---|---|---|
| 000 | 0 (1st sub-slot) | 0 (namely, 1st subset corresponds to 1st sub-slot) | 1st PUCCH resource | 1st PUCCH resource |
| 001 | | | 2nd PUCCH resource | 2nd PUCCH resource |
| 010 | | | 3rd PUCCH resource | 3rd PUCCH resource |
| 011 | | | 4th PUCCH resource | 4th PUCCH resource |
| 100 | | | 5th PUCCH resource | 5th PUCCH resource |
| 101 | | | 6th PUCCH resource | 6th PUCCH resource |
| 110 | | | 7th PUCCH resource | 7th PUCCH resource |
| 111 | | | 8th PUCCH resource | 8th PUCCH resource |
| 000 | 1 (2nd sub-slot) | 1 (namely, 2nd subset corresponds to 2nd sub-slot) | 1st PUCCH resource | 9th PUCCH resource |
| 001 | | | 2nd PUCCH resource | 10th PUCCH resource |
| 010 | | | 3rd PUCCH resource | 11th PUCCH resource |
| 011 | | | 4th PUCCH resource | 12th PUCCH resource |
| 100 | | | 5th PUCCH resource | 13th PUCCH resource |
| 101 | | | 6th PUCCH resource | 14th PUCCH resource |
| 110 | | | 7th PUCCH resource | 15th PUCCH resource |
| 111 | | | 8th PUCCH resource | 16th PUCCH resource |

Embodiment 2 (corresponding to the above Method 1-2): assuming that a determined target PUCCH resource set includes M=16 resources and a terminal corresponds to N=2 TRPs, then the first TRP corresponds to the 1st to 8th resources in the 16 resources, and the second TRP corresponds to the 9th to 16th resources in the 16 resources, and a 3-bit PUCCH resource indicator may indicate indexes 0 to 7, corresponding to 8 resources in the subset corresponding to each TRP, as shown in Table 2. For example, if it is determined that a PUCCH is transmitted corresponding to the second TRP, then the following is performed.

At the base station side: according to the TRP corresponding to the PUCCH as the second TRP, one PUCCH resource configured to transmit the PUCCH corresponding to the second TRP is determined from the 8 PUCCH resources (that is, the 9th to 16th resources in the target PUCCH resource set), corresponding to the second TRP, in the target PUCCH resource set, and a PUCCH resource indicator corresponding to the determined PUCCH resource is generated, for example, the 1st PUCCH resource (that is, the 9th PUCCH resource in the target PUCCH resource set) in the subset corresponding to the second TRP is determined, a base station generates "000" as the PUCCH resource indicator, and sends it to the terminal through a PDCCH corresponding to the PUCCH; and the base station receives the PUCCH sent by the terminal and corresponding to the second TRP according to the PUCCH resource determined above.

At the terminal side: the PDCCH corresponding to the PUCCH is received, the PUCCH resource indicator carried in the PDCCH is obtained (when there are PDCCHs corresponding to the PUCCH, the PUCCH resource is determined according to the PUCCH resource indicator carried in the last PDCCH of PDCCHs). According to the TRP corresponding to the PUCCH as the second TRP, one resource, indicated by the PUCCH resource indicator, of the 8 resources is determined from the 8 PUCCH resources, corresponding to the second TRP, in the target PUCCH resource set. According to the PUCCH resource indicator indicated as "000", it is determined that the 1st PUCCH resource in the subset corresponding to the second TRP is configured to transmit the PUCCH corresponding to the second TRP, that is, the 9th PUCCH resource in the target PUCCH resource set is used for PUCCH transmission.

TABLE 2

| 3-bit PUCCH resource indicator | Index of TRP | Index of subset | Subset | Target PUCCH resource set |
|---|---|---|---|---|
| 000 | 0 (1st TRP) | 0 (namely, to 1st TRP) | 1st PUCCH resource | 1st PUCCH resource |
| 001 | | 1st subset corresponds | 2nd PUCCH resource | 2nd PUCCH resource |
| 010 | | | 3rd PUCCH resource | 3rd PUCCH resource |
| 011 | | | 4th PUCCH resource | 4th PUCCH resource |
| 100 | | | 5th PUCCH resource | 5th PUCCH resource |
| 101 | | | 6th PUCCH resource | 6th PUCCH resource |
| 110 | | | 7th PUCCH resource | 7th PUCCH resource |
| 111 | | | 8th PUCCH resource | 8th PUCCH resource |
| 000 | 1 (2nd TRP) | 1 (namely, 2nd subset corresponds to 2nd TRP) | 1st PUCCH resource | 9th PUCCH resource |
| 001 | | | 2nd PUCCH resource | 10th PUCCH resource |
| 010 | | | 3rd PUCCH resource | 11th PUCCH resource |
| 011 | | | 4th PUCCH resource | 12th PUCCH resource |
| 100 | | | 5th PUCCH resource | 13th PUCCH resource |
| 101 | | | 6th PUCCH resource | 14th PUCCH resource |
| 110 | | | 7th PUCCH resource | 15th PUCCH resource |
| 111 | | | 8th PUCCH resource | 16th PUCCH resource |

In Embodiment 1 and Embodiment 2, when it is assumed that the PUCCH resource indicator is the 3-bit indicator, if the quantity of PUCCH resources included in one subset after grouping is less than 8 (that is, the quantity of indication states of the 3-bit PRI), then part of the PRI states is reserved. If the quantity of PUCCH resources included in one subset after grouping exceeds 8, then an index of a CCE of the PDCCH including the PRI may be further combined to determine the PUCCH resource (that is, one PRI state corresponds to multiple PUCCH resources, and which one of the multiple PUCCH resources to be selected may be implicitly determined according to the index of the CCE of the PDCCH).

Embodiment 3 (corresponding to Method 2): assuming that a determined target PUCCH resource set includes $R_{PUCCH}=16$ resources, one slot includes N=2 sub-slots, $n_{index}$ is an index of a sub-slot in one slot, a range of the value is 0 to N−1, a PUCCH resource indicator includes 3-bit indication information, which may indicate K=8 states, the 3-bit PUCCH resource indicator may indicate indexes 0 to 7, and the indication relationship shown in Table 3 may be obtained according to the formula $$r_{PUCCH} = \left\lfloor \frac{n_{index} \cdot R_{PUCCH}/K}{N} \right\rfloor + \Delta_{PRI} \cdot \frac{R_{PUCCH}}{N}.$$

For example, when it is determined that a PUCCH is transmitted in a second sub-slot, that is, $n_{index}=1$, then the following is performed.

At the base station side: according to the above formula, it may be determined that in the target PUCCH resource set, consecutive $$P = \frac{R_{PUCCH}}{K} = 2$$

PUCCH resources correspond to a value of a PRI (namely, $\Delta_{PRI}$ value), as shown in Table 3, and K PUCCH resources corresponding to each sub-slot can be obtained. For example, for a first sub-slot, corresponding to 8 PUCCH resources, i.e., 1st, 3rd, 5th, 7th, 9th, 11th, 13th and 15th PDCCH resource, in the target PUCCH resource set, and for the second sub-slot, corresponding to 8 PUCCH resources, i.e., 2nd, 4th, 6th, 8th, 10th, 12th, 14th and 16th PDCCH resource, in the target PUCCH resource set. A base station determines one PUCCH resource from the 8 PUCCH resources corresponding to the second sub-slot to transmit the PUCCH in the second sub-slot, e.g., determines the 2nd PUCCH resource, i.e., the PUCCH resource with an index $r_{PUCCH}=1$, in the target PUCCH resource set. Then the base station generates a PRI corresponding to this PUCCH resource as "000", and sends it to a terminal through a PDCCH corresponding to the PUCCH; and the base station receives the PUCCH sent by the terminal in the second sub-slot according to the PUCCH resource determined above.

At the terminal side: the PDCCH corresponding to the PUCCH is received, the PUCCH resource indicator carried in the PDCCH is obtained (when there are PDCCHs corresponding to the PUCCH, the PUCCH resource is determined according to the PUCCH resource indicator carried in the last PDCCH of PDCCHs). According to the PUCCH resource indicator indicated as "000" (namely, $\Delta_{PRI}=0$) and the index $n_{index}=1$ of the sub-slot corresponding to the PUCCH, $r_{PUCCH}=1$ may be calculated according to the formula, which means that the 2nd PUCCH resource in the target PUCCH resource set is used for PUCCH transmission.

For another example, when it is determined that the PUCCH is transmitted in the first sub-slot, that is, $n_{index}=0$, then the following is performed.

At the base station side: the 8 PUCCH resources corresponding to each sub-slot are determined in the same manner as above, and the base station determines one PUCCH resource from the 8 PUCCH resources corresponding to the first sub-slot to transmit the PUCCH in the first sub-slot. For example, the 7th PUCCH resource, i.e., the PUCCH resource with an index $r_{PUCCH}=6$, in the PUCCH resource set is determined. The base station generates a PRI corresponding to the PUCCH resource as "011", and sends it to the terminal through a PDCCH corresponding to the PUCCH; and the base station receives the PUCCH sent by the terminal in the first sub-slot according to the PUCCH resource determined above.

At the terminal side: the PDCCH corresponding to the PUCCH is received, the PUCCH resource indicator carried in the PDCCH is obtained (when there are PDCCHs corresponding to the PUCCH, the PUCCH resource is determined according to the PUCCH resource indicator carried in the last PDCCH of PDCCHs). According to the PUCCH resource indicator indicated as "011" (namely, $\Delta_{PRI}$ 3) and the index $n_{index}=0$ of the sub-slot corresponding to the PUCCH, $r_{PUCCH}=6$ may be calculated according to the formula, which means that the 7th PUCCH resource in the target PUCCH resource set is used for PUCCH transmission.

TABLE 3

| PRI state (K = 8) | $\Delta_{PRI}$ | Index of sub-slot ($n_{index}$) | Index of PUCCH resource ($r_{PUCCH}$) | Target PUCCH resource set ($R_{PUCCH}$ = 16) |
|---|---|---|---|---|
| 000 | 0 | 0 | r_PUCCH = 0 | 1st PUCCH resource |
|  |  | 1 | r_PUCCH = 1 | 2nd PUCCH resource |
| 001 | 1 | 0 | r_PUCCH = 2 | 3rd PUCCH resource |
|  |  | 1 | r_PUCCH = 3 | 4th PUCCH resource |
| 010 | 2 | 0 | r_PUCCH = 4 | 5th PUCCH resource |
|  |  | 1 | r_PUCCH = 5 | 6th PUCCH resource |
| 011 | 3 | 0 | r_PUCCH = 6 | 7th PUCCH resource |
|  |  | 1 | r_PUCCH = 7 | 8th PUCCH resource |
| 100 | 4 | 0 | r_PUCCH = 8 | 9th PUCCH resource |
|  |  | 1 | r_PUCCH = 9 | 10th PUCCH resource |
| 101 | 5 | 0 | r_PUCCH = 10 | 11th PUCCH resource |
|  |  | 1 | r_PUCCH = 11 | 12th PUCCH resource |
| 110 | 6 | 0 | r_PUCCH = 12 | 13th PUCCH resource |
|  |  | 1 | r_PUCCH = 13 | 14th PUCCH resource |
| 111 | 7 | 0 | r_PUCCH = 14 | 15th PUCCH resource |
|  |  | 1 | r_PUCCH = 15 | 16th PUCCH resource |

Embodiment 4 (corresponding to Method 2): assuming that a determined target PUCCH resource set includes $R_{PUCCH}=16$ resources, a terminal corresponds to N=2 TRPs, $n_{index}$ is an index of a TRP corresponding to the terminal, a range of the $n_{index}$ is 0 to N−1, a PUCCH resource indicator includes 3-bit indication information, which may indicate K=8 states, the 3-bit PUCCH resource indicator may indicate indexes 0 to 7, and the indication relationship shown in Table 3 (just replace the index of the sub-slot in Table 3 with the index of the TRP) may be obtained according to the formula $$r_{PUCCH} = \left\lfloor \frac{n_{index} \cdot R_{PUCCH}/K}{N} \right\rfloor + \Delta_{PRI} \cdot \frac{R_{PUCCH}}{K}.$$

For example, when it is determined that a PUCCH corresponds to a second TRP, that is, $n_{index}=1$, then the following is performed.

At the base station side: according to the above formula, it may be determined that in the target PUCCH resource set, consecutive $$P = \frac{R_{PUCCH}}{K} = 2$$

PUCCH resources correspond to a value of a PRI (namely, $\Delta_{PRI}$ value), as shown in Table 3, and K PUCCH resources corresponding to each TRP can be obtained. For example, for a first TRP, corresponding to 8 PUCCH resources, i.e., 1st, 3rd, 5th, 7th, 9th, 11th, 13th and 15th PDCCH resource, in the target PUCCH resource set, and for the second TRP, corresponding to 8 PUCCH resources, i.e., 2nd, 4th, 6th, 8th, 10th, 12th, 14th and 16th PDCCH resource, in the target PUCCH resource set. A base station determines one PUCCH resource from the 8 PUCCH resources corresponding to the second TRP to transmit the PUCCH corresponding to the second TRP, e.g., determines the 2nd PUCCH resource, i.e., the PUCCH resource with an index $r_{PUCCH}=1$, in the target PUCCH resource set. Then the base station generates a PRI corresponding to this PUCCH resource as "000", and sends it to the terminal through a PDCCH corresponding to the PUCCH; and the base station receives the PUCCH sent by the terminal and corresponding to the second TRP according to the PUCCH resource determined above.

At the terminal side: the PDCCH corresponding to the PUCCH is received, the PUCCH resource indicator carried in the PDCCH is obtained (when there are PDCCHs corresponding to the PUCCH, the PUCCH resource is determined according to the PUCCH resource indicator carried in the last PDCCH of PDCCHs). According to the PUCCH resource indicator indicated as "000" (namely, $\Delta_{PRI}=0$) and the index $n_{index}=1$ of the TRP corresponding to the PUCCH, $r_{PUCCH}=1$ may be calculated according to the formula, which means that the 2nd PUCCH resource in the target PUCCH resource set is used for transmission of the PUCCH corresponding to the second TRP.

For another example, when it is determined that the PUCCH corresponds to the first TRP, that is, $n_{index}=0$, then the following is performed.

At the base station side: the 8 PUCCH resources corresponding to each TRP are determined in the same manner as above, and the base station determines one PUCCH resource from the 8 PUCCH resources corresponding to the first TRP to transmit the PUCCH in the first TRP. For example, the 7th PUCCH resource, i.e., the PUCCH resource with an index $r_{PUCCH}=6$, in the PUCCH resource set is determined. The base station generates a PRI corresponding to this PUCCH resource as "011", and sends it to the terminal through a PDCCH corresponding to the PUCCH; and the base station receives the PUCCH sent by the terminal and corresponding to the first TRP according to the PUCCH resource determined above.

At the terminal side: the PDCCH corresponding to the PUCCH is received, the PUCCH resource indicator carried in the PDCCH is obtained (when there are PDCCHs corresponding to the PUCCH, the PUCCH resource is determined according to the PUCCH resource indicator carried in the last PDCCH of PDCCHs). According to the PUCCH resource indicator indicated as "011" (namely, $\Delta_{PRI}=3$) and the index $n_{index}=0$ of the TRP corresponding to the PUCCH, $r_{PUCCH}=6$ may be calculated according to the formula, which means that the 7th PUCCH resource in the target PUCCH resource set is used for transmission of the PUCCH corresponding to the first TRP.

Embodiment 5 (corresponding to Method 3): assuming that a determined target PUCCH resource set includes $R_{PUCCH}=16$ (namely, $R_{PUCCH}=N*K$) resources, one slot includes N=2 sub-slots, $n_{index}$ is an index of the sub-slot in one slot, a range of the $n_{index}$ is 0 to N−1, a PUCCH resource indicator includes 3-bit indication information, which may indicate K=8 states, the 3-bit PUCCH resource indicator may indicate indexes 0 to 7, and the indication relationship shown in Table 4 may be obtained according to the formula $r^{PUCCH}=n_{index} \cdot K + \Delta_{PRI}$. For example, when it is determined that a PUCCH is transmitted in a second sub-slot, that is, $n_{index}=1$, the following is performed.

At the base station side: according to the above formula, it may be determined that in the target PUCCH resource set, consecutive K=8 PUCCH resources correspond to one sub-slot, a value of a PRI (namely, $\Delta_{PRI}$ value) indicates one of K PUCCH resources corresponding to one sub-slot, as shown in Table 4. And the K PUCCH resources corresponding to each sub-slot can be obtained. For example, for a first sub-slot, corresponding to 8 PUCCH resources, i.e., 1st to 8th PUCCH resources, in the target PUCCH resource set, and for the second sub-slot, corresponding to 8 PUCCH resources, i.e., 9th to 16th PUCCH resources, in the target PUCCH resource set. A base station determines one PUCCH resource from the 8 PUCCH resources corresponding to the second sub-slot to transmit the PUCCH in the second sub-slot. For example, the 9th PUCCH resource, i.e., the PUCCH resource with an index $r_{PUCCH}=8$, in the target PUCCH resource set is determined. Then the base station generates a PRI corresponding to this PUCCH resource as "000", and sends it to a terminal through a PDCCH corresponding to the PUCCH; and the base station receives the PUCCH sent by the terminal in the second sub-slot according to the PUCCH resource determined above.

At the terminal side: the PDCCH corresponding to the PUCCH is received, the PUCCH resource indicator carried in the PDCCH is obtained (when there are PDCCHs corresponding to the PUCCH, the PUCCH resource is determined according to the PUCCH resource indicator carried in the last PDCCH of PDCCHs). According to the PUCCH resource indicator indicated as "000" (namely, $\Delta_{PRI}=0$) and the index $n_{index}=1$ of the sub-slot corresponding to the PUCCH, $r_{PUCCH}=8$ may be calculated according to the formula, which means that the 9th PUCCH resource in the target PUCCH resource set is used for PUCCH transmission in the second sub-slot.

For another example, when it is determined that the PUCCH is transmitted in the first sub-slot, that is, $n_{index}=0$, then the following is performed.

At the base station side: the 8 PUCCH resources corresponding to each sub-slot are determined in the same manner as above, and the base station determines one PUCCH resource from the 8 PUCCH resources corresponding to the first sub-slot to transmit the PUCCH in the first sub-slot. For example, the 4th PUCCH resource, i.e., the PUCCH resource with an index $r_{PUCCH}=3$, in the PUCCH resource set is determined. The base station generates a PRI corresponding to the PUCCH resource as "011", and sends it to the terminal through a PDCCH corresponding to the PUCCH; and the base station receives the PUCCH sent by the terminal in the first sub-slot according to the PUCCH resource determined above.

At the terminal side: the PDCCH corresponding to the PUCCH is received, the PUCCH resource indicator carried in the PDCCH is obtained (when there are PDCCHs corresponding to the PUCCH, the PUCCH resource is determined according to the PUCCH resource indicator carried in the last PDCCH of PDCCHs). A according to the PUCCH resource indicator indicated as "011" (namely, $\Delta_{PRI}=3$) and the index $n_{index}=0$ of the sub-slot corresponding to the PUCCH, $r_{PUCCH}=3$ may be calculated according to the formula, which means that the 4th PUCCH resource in the target PUCCH resource set is used for PUCCH transmission in the first sub-slot.

TABLE 4

| PRI state (K = 8) | $\Delta_{PRI}$ | Index of sub-slot ($n_{index}$) | Index of PUCCH resource ($r_{PUCCH}$) | Target PUCCH resource set ($R_{PUCCH}$) = 16 |
|---|---|---|---|---|
| 000 | 0 | 0 (1st sub-slot) | r_PUCCH = 0 | 1st PUCCH resource |
| 001 | 1 | | r_PUCCH = 1 | 2nd PUCCH resource |
| 010 | 2 | | r_PUCCH = 2 | 3rd PUCCH resource |

TABLE 4-continued

| PRI state (K = 8) | $\Delta_{PRI}$ | Index of sub-slot ($n_{index}$) | Index of PUCCH resource ($r_{PUCCH}$) | Target PUCCH resource set ($R_{PUCCH}$) = 16 |
|---|---|---|---|---|
| 011 | 3 | | r_PUCCH = 3 | 4th PUCCH resource |
| 100 | 4 | | r_PUCCH = 4 | 5th PUCCH resource |
| 101 | 5 | | r_PUCCH = 5 | 6th PUCCH resource |
| 110 | 6 | | r_PUCCH = 6 | 7th PUCCH resource |
| 111 | 7 | | r_PUCCH = 7 | 8th PUCCH resource |
| 000 | 0 | 1 (2nd sub-slot) | r_PUCCH = 8 | 9th PUCCH resource |
| 001 | 1 | | r_PUCCH = 9 | 10th PUCCH resource |
| 010 | 2 | | r_PUCCH = 10 | 11th PUCCH resource |
| 011 | 3 | | r_PUCCH = 11 | 12th PUCCH resource |
| 100 | 4 | | r_PUCCH = 12 | 13th PUCCH resource |
| 101 | 5 | | r_PUCCH = 13 | 14th PUCCH resource |
| 110 | 6 | | r_PUCCH = 14 | 15th PUCCH resource |
| 111 | 7 | | r_PUCCH = 15 | 16th PUCCH resource |

Embodiment 6 (corresponding to Method 3): assuming that a determined target PUCCH resource set includes $R_{PUCCH}=16$ (namely, $R_{PUCCH}=N*K$) resources, a terminal corresponds to N=2 TRPs, $n_{index}$ is an index of a TRP corresponding to the terminal, a range of the $n_{index}$ is 0 to N−1, a PUCCH resource indicator includes 3-bit indication information, which may indicate K=8 states, the 3-bit PUCCH resource indicator may indicate indexes 0 to 7, and the indication relationship shown in Table 4 may be obtained according to the formula $r_{PUCCH}=n_{index} \cdot K + \Delta_{PRI}$ (replacing the index of the sub-slot with the index of the TRP). For example, when it is determined that a PUCCH corresponds to a second TRP, that is, $n_{index}=1$, then the following is performed.

At the base station side: according to the above formula, it may be determined that in the target PUCCH resource set, consecutive K=8 PUCCH resources correspond to a TRP, a value of a PRI (namely, $\Delta_{PRI}$ value) indicates one of K PUCCH resources corresponding to one TRP, as shown in Table 4. And the K PUCCH resources corresponding to each TRP can be obtained. For example, for a first TRP, corresponding to 8 PUCCH resources, i.e., 1st to 8th PUCCH resources, in the target PUCCH resource set, and for the second TRP, corresponding to 8 PUCCH resources, i.e., 9th to 16th PUCCH resources, in the target PUCCH resource set. A base station determines one PUCCH resource from the 8 PUCCH resources corresponding to the second TRP to transmit the PUCCH corresponding to the second TRP. For example, the 9th UCCH resource, i.e., the PUCCH resource with an index $r_{PUCCH}=8$, in the target PUCCH resource set is determined. Then the base station generates a PRI corresponding to this PUCCH resource as "000", and sends it to the terminal through a PDCCH corresponding to the PUCCH; and the base station receives the PUCCH sent by the terminal and corresponding to the second TRP according to the PUCCH resource determined above.

At the terminal side: the PDCCH corresponding to the PUCCH is received, the PUCCH resource indicator carried in the PDCCH is obtained (when there are PDCCHs corresponding to the PUCCH, the PUCCH resource is determined according to the PUCCH resource indicator carried in the last PDCCH of PDCCHs). According to the PUCCH resource indicator indicated as "000" (namely, $\Delta_{PRI}=0$) and the index $n_{index}=1$ of the TRP corresponding to the PUCCH, $r_{PUCCH}=8$ may be calculated according to the formula, which means that the 9th PUCCH resource in the target PUCCH resource set is used for transmission of the PUCCH corresponding to the second TRP.

For another example, when it is determined that the PUCCH corresponds to the first TRP, that is, $n_{index}=0$, then the following is performed.

At the base station side: the 8 PUCCH resources corresponding to each TRP are determined in the same manner as above, and the base station determines one PUCCH resource from the 8 PUCCH resources corresponding to the first TRP to transmit the PUCCH in the first TRP. For example, the 4th PUCCH resource, i.e., the PUCCH resource with an index $r_{PUCCH}=3$ in the PUCCH resource set is determined. The base station generates a PRI corresponding to this PUCCH resource as "011", and sends it to the terminal through a PDCCH corresponding to the PUCCH; and the base station receives the PUCCH sent by the terminal and corresponding to the first TRP according to the PUCCH resource determined above.

At the terminal side: the PDCCH corresponding to the PUCCH is received, the PUCCH resource indicator carried in the PDCCH is obtained (when there are PDCCHs corresponding to the PUCCH, the PUCCH resource is determined according to the PUCCH resource indicator carried in the last PDCCH of PDCCHs). According to the PUCCH resource indicator indicated as "011" (namely, $\Delta_{PRI}=3$) and the index $n_{index}=0$ of the TRP corresponding to the PUCCH, $r_{PUCCH}=3$ may be calculated according to the formula, which means that the 4th PUCCH resource in the target PUCCH resource set is used for transmission of the PUCCH corresponding to the first TRP.

When the PUCCH of one terminal is transmitted based on the sub-slots, one slot includes N1 sub-slots, and the terminal also corresponds to TRPs (for example, N2 TRPs), the following manners may be used.

Manner A: at least one PUCCH resource set is independently configured for each sub-slot. In a target sub-slot in which PUCCH transmission is performed, one target PUCCH resource set is determined from the at least one PUCCH resource set corresponding to the target sub-slot. A PUCCH resource is determined from the target PUCCH resource set according to a PUCCH resource indicator and an index of a TRP corresponding to a PUCCH, that is, in each sub-slot, the PUCCH resource corresponding to one TRP in one sub-slot is determined according to the above manner that TRPs exist.

For example, if one slot includes N1=4 sub-slots, and one terminal corresponds to N2=2 TRPs, then a group of PUCCH resource sets may be configured for each sub-slot, and may include one or more PUCCH resource sets. For example, if it is determined that the PUCCH is transmitted in a second sub-slot, and the PUCCH corresponds to a second TRP, then the following is performed.

At the base station side: the target PUCCH resource set is determined from the PUCCH resource set corresponding to the second sub-slot, and the subsequent steps are the same as those in Embodiments 2, 4 and 6. The target PUCCH resource set is the target resource set corresponding to the second sub-slot, and the base station receives the PUCCH corresponding to the second TRP and sent by the terminal in the second sub-slot according to the PUCCH resource determined in the manner in Embodiments 2, 4 and 6.

At the terminal side: the target PUCCH resource set is determined from the PUCCH resource set corresponding to the second sub-slot, and the subsequent steps are the same as those in Embodiments 2, 4 and 6. The target PUCCH resource set is the target resource set corresponding to the second sub-slot, and the terminal sends the PUCCH corresponding to the second TRP according to the PUCCH resource determined in the manner in Embodiments 2, 4 and 6.

Manner B: at least one PUCCH resource set is independently configured for each TRP. A target PUCCH resource set is determined from at least one PUCCH resource set corresponding to a target TRP corresponding to a PUCCH. A PUCCH resource is determined from the target PUCCH resource set according to a PUCCH resource indicator and an index of the sub-slot corresponding to the PUCCH, that is, for the PUCCH corresponding to different TRPs, the PUCCH resource of the PUCCH corresponding to one TRP in one sub-slot is determined according to the above manner that sub-slots exist.

For example, if one slot includes N1=4 sub-slots, and one terminal corresponds to N2=2 TRPs, then a group of PUCCH resource sets may be configured for each TRP, and may include one or more PUCCH resource sets. For example, if it is determined that the PUCCH corresponds to the second TRP and is transmitted in the second sub-slot, then the following is performed.

At the base station side: the target PUCCH resource set is determined from the PUCCH resource set corresponding to the second TRP, and the subsequent steps are the same as those in Embodiments 1, 3 and 5. The target PUCCH resource set is the target resource set corresponding to the second TRP, and the base station receives the PUCCH corresponding to the second TRP and sent by the terminal in the second sub-slot according to the PUCCH resource determined in the manner in Embodiments 1, 3 and 5.

At the terminal side: the target PUCCH resource set is determined from the PUCCH resource set corresponding to the second TRP, and the subsequent steps are the same as those in Embodiments 1, 3 and 5. The target PUCCH resource set is the target resource set corresponding to the second TRP, and the terminal sends the PUCCH corresponding to the second TRP according to the PUCCH resource determined in the manner in Embodiments 1, 3 and 5.

Manner C: M PUCCH resources in the target PUCCH resource set are divided into N subsets, each subset corresponds to one sub-slot in one slot and one TRP, N1 is the quantity of the sub-slots contained in one slot, and N2 is the quantity of the TRPs corresponding to the terminal. A joint index is determined according to an index of the sub-slot in which the PUCCH transmission is performed and an index of the TRP corresponding to the PUCCH. A subset, corresponding to the TRP and the sub-slot, in the target PUCCH resource set is determined according to the joint index. One PUCCH resource is determined from the determined subset according to the PUCCH resource indicator, and the PUCCH resource indicator indicates an index of the PUCCH resource in one subset. That is, the above manner of determining the PUCCH resource based on the sub-slot index (Method 1-1) and the TRP index (Method 1-2) is used in combination, by replacing the above N with N1*N2, by replacing the above $n_{index}$ with $n_{index}$ which are joint indexes of N1 sub-slots and N2 TRPs.

For example, when N1=4 and N2=2, according to the correspondence relationship between $n_{index}$ and the joint index in Table 5 or Table 6, the PUCCH resource is determined by using the method combined in Embodiments 1 and 2. When N1=4 and N2=2, it is assumed that the target PUCCH resource set includes 64 resources, that is, the 64 PUCCH resources are divided into N=N1*N2=8 subsets, each subset includes 8 PUCCH resources. According to the index of the sub-slot corresponding to the PUCCH and the index of the TRP corresponding to the PUCCH, the joint index is determined as shown in Table 5 or Table 6. For example, if the PUCCH is transmitted in the second sub-slot and corresponds to the second TRP, the joint index $n_{index}$=3 is determined according to Table 5, and the subset corresponding to the joint index is the 4th subset of the 8 subsets that the target PUCCH resource set is divided into, and one PUCCH resource is determined from this subset according to the PUCCH resource indicator. For example, the PUCCH resource indicator is "000", which means the 1st PUCCH resource in this subset, that is, the 25th PUCCH resource in the target PUCCH resource set, as shown in Table 7.

TABLE 5

| $n_{index}$ | Index of sub-slot | Index of TRP |
|---|---|---|
| 0 | 0 | 0 |
| 1 | 0 | 1 |
| 2 | 1 | 0 |
| 3 | 1 | 1 |
| 4 | 2 | 0 |
| 5 | 2 | 1 |
| 6 | 3 | 0 |
| 7 | 3 | 1 |

TABLE 6

| $n_{index}$ | Index of sub-slot | Index of TRP |
|---|---|---|
| 0 | 0 | 0 |
| 1 | 1 | 0 |
| 2 | 2 | 0 |
| 3 | 3 | 0 |
| 4 | 0 | 1 |
| 5 | 1 | 1 |
| 6 | 2 | 1 |
| 7 | 3 | 1 |

TABLE 7

(Assuming that a joint index is based on Table 5)

| 3-bit PUCCH resource indicator | Joint index | Index of subset | Subset | Target PUCCH resource set |
|---|---|---|---|---|
| 000 | 0 (1st sub-slot, 1st TRP) | 0 (1st subset) | 1st PUCCH resource | 1st PUCCH resource |
| 001 | | | 2nd PUCCH resource | 2nd PUCCH resource |
| 010 | | | 3rd PUCCH resource | 3rd PUCCH resource |
| 011 | | | 4th PUCCH resource | 4th PUCCH resource |
| 100 | | | 5th PUCCH resource | 5th PUCCH resource |
| 101 | | | 6th PUCCH resource | 6th PUCCH resource |
| 110 | | | 7th PUCCH resource | 7th PUCCH resource |
| 111 | | | 8th PUCCH resource | 8th PUCCH resource |
| 000 | 1 (1st sub-slot, 2nd TRP) | 1 (2nd subset) | 1st PUCCH resource | 9th PUCCH resource |
| 001 | | | 2nd PUCCH resource | 10th PUCCH resource |
| 010 | | | 3rd PUCCH resource | 11th PUCCH resource |
| 011 | | | 4th PUCCH resource | 12th PUCCH resource |
| 100 | | | 5th PUCCH resource | 13th PUCCH resource |
| 101 | | | 6th PUCCH resource | 14th PUCCH resource |
| 110 | | | 7th PUCCH resource | 15th PUCCH resource |
| 111 | | | 8th PUCCH resource | 16th PUCCH resource |
| 000 | 2 (2nd | 2 (3rd | 1st PUCCH resource | 17th PUCCH resource |

TABLE 7-continued (Assuming that a joint index is based on Table 5)

| 3-bit PUCCH resource indicator | Joint index | Index of subset | Subset | Target PUCCH resource set |
|---|---|---|---|---|
| 001 | sub-slot, | subset) | 2nd PUCCH resource | 18th PUCCH resource |
| 010 | 1st | | 3rd PUCCH resource | 19th PUCCH resource |
| 011 | TRP) | | 4th PUCCH resource | 20th PUCCH resource |
| 100 | | | 5th PUCCH resource | 21st PUCCH resource |
| 101 | | | 6th PUCCH resource | 22nd PUCCH resource |
| 110 | | | 7th PUCCH resource | 23rd PUCCH resource |
| 111 | | | 8th PUCCH resource | 24th PUCCH resource |
| 000 | 3 (2nd | 3 (4th | 1st PUCCH resource | 25th PUCCH resource |
| 001 | sub-slot, | subset) | 2nd PUCCH resource | 26th PUCCH resource |
| 010 | 2nd | | 3rd PUCCH resource | 27th PUCCH resource |
| 011 | TRP) | | 4th PUCCH resource | 28th PUCCH resource |
| 100 | | | 5th PUCCH resource | 29th PUCCH resource |
| 101 | | | 6th PUCCH resource | 30th PUCCH resource |
| 110 | | | 7th PUCCH resource | 31st PUCCH resource |
| 111 | | | 8th PUCCH resource | 32nd PUCCH resource |
| 000 | 4 (3rd | 4 (5th | 1st PUCCH resource | 33rd PUCCH resource |
| 001 | sub-slot, | subset) | 2nd PUCCH resource | 34th PUCCH resource |
| 010 | 1st | | 3rd PUCCH resource | 35th PUCCH resource |
| 011 | TRP) | | 4th PUCCH resource | 36th PUCCH resource |
| 100 | | | 5th PUCCH resource | 37th PUCCH resource |
| 101 | | | 6th PUCCH resource | 38th PUCCH resource |
| 110 | | | 7th PUCCH resource | 39th PUCCH resource |
| 111 | | | 8th PUCCH resource | 40th PUCCH resource |
| 000 | 5 (3rd | 5 (6th | 1st PUCCH resource | 41st PUCCH resource |
| 001 | sub-slot, | subset) | 2nd PUCCH resource | 42nd PUCCH resource |
| 010 | 2nd | | 3rd PUCCH resource | 43rd PUCCH resource |
| 011 | TRP) | | 4th PUCCH resource | 44th PUCCH resource |
| 100 | | | 5th PUCCH resource | 45th PUCCH resource |
| 101 | | | 6th PUCCH resource | 46th PUCCH resource |
| 110 | | | 7th PUCCH resource | 47th PUCCH resource |
| 111 | | | 8th PUCCH resource | 48th PUCCH resource |
| 000 | 6 (4th | 6 (7th | 1st PUCCH resource | 49th PUCCH resource |
| 001 | sub-slot, | subset) | 2nd PUCCH resource | 50th PUCCH resource |
| 010 | 1st | | 3rd PUCCH resource | 51st PUCCH resource |
| 011 | TRP) | | 4th PUCCH resource | 52nd PUCCH resource |
| 100 | | | 5th PUCCH resource | 53rd PUCCH resource |
| 101 | | | 6th PUCCH resource | 54th PUCCH resource |
| 110 | | | 7th PUCCH resource | 55th PUCCH resource |
| 111 | | | 8th PUCCH resource | 56th PUCCH resource |
| 000 | 7 (4th | 7 (8th | 1st PUCCH resource | 57th PUCCH resource |
| 001 | sub-slot, | subset) | 2nd PUCCH resource | 58th PUCCH resource |
| 010 | 2nd | | 3rd PUCCH resource | 59th PUCCH resource |
| 011 | TRP) | | 4th PUCCH resource | 60th PUCCH resource |
| 100 | | | 5th PUCCH resource | 61st PUCCH resource |
| 101 | | | 6th PUCCH resource | 62nd PUCCH resource |
| 110 | | | 7th PUCCH resource | 63rd PUCCH resource |
| 111 | | | 8th PUCCH resource | 64th PUCCH resource |

Manner D: Method 2 and Method 3 are reused, N is replaced with N1*N2, $n_{index}$ is replaced with $n_{index}$ which is the joint indexes of the N1 sub-slots and the N2 TRPs.

For example, when N1=4 and N2=2, according to the correspondence relationship between $n_{index}$ and the joint index in Table 5 or Table 6. For Method 2, the PUCCH resource is determined by reusing the method of combining Embodiments 3 and 4. For Method 3, the PUCCH resource is determined by reusing the method of combining Embodiments 5 and 6.

For example, for Method 2, when N1=4 and N2=2, it is assumed that the target PUCCH resource set includes 64 resources. When it is determined that the PUCCH is transmitted in the second sub-slot and corresponds to the second TRP, that is, $n_{index}=3$ is determined according to Table 5, then the following is performed.

At the base station side: according to the formulas in Embodiments 3 and 4, it may be determined that in the target PUCCH resource set, consecutive $$P = \frac{R_{PUCCH}}{K} = 8$$

PUCCH resources correspond to a value of a PRI (namely, $A_{PRI}$ value), as shown in Table 8. And K PUCCH resources corresponding to each joint index (namely, a combination corresponding to one sub-slot and one TRP) can be obtained. For example, for a first joint index (namely, a first sub-slot and a first TRP), corresponding to 8 PUCCH resources, i.e., 1st, 9th, 17th, 25th, 33th, 41th, 49th and 57th PUCCH resources, in the target PUCCH resource set, and for a second joint index (namely, the first sub-slot and the second TRP), corresponding to 8 PUCCH resources, i.e., 2nd, 10th, 18th, 26th, 34th, 42nd, 50th and 58th PUCCH resources, in the target PUCCH resource set, and so on. The base station determines a PUCCH resource from the 8 PUCCH resources corresponding to the joint index $n_{index}=3$ to transmit the PUCCH in the second sub-slot and corresponding to the second TRP. For example, the 4th PUCCH resource, i.e., the PUCCH resource with an index $r_{PUCCH}=3$, in the target PUCCH resource set is determined. Then the base station generates a PRI corresponding to this PUCCH resource as "000", and sends it to the terminal through a PDCCH corresponding to the PUCCH; and the base station receives the PUCCH sent by the terminal and corresponding to the second TRP in the second sub-slot according to the PUCCH resource determined above.

At the terminal side: the PDCCH corresponding to the PUCCH is received, the PUCCH resource indicator carried in the PDCCH is obtained (when there are PDCCHs corresponding to the PUCCH, the PUCCH resource is determined according to the PUCCH resource indicator carried in the last PDCCH of PDCCHs). According to the PUCCH resource indicator indicated as "000" (namely, $A_{PRI}=0$) and the joint index $n_{index}=3$ corresponding to the PUCCH, $r_{PUCCH}=3$ may be calculated according to the formula, which means that the 4th PUCCH resource in the target PUCCH resource set is used for transmission of the PUCCH corresponding to the second TRP in the second sub-slot.

TABLE 8

| PRI state (K = 8) | $A_{PRI}$ | Joint index ($n_{index}$) | Index of PUCCH resource ($r_{PUCCH}$) | Target PUCCH resource set |
|---|---|---|---|---|
| 000 | 0 | 0 | r_PUCCH = 0 | 1st PUCCH resource |
| | | | r_PUCCH = 1 | 2nd PUCCH resource |
| | | | r PUCCH = 2 | 3rd PUCCH resource |
| | | | r_PUCCH = 3 | 4th PUCCH resource |
| | | | r_PUCCH = 4 | 5th PUCCH resource |
| | | | r_PUCCH = 5 | 6th PUCCH resource |
| | | | r_PUCCH = 6 | 7th PUCCH resource |
| | | | r_PUCCH = 7 | 8th PUCCH resource |
| 001 | 1 | 0 | r_PUCCH = 8 | 9th PUCCH resource |
| | | | r_PUCCH = 9 | 10th PUCCH resource |
| | | | r_PUCCH = 10 | 11th PUCCH resource |
| | | | r_PUCCH = 11 | 12th PUCCH resource |
| | | | r_PUCCH = 12 | 13th PUCCH resource |
| | | | r_PUCCH = 13 | 14th PUCCH resource |
| | | | r_PUCCH = 14 | 15th PUCCH resource |
| | | | r_PUCCH = 15 | 16th PUCCH resource |
| 010 | 2 | 0 | r_PUCCH = 16 | 17th PUCCH resource |
| | | | r_PUCCH = 17 | 18th PUCCH resource |
| | | | r_PUCCH = 18 | 19th PUCCH resource |
| | | | r_PUCCH = 19 | 20th PUCCH resource |
| | | | r_PUCCH = 20 | 21st PUCCH resource |
| | | | r_PUCCH = 21 | 22nd PUCCH resource |
| | | | r_PUCCH = 22 | 23rd PUCCH resource |
| | | | r_PUCCH = 23 | 24th PUCCH resource |

TABLE 8-continued

| PRI state (K = 8) | $\Delta_{PRI}$ | Joint index ($n_{index}$) | Index of PUCCH resource ($r_{PUCCH}$) | Target PUCCH resource set |
|---|---|---|---|---|
| 011 | 3 | 0 | r_PUCCH = 24 | 25th PUCCH resource |
|  |  | 1 | r_PUCCH = 25 | 26th PUCCH resource |
|  |  | 2 | r_PUCCH = 26 | 27th PUCCH resource |
|  |  | 3 | r_PUCCH = 27 | 28th PUCCH resource |
|  |  | 4 | r_PUCCH = 28 | 29th PUCCH resource |
|  |  | 5 | r_PUCCH = 29 | 30th PUCCH resource |
|  |  | 6 | r_PUCCH = 30 | 31st PUCCH resource |
|  |  | 7 | r_PUCCH = 31 | 32nd PUCCH resource |
| 100 | 4 | 0 | r_PUCCH = 32 | 33rd PUCCH resource |
|  |  | 1 | r_PUCCH = 33 | 34th PUCCH resource |
|  |  | 2 | r_PUCCH = 34 | 35th PUCCH resource |
|  |  | 3 | r_PUCCH = 35 | 36th PUCCH resource |
|  |  | 4 | r_PUCCH = 36 | 37th PUCCH resource |
|  |  | 5 | r_PUCCH = 37 | 38th PUCCH resource |
|  |  | 6 | r_PUCCH = 38 | 39th PUCCH resource |
|  |  | 7 | r_PUCCH = 39 | 40th PUCCH resource |
| 101 | 5 | 0 | r_PUCCH = 40 | 41st PUCCH resource |
|  |  | 1 | r_PUCCH = 41 | 42nd PUCCH resource |
|  |  | 2 | r_PUCCH = 42 | 43rd PUCCH resource |
|  |  | 3 | r_PUCCH = 43 | 44th PUCCH resource |
|  |  | 4 | r_PUCCH = 44 | 45th PUCCH resource |
|  |  | 5 | r_PUCCH = 45 | 46th PUCCH resource |
|  |  | 6 | r_PUCCH = 46 | 47th PUCCH resource |
|  |  | 7 | r_PUCCH = 47 | 48th PUCCH resource |
| 110 | 6 | 0 | r_PUCCH = 48 | 49th PUCCH resource |
|  |  | 1 | r_PUCCH = 49 | 50th PUCCH resource |
|  |  | 2 | r_PUCCH = 50 | 51st PUCCH resource |
|  |  | 3 | r_PUCCH = 51 | 52nd PUCCH resource |
|  |  | 4 | r_PUCCH = 52 | 53rd PUCCH resource |
|  |  | 5 | r_PUCCH = 53 | 54th PUCCH resource |
|  |  | 6 | r_PUCCH = 54 | 55th PUCCH resource |
|  |  | 7 | r_PUCCH = 55 | 56th PUCCH resource |
| 111 | 7 | 0 | r_PUCCH = 56 | 57th PUCCH resource |
|  |  | 1 | r_PUCCH = 57 | 58th PUCCH resource |
|  |  | 2 | r_PUCCH = 58 | 59th PUCCH resource |
|  |  | 3 | r_PUCCH = 59 | 60th PUCCH resource |
|  |  | 4 | r_PUCCH = 60 | 61st PUCCH resource |
|  |  | 5 | r_PUCCH = 61 | 62nd PUCCH resource |
|  |  | 6 | r_PUCCH = 62 | 63rd PUCCH resource |
|  |  | 7 | r_PUCCH = 63 | 64th PUCCH resource |

For example, for Method 3, when N1=4 and N2=2, it is assumed that the target PUCCH resource set includes 64 resources. When it is determined that the PUCCH is transmitted in the second sub-slot and corresponds to the second TRP, that is, $n_{index}=3$ is determined according to Table 5, then the following is performed.

At the base station side: according to the formulas in Embodiments 5 and 6, it may be determined that in the target PUCCH resource set, consecutive K=8 PUCCH resources correspond to a joint index (namely, a combination corresponding to one sub-slot and one TRP). And K PUCCH resources corresponding to each joint index can be obtained, a value of a PRI (namely, $\Delta_{PRI}$ value) indicates one of the K PUCCH resources corresponding to one joint index, as shown in Table 9. For example, for a first joint index, corresponding to 8 PUCCH resources, i.e., 1st to 8th PUCCH resources, in the target PUCCH resource set, and for a second joint index, corresponding to 8 PUCCH resources, i.e., 9th to 16th PUCCH resources, in the target PUCCH resource set, and so on. The base station determines a PUCCH resource from the 8 PUCCH resources corresponding to the 4th joint index (namely, $n_{index}=3$) to transmit the PUCCH in the second sub-slot and corresponding to the second TRP. For example, the 25th PUCCH resource, i.e., the PUCCH resource with an index $r_{PUCCH}=24$, in the target PUCCH resource set is determined. Then the base station generates a PRI corresponding to this PUCCH resource as "000", and sends it to the terminal through a PDCCH corresponding to the PUCCH; and the base station receives the PUCCH sent by the terminal and corresponding to the second TRP in the second sub-slot according to the PUCCH resource determined above.

At the terminal side: the PDCCH corresponding to the PUCCH is received, the PUCCH resource indicator carried in the PDCCH is obtained (when there are PDCCHs corresponding to the PUCCH, the PUCCH resource is determined according to the PUCCH resource indicator carried in the last PDCCH of PDCCHs). According to the PUCCH resource indicator indicated as "000" (namely, $\Delta_{PRI}=0$) and the joint index $n_{index}=3$ corresponding to the PUCCH, $r_{PUCCH}=24$ may be calculated according to the formula, which means that the 25th PUCCH resource in the target PUCCH resource set is used for transmission of the PUCCH corresponding to the second TRP in the second sub-slot.

TABLE 9

| PRI state (K = 8) | $\Delta_{PRI}$ | Joint index ($n_{index}$) | Index of PUCCH resource ($r_{PUCCH}$) | Target PUCCH resource set |
|---|---|---|---|---|
| 000 | 0 | 0 | r_PUCCH = 0 | 1st PUCCH resource |
| 001 | 1 |  | r_PUCCH = 1 | 2nd PUCCH resource |
| 010 | 2 |  | r_PUCCH = 2 | 3rd PUCCH resource |
| 011 | 3 |  | r_PUCCH = 3 | 4th PUCCH resource |
| 100 | 4 |  | r_PUCCH = 4 | 5th PUCCH resource |
| 101 | 5 |  | r_PUCCH = 5 | 6th PUCCH resource |
| 110 | 6 |  | r_PUCCH = 6 | 7th PUCCH resource |
| 111 | 7 |  | r_PUCCH = 7 | 8th PUCCH resource |
| 000 | 0 | 1 | r_PUCCH = 8 | 9th PUCCH resource |
| 001 | 1 |  | r_PUCCH = 9 | 10th PUCCH resource |
| 010 | 2 |  | r_PUCCH = 10 | 11th PUCCH resource |
| 011 | 3 |  | r_PUCCH = 11 | 12th PUCCH resource |
| 100 | 4 |  | r_PUCCH = 12 | 13th PUCCH resource |
| 101 | 5 |  | r_PUCCH = 13 | 14th PUCCH resource |
| 110 | 6 |  | r_PUCCH = 14 | 15th PUCCH resource |
| 111 | 7 |  | r_PUCCH = 15 | 16th PUCCH resource |
| 000 | 0 | 2 | r_PUCCH = 16 | 17th PUCCH resource |
| 001 | 1 |  | r_PUCCH = 17 | 18th PUCCH resource |
| 010 | 2 |  | r_PUCCH = 18 | 19th PUCCH resource |
| 011 | 3 |  | r_PUCCH = 19 | 20th PUCCH resource |
| 100 | 4 |  | r_PUCCH = 20 | 21st PUCCH resource |
| 101 | 5 |  | r_PUCCH = 21 | 22nd PUCCH resource |
| 110 | 6 |  | r_PUCCH = 22 | 23rd PUCCH resource |
| 111 | 7 |  | r_PUCCH = 23 | 24th PUCCH resource |
| 000 | 0 | 3 | r_PUCCH = 24 | 25th PUCCH resource |
| 001 | 1 |  | r_PUCCH = 25 | 26th PUCCH resource |
| 010 | 2 |  | r_PUCCH = 26 | 27th PUCCH resource |
| 011 | 3 |  | r_PUCCH = 27 | 28th PUCCH resource |
| 100 | 4 |  | r_PUCCH = 28 | 29th PUCCH resource |
| 101 | 5 |  | r_PUCCH = 29 | 30th PUCCH resource |
| 110 | 6 |  | r_PUCCH = 30 | 31st PUCCH resource |
| 111 | 7 |  | r_PUCCH = 31 | 32nd PUCCH resource |
| 000 | 0 | 4 | r_PUCCH = 32 | 33rd PUCCH resource |
| 001 | 1 |  | r_PUCCH = 33 | 34th PUCCH resource |
| 010 | 2 |  | r_PUCCH = 34 | 35th PUCCH resource |
| 011 | 3 |  | r_PUCCH = 35 | 36th PUCCH resource |
| 100 | 4 |  | r_PUCCH = 36 | 37th PUCCH resource |
| 101 | 5 |  | r_PUCCH = 37 | 38th PUCCH resource |
| 110 | 6 |  | r_PUCCH = 38 | 39th PUCCH resource |
| 111 | 7 |  | r_PUCCH = 39 | 40th PUCCH resource |
| 000 | 0 | 5 | r_PUCCH = 40 | 41st PUCCH resource |
| 001 | 1 |  | r_PUCCH = 41 | 42nd PUCCH resource |
| 010 | 2 |  | r_PUCCH = 42 | 43rd PUCCH resource |
| 011 | 3 |  | r_PUCCH = 43 | 44th PUCCH resource |
| 100 | 4 |  | r_PUCCH = 44 | 45th PUCCH resource |
| 101 | 5 |  | r_PUCCH = 45 | 46th PUCCH resource |
| 110 | 6 |  | r_PUCCH = 46 | 47th PUCCH resource |
| 111 | 7 |  | r_PUCCH = 47 | 48th PUCCH resource |
| 000 | 0 | 6 | r_PUCCH = 48 | 49th PUCCH resource |
| 001 | 1 |  | r_PUCCH = 49 | 50th PUCCH resource |
| 010 | 2 |  | r_PUCCH = 50 | 51st PUCCH resource |
| 011 | 3 |  | r_PUCCH = 51 | 52nd PUCCH resource |
| 100 | 4 |  | r_PUCCH = 52 | 53rd PUCCH resource |
| 101 | 5 |  | r_PUCCH = 53 | 54th PUCCH resource |
| 110 | 6 |  | r_PUCCH = 54 | 55th PUCCH resource |
| 111 | 7 |  | r_PUCCH = 55 | 56th PUCCH resource |

TABLE 9-continued

| PRI state (K = 8) | $\Lambda_{PRI}$ | Joint index ($n_{index}$) | Index of PUCCH resource ($r_{PUCCH}$) | Target PUCCH resource set |
|---|---|---|---|---|
| 000 | 0 | 7 | r_PUCCH = 56 | 57th PUCCH resource |
| 001 | 1 | | r_PUCCH = 57 | 58th PUCCH resource |
| 010 | 2 | | r_PUCCH = 58 | 59th PUCCH resource |
| 011 | 3 | | r_PUCCH = 59 | 60th PUCCH resource |
| 100 | 4 | | r_PUCCH = 60 | 61st PUCCH resource |
| 101 | 5 | | r_PUCCH = 61 | 62nd PUCCH resource |
| 110 | 6 | | r_PUCCH = 62 | 63rd PUCCH resource |
| 111 | 7 | | r_PUCCH = 63 | 64th PUCCH resource |

In summary, the embodiments of the present disclosure expand the quantity of the PUCCH resources in one PUCCH resource set by reusing an existing PUCCH resource set configuration mode, and according to the PUCCH resource indicator and the index of the target (such as the index of the sub-slot, or the index of the TRP) corresponding to the PUCCH, the PUCCH resources corresponding to different sub-slots and/or TRPs may be determined in one PUCCH resource set. The embodiment of the present disclosure provides a PUCCH resource obtaining method. By configuring only a PUCCH resource set shared by all sub-slots or all TRPs, and combining the indexes of the sub-slots or TRPs, the PUCCH resources corresponding to different sub-slots or TRPs are distinguished in the same PUCCH resource set, to ensure that the terminal may flexibly obtain the PUCCH resource in each sub-slot and each TRP without modifying the PUCCH resource configuration.

Figure 3:
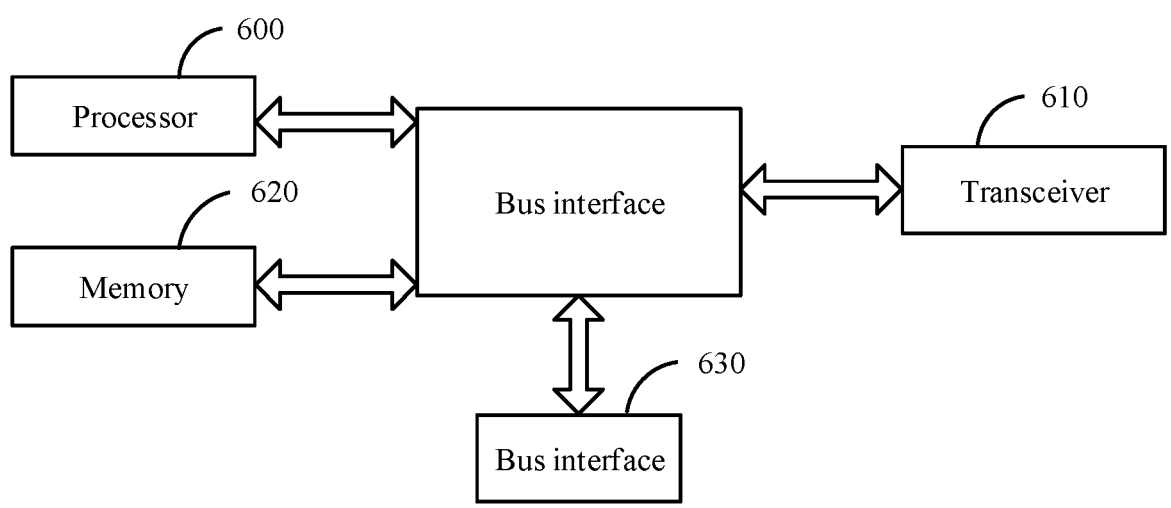
FIG. 3 is a schematic structural diagram of a resource determination apparatus at a terminal side provided according to an embodiment of the present disclosure.

At a terminal side, referring to FIG. 3, a resource determination apparatus provided by an embodiment of the present disclosure, includes: a memory 620, configured to store a program instruction; a processor 600, configured to call the program instruction stored in the memory, to execute the above resource determination method at the terminal side provided by the embodiment of the present disclosure according to an obtained program; and a transceiver 610, configured to receive and send data under the control of the processor 600.

In FIG. 3, a bus architecture may include any quantity of interconnected buses and bridges, and is linked by various circuits of one or more processors represented by the processor 600 and the memory represented by the memory 620. The bus architecture may also link various other circuits such as peripheral devices, voltage regulators, power management circuits, etc., which are well known in the art, and therefore, it will not be described further herein. A bus interface provides an interface. The transceiver 610 may be elements, that is, including a transmitter and a receiver, and provide a device for communicating with various other apparatuses on a transmission medium. For different kinds of user equipment, a user interface 630 may also be an interface connects externally and internally with a required device. The connected device includes, but not limited to, a keypad, a display, a speaker, a microphone, a joystick, etc.

The processor 600 is responsible for managing the bus architecture and general processing, and the memory 620 may store the data used by the processor 600 in performing operations.

In one embodiment, the processor 600 may be a center processing unit (CPU), an application specific integrated circuit (ASIC), a field-programmable gate array (FPGA), or a complex programmable logic device (CPLD).

Figure 4:
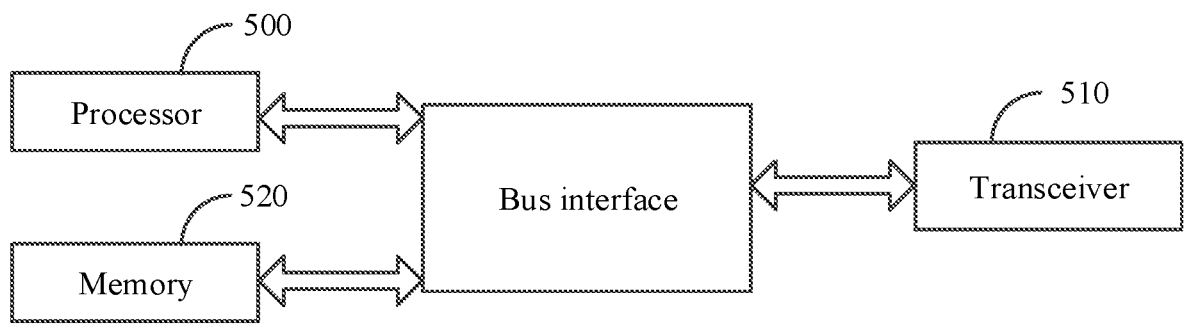
FIG. 4 is a schematic structural diagram of a resource determination apparatus at a network side provided according to an embodiment of the present disclosure.

At a network side, referring to FIG. 4, a resource determination apparatus provided by an embodiment of the present disclosure, includes: a memory 520, configured to store a program instruction; a processor 500, configured to call the program instruction stored in the memory, to execute the above resource determination method at the network side provided by the embodiment of the present disclosure according to an obtained program; and a transceiver 510, configured to receive and send data under the control of the processor 500.

In FIG. 4, a bus architecture may include any quantity of interconnected buses and bridges, and is linked by various circuits of one or more processors represented by the processor 500 and the memory represented by the memory 520. The bus architecture may also link various other circuits such as peripheral devices, voltage regulators, power management circuits, etc., which are well known in the art, and therefore, it will not be described further herein. A bus interface provides an interface. The transceiver 510 may be elements, that is, including a transmitter and a receiver, and provide a device for communicating with various other apparatuses on a transmission medium. The processor 500 is responsible for managing the bus architecture and general processing, and the memory 520 may store the data used by the processor 500 in performing operations.

The processor 500 may be a center processing unit (CPU), an application specific integrated circuit (ASIC), a field-programmable gate array (FPGA), or a complex programmable logic device (CPLD).

Figure 5:
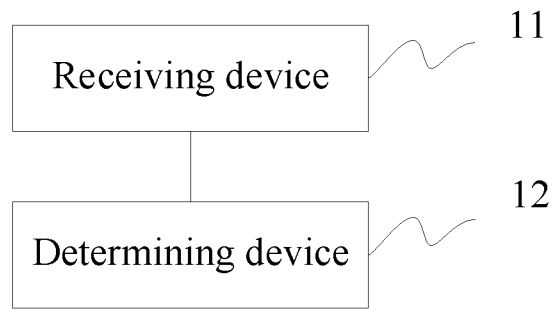
FIG. 5 is a schematic structural diagram of another resource determination apparatus at a terminal side provided according to an embodiment of the present disclosure.

At a terminal side, referring to FIG. 5, another resource determination apparatus provided by an embodiment of the present disclosure, includes: a receiving device 11, configured to receive configuration signaling, and obtain at least one PUCCH resource set according to the configuration signaling; and a determining device 12, configured to determine a target PUCCH resource set, and determine a PUCCH resource from the target PUCCH resource set according to a PUCCH resource indicator and an index of a target corresponding to a PUCCH. The target includes a sub-slot in which PUCCH transmission is performed and/or a TRP corresponding to the PUCCH.

In one embodiment, the determining device 12 further has the function of executing various specific resource determination methods described in the above resource determination method at the terminal side, which will not be repeated here.

Figure 6:
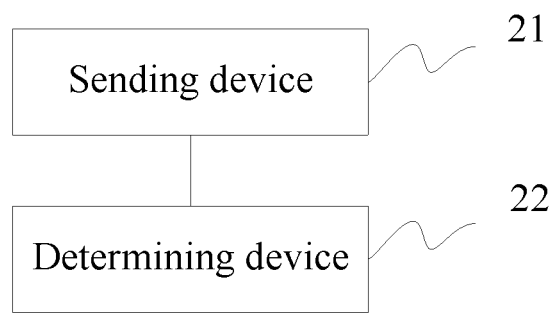
FIG. 6 is a schematic structural diagram of another resource determination apparatus at a network side provided according to an embodiment of the present disclosure.

At a network side, referring to FIG. 6, another resource determination apparatus provided by an embodiment of the present disclosure, includes: a sending device 21, configured to send configuration signaling to indicate a terminal to obtain at least one PUCCH resource set according to the configuration signaling; and a determining device 22, configured to determine a target PUCCH resource set, determine a PUCCH resource from the target PUCCH resource set according to an index of a target corresponding to a PUCCH of the terminal, generate a PUCCH resource indicator corresponding to the determined PUCCH resource, and send the PUCCH resource indicator to the terminal, for the terminal to determine the PUCCH resource from the target PUCCH resource set according to the PUCCH resource indicator and the index of the target corresponding to the PUCCH. The target includes a sub-slot in which PUCCH transmission is performed and/or a TRP corresponding to the PUCCH.

In one embodiment, the determining device 22 further has the function of executing various specific resource determination methods described in the above resource determination method at the network side, which will not be repeated here.

It should be noted that the division of devices in the embodiments of the present disclosure is illustrative, and is only a logical function division, and there may be other division methods in actual implementation. In addition, the functional devices in the various embodiments of the present disclosure may be integrated into one processing device, or each device may exist alone physically, or two or more devices may be integrated into one device. The above-mentioned integrated device may be implemented in the form of hardware or a software functional device.

If the integrated device is implemented in the form of the software functional device and sold or used as an independent product, it may be stored in a computer readable storage medium. Based on this understanding, the embodiments of the present disclosure essentially or the part that contributes to the embodiments may be embodied in the form of a software product, and the computer software product is stored in a storage medium, including several instructions to make a computer device (which may be a personal computer, a server, or a network device, etc.) or a processor execute all or part of the steps of the methods described in the various embodiments of the present disclosure. The aforementioned storage medium includes: a U disk, a mobile hard disk, a read-only memory (ROM), a random access memory (RAM), a magnetic disk or an optical disk and other media that may store program codes.

An embodiment of the present disclosure provides a computing device. The computing device may be a desktop computer, a portable computer, a smart phone, a tablet computer, a personal digital assistant (PDA), etc. The computing device may include a center processing unit (CPU), a memory, an input/output device, etc. The input device may include a keyboard, a mouse, a touch screen, etc., and an output device may include a display device, such as a liquid crystal display (LCD), a cathode ray tube (CRT), etc.

The memory may include a read only memory (ROM) and a random access memory (RAM), and provides a processor with a program instruction and data stored in the memory. In the embodiment of the present disclosure, the memory may be configured to store the program of any of the methods provided in the embodiments of the present disclosure.

The processor calls the program instruction stored in the memory, and the processor is configured to execute any of the methods provided in the embodiments of the present disclosure according to the obtained program instruction.

An embodiment of the present disclosure provides a computer storage medium, configured to store a computer program instruction used by the apparatuses provided in the above embodiments of the present disclosure, which includes a program configured to execute any method provided in the above embodiments of the present disclosure.

The computer storage medium may be any available medium or data storage device that a computer may access, including, but not limited to, a magnetic memory (such as a floppy disk, a hard disk, a magnetic tape, a magneto-optical disk (MO), etc.), an optical memory (such as a CD, a DVD, a BD, an HVD, etc.), and a semiconductor memory (such as a ROM, an EPROM, an EEPROM, a non-volatile memory (NAND FLASH), a solid state drive (SSD)), etc.

The methods provided in the embodiments of the present disclosure may be applied to a terminal device, and may also be applied to a network device.

The terminal device may also be called user equipment, a mobile station, a mobile terminal, etc. In one embodiment, the terminal may have the ability to communicate with one or more core networks via a wireless access network. For example, the terminal may be a mobile phone (or called a "cellular" phone), or a mobile computer, etc., for example, the terminal may also be a portable, pocket-sized, hand-held, computer built-in or vehicle-mounted mobile apparatus.

The network device may be a base station (for example, an access point), which refers to a device that communicates with a wireless terminal through one or more sectors on an air interface in an access network. The base station may be configured to convert the received air frames and IP packets into each other, as a router between the wireless terminal and the rest of the access network, and the rest of the access network may include an Internet Protocol (IP) network. The base station may also coordinate the attribute management of the air interface. For example, the base station may be a base transceiver station (BTS) in GSM or CDMA, a base station (NodeB) in WCDMA, or an evolved base station (NodeB or eNB or e-NodeB) in LTE, or a gNB in a 5G system, etc., which is not limited in the embodiments of the present disclosure.

The processing flow of the above methods may be implemented by a software program, which may be stored in the storage medium, and when the stored software program is called, the above method steps are executed.

Embodiments of the present disclosure may be provided as methods, systems, or computer program products. Thus, the present disclosure may take the form of an entirely hardware embodiment, an entirely software embodiment, or an embodiment combining software and hardware aspects. In one embodiment, the present disclosure may take the form of a computer program product embodied on one or more computer-usable storage media (including, but not limited to, a magnetic disk memory, an optical memory, etc.) having computer-usable program codes embodied therein.

The present disclosure is described with reference to flowcharts and/or block diagrams of methods, devices (systems), and computer program products according to the embodiments of the present disclosure. It is to be understood that each flow and/or block of the flowcharts and/or block diagrams, and combinations of flows and/or blocks in the flowcharts and/or block diagrams, may be implemented by computer program instructions. These computer program instructions may be provided for a processor of a general purpose computer, special purpose computer, embedded processor, or other programmable data processing device to produce a machine, and the instructions, which execute via the processor of the computer or other programmable data processing device, produce an apparatus for implementing the functions specified in one flow or multiple flows of the flowcharts and/or one block or multiple blocks of the block diagrams.

These computer program instructions may also be stored in a computer-readable memory that can direct a computer or other programmable data processing device to function in a particular manner, and the instructions stored in the computer-readable memory produce an article of manufacture including an instruction device which implements the function specified in the one flow or multiple flows of the flowcharts and/or one block or multiple blocks of the block diagrams.

These computer program instructions may also be loaded onto a computer or other programmable data processing device to cause a series of operational steps to be performed on the computer or other programmable device to produce a computer implemented process and the instructions which execute on the computer or other programmable device provide steps for implementing the functions specified in the one flow or multiple flows of the flowcharts and/or one block or multiple blocks of the block diagrams.

What is claimed is:

1. A resource determination method, comprising:
receiving configuration signaling;
obtaining at least one physical uplink control channel (PUCCH) resource set according to the configuration signaling;
determining a target PUCCH resource set in the at least one PUCCH resource set; and
determining a PUCCH resource from the target PUCCH resource set according to an index of a target corresponding to a PUCCH and a PUCCH resource indicator, wherein the target is a sub-slot in which PUCCH transmission is performed and/or a transmission reception point (TRP) corresponding to the PUCCH, wherein the determining the PUCCH resource from the target PUCCH resource set according to the index of the target corresponding to the PUCCH and the PUCCH resource indicator comprises one of the following methods:
method 1: in a condition that the target is the sub-slot in which the PUCCH transmission is performed: dividing M PUCCH resources in the target PUCCH resource set into N subsets, wherein each of the subsets corresponds to one sub-slot in one slot, and N is a quantity of sub-slots contained in one slot; determining a subset, corresponding to the sub-slot, in the target PUCCH resource set according to an index of the sub-slot in which the PUCCH transmission is performed; and determining one PUCCH resource from the determined subset according to the PUCCH resource indicator, wherein the PUCCH resource indicator indicates an index of the PUCCH resource in one subset; or
in a condition that the target is the TRP corresponding to the PUCCH, dividing M PUCCH resources in the target PUCCH resource set into N subsets, wherein each of the subsets corresponds to one TRP in a plurality of TRPs, and N is a quantity of TRPs corresponding to a terminal; determining a subset, corresponding to the TRP, in the target PUCCH resource set according to an index of the TRP corresponding to the PUCCH; and
determining one PUCCH resource from the determined subset according to the PUCCH resource indicator, wherein the PUCCH resource indicator indicates an index of the PUCCH resource in one subset; or
in a condition that the target comprises the sub-slot in which the PUCCH transmission is performed and the TRP corresponding to the PUCCH, dividing M PUCCH resources in the target PUCCH resource set into N1*N2 subsets, wherein each of the subsets corresponds to one sub-slot in one slot and one TRP, N1 is a quantity of sub-slots contained in one slot, and N2 is a quantity of TRPs corresponding to a terminal;
determining one joint index according to an index of the sub-slot in which the PUCCH transmission is performed and an index of the TRP corresponding to the PUCCH;
determining a subset, corresponding to the TRP and the sub-slot, in the target PUCCH resource set according to the joint index; and determining one PUCCH resource from the determined subset according to the PUCCH resource indicator, wherein the PUCCH resource indicator indicates an index of the PUCCH resource in one subset;
method 2: determining P PUCCH resources from the target PUCCH resource set according to the PUCCH resource indicator, wherein one state of the PUCCH resource indicator corresponds to $$P = \left\lceil \frac{R_{PUCCH}}{K} \right\rceil \text{ or } \left\lfloor \frac{R_{PUCCH}}{K} \right\rfloor \text{ or } \frac{R_{PUCCH}}{K}$$

PUCCH resources, and determining one PUCCH resource from the P PUCCH resources according to the index of the target corresponding to the PUCCH, wherein $R_{PUCCH}$ is a quantity of PUCCH resources contained in the target PUCCH resource set, and K is a preset positive integer or a numerical value related to a quantity of bits of the PUCCH resource indicator;
or method 3: determining T PUCCH resources corresponding to K states of the PUCCH resource indicator according to the index of the target, wherein $$T = \left\lceil \frac{R_{PUCCH}}{N} \right\rceil \text{ or } \left\lfloor \frac{R_{PUCCH}}{N} \right\rfloor \text{ or } \frac{R_{PUCCH}}{N},$$

and determining one PUCCH resource from the T PUCCH resources according to the PUCCH resource indicator;
wherein, in a condition that the target is the sub-slot in which the PUCCH transmission is performed, N is a quantity of sub-slots contained in one slot; or in a condition that the target is the TRP corresponding to the PUCCH, N is a quantity of TRPs corresponding to a terminal; or in a condition that the target comprises the sub-slot in which the PUCCH transmission is performed and the TRP corresponding to the PUCCH, N is a product of a quantity of sub-slots contained in one slot and a quantity of TRPs corresponding to a terminal.

2. The method according to claim 1, wherein in a condition that the method 1 is performed, the dividing the M PUCCH resources in the target PUCCH resource set into the N subsets, comprises one of the following manners:
Manner 1: the M PUCCH resources contained in the target PUCCH resource set are evenly divided into the N subsets, wherein M is an integer multiple of N;
Manner 2: a first or last subset comprises $$M - \left\lfloor \frac{M}{N} \right\rfloor$$

PUCCH resources, and remaining subsets comprise $$\left\lfloor \frac{M}{N} \right\rfloor$$

PUCCH resources; or
Manner 3: first (M mod N) or last (M mod N) subsets comprise $$\left\lceil \frac{M}{N} \right\rceil$$

PUCCH resources, and remaining subsets comprise $$\left\lfloor \frac{M}{N} \right\rfloor$$

PUCCH resources;
wherein in a condition that the method 2 is performed:
in a condition of P>N, a one-to-many relationship is between the index of the target and multiple PUCCH resources in the P PUCCH resources, and the method further comprises:

determining one PUCCH resource from the one-to-many relationship according to an index of a control channel element (CCE) of a PDCCH carrying the PUCCH resource indicator; or in a condition of P=N, a one-to-one relationship is between the index of the target and one PUCCH resource in the P PUCCH resources, and the method further comprises: determining one PUCCH resource corresponding to the index of the target according to the one-to-one relationship; or in a condition of P<N, multiple indexes of multiple targets corresponding to a plurality of PUCCHs correspond to one PUCCH resource in the P PUCCH resources, and the method further comprises: determining, according to an index of one of the targets and N, a correspondence relationship between the multiple indexes of the multiple targets and one PUCCH resource of the P PUCCH resources;

wherein, in a condition that the target is the sub-slot in which the PUCCH transmission is performed, N is a quantity of sub-slots contained in one slot; or in a condition that the target is the TRP corresponding to the PUCCH, N is a quantity of TRPs corresponding to a terminal; or in a condition that the target is the sub-slot in which the PUCCH transmission is performed and the TRP corresponding to the PUCCH, N is a product of a quantity of sub-slots contained in one slot and a quantity of TRPs corresponding to a terminal;

wherein in a condition that the method 3 is performed:

in a condition of T>K, the method further comprises: determining, according to an index of a control channel element (CCE) of a PDCCH carrying the PUCCH resource indicator, one PUCCH resource corresponding to the index of the CCE from the T PUCCH resources; or in a condition of T=K, a one-to-one relationship is between the K states of the PUCCH resource indicator and the T PUCCH resources, and the method further comprises: determining one PUCCH resource according to the one-to-one relationship; or in a condition of T<K, some of the K states of the PUCCH resource indicator are reserved and a one-to-one relationship is between T states of the K states and the T PUCCH resources, and the method further comprises: determining one PUCCH resource according to the one-to-one relationship.

3. The method according to claim 2, wherein in a condition that the method 2 is performed, an index of the finally determined PUCCH resource in the target PUCCH resource set is calculated according to one of the following formulas:

$$r_{PUCCH} = \begin{cases} \left\lfloor \frac{n_{index} \cdot \lceil R_{PUCCH}/K \rceil}{N} \right\rfloor + \Delta_{PRI} \cdot \left\lceil \frac{R_{PUCCH}}{K} \right\rceil & \text{if } \Delta_{PRI} < R_{PUCCH} \bmod K \\ \left\lfloor \frac{n_{index} \cdot \lfloor R_{PUCCH}/K \rfloor}{N} \right\rfloor + \Delta_{PRI} \cdot \left\lfloor \frac{R_{PUCCH}}{K} \right\rfloor + R_{PUCCH} \bmod K & \text{if } \Delta_{PRI} \geq R_{PUCCH} \bmod K \end{cases} ; \quad \text{Formula 1}$$

$$r_{PUCCH} = \left\lfloor \frac{n_{index} \cdot \lfloor R_{PUCCH}/K \rfloor}{N} \right\rfloor + \Delta_{PRI} \cdot \left\lfloor \frac{R_{PUCCH}}{K} \right\rfloor ; \quad \text{Formula 2}$$

$$r_{PUCCH} = \left\lfloor \frac{n_{index} \cdot R_{PUCCH}/K}{N} \right\rfloor + \Delta_{PRI} \cdot \frac{R_{PUCCH}}{K} ; \text{ or,} \quad \text{Formula 3}$$

when $\Delta_{PRI} < R_{PUCCH} \bmod K$ and $\left\lceil \frac{R_{PUCCH}}{K} \right\rceil > N$, Formula 4

$$r_{PUCCH} = \begin{cases} \left\lfloor \frac{n_{index} \cdot \lceil R_{PUCCH}/K \rceil}{N} \right\rfloor + \left\lfloor \frac{n_{CCE,p} \cdot \lceil \lceil R_{PUCCH}/K \rceil / N \rceil}{N_{CCE,p}} \right\rfloor + \Delta_{PRI} \cdot \left\lceil \frac{R_{PUCCH}}{K} \right\rceil & \text{if } n_{index} < \left\lceil \frac{R_{PUCCH}}{K} \right\rceil \bmod N \\ \left\lfloor \frac{n_{index} \cdot \lceil R_{PUCCH}/K \rceil}{N} \right\rfloor + \left\lfloor \frac{n_{CCE,p} \cdot \lfloor \lceil R_{PUCCH}/K \rceil / N \rfloor}{N_{CCE,p}} \right\rfloor + \Delta_{PRI} \cdot \left\lceil \frac{R_{PUCCH}}{K} \right\rceil + \left\lceil \frac{R_{PUCCH}}{K} \right\rceil \bmod N & \text{if } n_{index} \geq \left\lceil \frac{R_{PUCCH}}{K} \right\rceil \bmod N \end{cases} ;$$

when $\Delta_{PRI} < R_{PUCCH} \bmod K$ and $\left\lceil \frac{R_{PUCCH}}{K} \right\rceil \leq N$, $$r_{PUCCH} = \left\lfloor \frac{n_{index} \cdot \lceil R_{PUCCH}/K \rceil}{N} \right\rfloor + \Delta_{PRI} \cdot \left\lceil \frac{R_{PUCCH}}{K} \right\rceil ;$$

when $\Delta_{PRI} \geq R_{PUCCH} \bmod K$ and $\left\lfloor \frac{R_{PUCCH}}{K} \right\rfloor > N$, $$r_{PUCCH} = \begin{cases} \left\lfloor \frac{n_{index} \cdot \lfloor R_{PUCCH}/K \rfloor}{N} \right\rfloor + \left\lfloor \frac{n_{CCE,p} \cdot \lceil \lfloor R_{PUCCH}/K \rfloor / N \rceil}{N_{CCE,p}} \right\rfloor + \Delta_{PRI} \cdot \left\lfloor \frac{R_{PUCCH}}{K} \right\rfloor & \text{if } n_{index} < \left\lfloor \frac{R_{PUCCH}}{K} \right\rfloor \bmod N \\ \left\lfloor \frac{n_{index} \cdot \lfloor R_{PUCCH}/K \rfloor}{N} \right\rfloor + \left\lfloor \frac{n_{CCE,p} \cdot \lfloor \lfloor R_{PUCCH}/K \rfloor / N \rfloor}{N_{CCE,p}} \right\rfloor + \Delta_{PRI} \cdot \left\lfloor \frac{R_{PUCCH}}{K} \right\rfloor + \left\lfloor \frac{R_{PUCCH}}{K} \right\rfloor \bmod N + R_{PUCCH} \bmod K & \text{if } n_{index} \geq \left\lfloor \frac{R_{PUCCH}}{K} \right\rfloor \bmod N \end{cases} ;$$

or when $\Delta_{PRI} \geq R_{PUCCH} \bmod K$ and $\left\lfloor \frac{R_{PUCCH}}{K} \right\rfloor \leq N$, $$r_{PUCCH} = \left\lfloor \frac{n_{index} \cdot \lfloor R_{PUCCH}/K \rfloor}{N} \right\rfloor + \Delta_{PRI} \cdot \left\lfloor \frac{R_{PUCCH}}{K} \right\rfloor + R_{PUCCH} \bmod K ;$$

wherein, $r_{PUCCH}$ is an index of each PUCCH resource in the target PUCCH resource set, $\Delta_{PRI}$ is a value of the PUCCH resource indicator, a range of the value is 0 to K−1, in a condition that the target is the sub-slot in which the PUCCH transmission is performed, $n_{index}$ is an index of each sub-slot in one slot, or in a condition that the target is the TRP corresponding to the PUCCH, $n_{index}$ is an index of each TRP in the N TRPs corresponding to the terminal, or in a condition that the target comprises the sub-slot in which the PUCCH transmission is performed and the TRP corresponding to the PUCCH, $n_{index}$ is a joint index of the sub-slots contained in one slot and the TRPs corresponding to the terminal;

wherein in a condition that the method 3 is performed, an index of the finally determined PUCCH resource in the target PUCCH resource set is calculated according to one of the following formulas:

$$r_{PUCCH} = n_{index} \cdot A + \Delta_{PRI}, \text{ wherein } A = K \text{ or } \frac{R_{PUCCH}}{N} \text{ or } \left\lceil \frac{R_{PUCCH}}{N} \right\rceil \text{ or } \left\lfloor \frac{R_{PUCCH}}{N} \right\rfloor;$$ Formula 5

$$r_{PUCCH} = \begin{cases} n_{index} \cdot \left\lceil \frac{R_{PUCCH}}{N} \right\rceil + \Delta_{PRI} & \text{if } n_{index} < R_{PUCCH} \bmod N \\ n_{index} \cdot \left\lfloor \frac{R_{PUCCH}}{N} \right\rfloor + R_{PUCCH} \bmod N + \Delta_{PRI} & \text{if } n_{index} \geq R_{PUCCH} \bmod N \end{cases}; \text{ or,}$$ Formula 6 when $n_{index} < R_{PUCCH} \bmod N$ and $\left\lceil \frac{R_{PUCCH}}{N} \right\rceil > K$, Formula 7

$$r_{PUCCH} = \begin{cases} n_{index} \cdot \left\lceil \frac{R_{PUCCH}}{N} \right\rceil + \left\lfloor \frac{n_{CCE,p} \cdot \lceil \lceil R_{PUCCH}/N \rceil/K \rceil}{N_{CCE,p}} \right\rfloor + \Delta_{PRI} \cdot \lceil \lceil R_{PUCCH}/N \rceil/K \rceil & \text{if } \Delta_{PRI} < \left\lceil \frac{R_{PUCCH}}{N} \right\rceil \bmod K \\ n_{index} \cdot \left\lceil \frac{R_{PUCCH}}{N} \right\rceil + \left\lfloor \frac{n_{CCE,p} \cdot \lfloor \lceil R_{PUCCH}/N \rceil/K \rfloor}{N_{CCE,p}} \right\rfloor + \Delta_{PRI} \cdot \lfloor \lceil R_{PUCCH}/N \rceil/K \rfloor + \left\lceil \frac{R_{PUCCH}}{N} \right\rceil \bmod K & \text{if } \Delta_{PRI} \geq \left\lceil \frac{R_{PUCCH}}{N} \right\rceil \bmod K \end{cases};$$

when $n_{index} < R_{PUCCH} \bmod N$ and $\left\lceil \frac{R_{PUCCH}}{N} \right\rceil \leq K$, $$r_{PUCCH} = n_{index} \cdot \left\lceil \frac{R_{PUCCH}}{N} \right\rceil + \Delta_{PRI};$$

when $n_{index} \geq R_{PUCCH} \bmod N$ and $\left\lfloor \frac{R_{PUCCH}}{N} \right\rfloor > K$, $$r_{PUCCH} = \begin{cases} n_{index} \cdot \left\lfloor \frac{R_{PUCCH}}{N} \right\rfloor + R_{PUCCH} \bmod N + \left\lfloor \frac{n_{CCE,p} \cdot \lceil \lfloor R_{PUCCH}/N \rfloor/K \rceil}{N_{CCE,p}} \right\rfloor + \Delta_{PRI} \cdot \lceil \lfloor R_{PUCCH}/N \rfloor/K \rceil & \text{if } \Delta_{PRI} < \left\lfloor \frac{R_{PUCCH}}{N} \right\rfloor \bmod K \\ n_{index} \cdot \left\lfloor \frac{R_{PUCCH}}{N} \right\rfloor + R_{PUCCH} \bmod N + \left\lfloor \frac{n_{CCE,p} \cdot \lfloor \lfloor R_{PUCCH}/N \rfloor/K \rfloor}{N_{CCE,p}} \right\rfloor + \Delta_{PRI} \cdot \lfloor \lfloor R_{PUCCH}/N \rfloor/K \rfloor + \left\lfloor \frac{R_{PUCCH}}{N} \right\rfloor \bmod K & \text{if } \Delta_{PRI} \geq \left\lfloor \frac{R_{PUCCH}}{N} \right\rfloor \bmod K \end{cases};$$

and when $n_{index} \geq R_{PUCCH} \bmod N$ and $\left\lfloor \frac{R_{PUCCH}}{N} \right\rfloor \leq K$, $$r_{PUCCH} = n_{index} \cdot \left\lfloor \frac{R_{PUCCH}}{N} \right\rfloor + R_{PUCCH} \bmod N + \Delta_{PRI};$$

wherein, $r_{PUCCH}$ is an index of each PUCCH resource in the target PUCCH resource set, $0 \leq r_{PUCCH} \leq R_{PUCCH} - 1$, $R_{PUCCH}$ is a quantity of PUCCH resources contained in the target PUCCH resource set, $\Delta_{PRI}$ is a value of the PUCCH resource indicator, a vrange of the value is 0 to K−1, K is a preset positive integer value or a numerical value related to a quantity of bits of the PUCCH resource indicator; in a condition that the target is the sub-slot in which the PUCCH transmission is performed, $n_{index}$ is an index of each sub-slot in the one slot, or in a condition that the target is the TRP corresponding to the PUCCH, $n_{index}$ is an index of each TRP in the N TRPs corresponding to the terminal, or in a condition that the target is the sub-slot in which the PUCCH transmission is performed and the TRP corresponding to the PUCCH, $n_{index}$ is a joint index of the sub-slots contained in the one slot and the TRPs corresponding to the terminal.

4. The method according to claim 1, wherein the PUCCH resource set is shared for a plurality of sub-slots in one slot or configured for each of a plurality of sub-slots in one slot; or, the PUCCH resource set is shared for a plurality of TRPs corresponding to a terminal or configured for each of a plurality of TRPs.

5. A resource determination method, comprising:
sending configuration signaling to indicate a terminal to obtain at least one physical uplink control channel (PUCCH) resource set according to the configuration signaling;
determining a target PUCCH resource set in the at least one PUCCH resource set;
determining a PUCCH resource from the target PUCCH resource set according to an index of a target corresponding to a PUCCH of the terminal;
generating a PUCCH resource indicator corresponding to the determined PUCCH resource; and
sending the PUCCH resource indicator to the terminal, for the terminal to determine the PUCCH resource from the target PUCCH resource set according to the index of the target corresponding to the PUCCH and the PUCCH resource indicator; wherein the target comprises a sub-slot in which PUCCH transmission is performed and/or a transmission reception point (TRP) corresponding to the PUCCH, wherein the determining the PUCCH resource from the target PUCCH resource set according to the index of the target corresponding to the PUCCH and the PUCCH resource indicator, comprises one of the following methods:
method 1: in a condition that the target is the sub-slot in which the PUCCH transmission is performed: dividing M PUCCH resources in the target PUCCH resource set into N subsets, wherein each of the subsets corresponds to one sub-slot in one slot, and N is a quantity of sub-slots contained in one slot; determining a subset, corresponding to the sub-slot, in the target PUCCH resource set according to an index of the sub-slot in which the PUCCH transmission is performed; and determining one PUCCH resource from the determined subset according to the PUCCH resource indicator, wherein the PUCCH resource indicator indicates an index of the PUCCH resource in one subset; or in a condition that the target is the TRP corresponding to the PUCCH, dividing M PUCCH resources in the target PUCCH resource set into N subsets, wherein each of the subsets corresponds to one TRP in a plurality of TRPs, and N is a quantity of TRPs corresponding to a terminal; determining a subset, corresponding to the TRP, in the target PUCCH resource set according to an index of the TRP corresponding to the PUCCH; and determining one PUCCH resource from the determined subset according to the PUCCH resource indicator, wherein the PUCCH resource indicator indicates an index of the PUCCH resource in one subset; or in a condition that the target comprises the sub-slot in which the PUCCH transmission is performed and the TRP corresponding to the PUCCH, dividing M PUCCH resources in the target PUCCH resource set into N1*N2 subsets, wherein each of the subsets corresponds to one sub-slot in one slot and one TRP, N1 is a quantity of sub-slots contained in one slot, and N2 is a quantity of TRPs corresponding to a terminal; determining one joint index according to an index of the sub-slot in which the PUCCH transmission is performed and an index of the TRP corresponding to the PUCCH; determining a subset, corresponding to the TRP and the sub-slot, in the target PUCCH resource set according to the joint index; and determining one PUCCH resource from the determined subset according to the PUCCH resource indicator, wherein the PUCCH resource indicator indicates an index of the PUCCH resource in one subset;

method 2: determining P PUCCH resources from the target PUCCH resource set according to the PUCCH resource indicator, wherein one state of the PUCCH resource indicator corresponds to $$P = \left\lceil \frac{R_{PUCCH}}{K} \right\rceil \text{ or } \left\lfloor \frac{R_{PUCCH}}{K} \right\rfloor \text{ or } \frac{R_{PUCCH}}{K}$$

PUCCH resources, and determining one PUCCH resource from the P PUCCH resources according to the index of the target corresponding to the PUCCH, wherein $R_{PUCCH}$ is a quantity of PUCCH resources contained in the target PUCCH resource set, and K is a preset positive integer or a numerical value related to a quantity of bits of the PUCCH resource indicator;

or method 3: determining T PUCCH resources corresponding to K states of the PUCCH resource indicator according to the index of the target, wherein $$T = \left\lceil \frac{R_{PUCCH}}{N} \right\rceil \text{ or } \left\lfloor \frac{R_{PUCCH}}{N} \right\rfloor \text{ or } \frac{R_{PUCCH}}{N},$$

and determining one PUCCH resource from the T PUCCH resources according to the PUCCH resource indicator;

wherein, in a condition that the target is the sub-slot in which the PUCCH transmission is performed, N is a quantity of sub-slots contained in one slot; or in a condition that the target is the TRP corresponding to the PUCCH, N is a quantity of TRPs corresponding to a terminal; or in a condition that the target comprises the sub-slot in which the PUCCH transmission is performed and the TRP corresponding to the PUCCH, N is a product of a quantity of sub-slots contained in one slot and a quantity of TRPs corresponding to a terminal.

6. The method according to the claim 5, wherein in a condition that the method 1 is performed, the dividing the M PUCCH resources in the target PUCCH resource set into the N subsets, comprises one of the following manners:

Manner 1: the M PUCCH resources contained in the target PUCCH resource set are evenly divided into the N subsets, wherein M is an integer multiple of N;

Manner 2: a first or last subset comprises $$M - \left\lfloor \frac{M}{N} \right\rfloor$$

PUCCH resources, and remaining subsets comprise $$\left\lfloor \frac{M}{N} \right\rfloor$$

PUCCH resources; or

Manner 3: first (M mod N) or last (M mod N) subsets comprise $$\left\lceil \frac{M}{N} \right\rceil$$

PUCCH resources, and remaining subsets comprise $$\left\lfloor \frac{M}{N} \right\rfloor$$

PUCCH resources;

wherein in a condition that the method 2 is performed:

in a condition of P>N, a one-to-many relationship is between the index of the target and multiple PUCCH resources in the P PUCCH resources, and the method further comprises:

determining one PUCCH resource from the one-to-many relationship according to an index of a control channel element (CCE) of a PDCCH carrying the PUCCH resource indicator; or in a condition of P=N, a one-to-one relationship is between the index of the target and one PUCCH resource in the P PUCCH resources, determining one PUCCH resource corresponding to the index of the target according to the one-to-one relationship; or in a condition of P<N, multiple indexes of multiple targets corresponding to a plurality of PUCCHs correspond to one PUCCH resource in the P PUCCH resources, and the method further comprises: determining, according to an index of one of the targets and N, a correspondence relationship between the multiple indexes of the multiple targets and one PUCCH resource of the P PUCCH resources;

wherein, in a condition that the target is the sub-slot in which the PUCCH transmission is performed, N is a quantity of sub-slots contained in one slot; or in a condition that the target is the TRP corresponding to the PUCCH, N is a quantity of TRPs corresponding to a terminal; or in a condition that the target is the sub-slot in which the PUCCH transmission is performed and the TRP corresponding to the PUCCH, N is a product of a quantity of sub-slots contained in one slot and a quantity of TRPs corresponding to a terminal;

in a condition that the method 3 is performed:
in a condition of T>K, the method further comprises: determining, according to an index of a control channel element (CCE) of a PDCCH carrying the PUCCH resource indicator, one PUCCH resource corresponding to the index of the CCE from the T PUCCH resources; or
in a condition of T=K, a one-to-one relationship is between the K states of the PUCCH resource indicator and the T PUCCH resources, and the method further comprises: determining one PUCCH resource according to the one-to-one relationship; or
in a condition of T<K, some of the K states of the PUCCH resource indicator are reserved and a one-to-one relationship is between T states of the K states and the T PUCCH resources, and the method further comprises: determining one PUCCH resource according to the one-to-one relationship.

7. The method according to claim 6, in a condition that the method 2 is performed an index of the finally determined PUCCH resource in the target PUCCH resource set is calculated according to one of the following formulas:

$$r_{PUCCH} = \begin{cases} \left\lfloor \frac{n_{index} \cdot \lceil R_{PUCCH}/K \rceil}{N} \right\rfloor + \Delta_{PRI} \cdot \left\lceil \frac{R_{PUCCH}}{K} \right\rceil & \text{if } \Delta_{PRI} < R_{PUCCH} \bmod K \\ \left\lfloor \frac{n_{index} \cdot \lfloor R_{PUCCH}/K \rfloor}{N} \right\rfloor + \Delta_{PRI} \cdot \left\lfloor \frac{R_{PUCCH}}{K} \right\rfloor + R_{PUCCH} \bmod K & \text{if } \Delta_{PRI} \geq R_{PUCCH} \bmod K \end{cases} \quad \text{Formula 1}$$

$$r_{PUCCH} = \left\lfloor \frac{n_{index} \cdot \lfloor R_{PUCCH}/K \rfloor}{N} \right\rfloor + \Delta_{PRI} \cdot \left\lfloor \frac{R_{PUCCH}}{K} \right\rfloor \quad \text{Formula 2}$$

$$r_{PUCCH} = \left\lfloor \frac{n_{index} \cdot R_{PUCCH}/K}{N} \right\rfloor + \Delta_{PRI} \cdot \frac{R_{PUCCH}}{K}; \text{ or} \quad \text{Formula 3}$$

when $\Delta_{PRI} < R_{PUCCH} \bmod K$ and $\left\lceil \frac{R_{PUCCH}}{K} \right\rceil > N$, Formula 4

$$r_{PUCCH} = \begin{cases} \left\lfloor \frac{n_{index} \cdot \lceil R_{PUCCH}/K \rceil}{N} \right\rfloor + \left\lfloor \frac{n_{CCE,p} \cdot \lceil \lceil R_{PUCCH}/K \rceil / N \rceil}{N_{CCE,p}} \right\rfloor + \Delta_{PRI} \cdot \left\lceil \frac{R_{PUCCH}}{K} \right\rceil & \text{if } n_{index} < \left\lceil \frac{R_{PUCCH}}{K} \right\rceil \bmod N \\ \left\lfloor \frac{n_{index} \cdot \lceil R_{PUCCH}/K \rceil}{N} \right\rfloor + \left\lfloor \frac{n_{CCE,p} \cdot \lfloor \lceil R_{PUCCH}/K \rceil / N \rfloor}{N_{CCE,p}} \right\rfloor + \Delta_{PRI} \cdot \left\lceil \frac{R_{PUCCH}}{K} \right\rceil + \left\lceil \frac{R_{PUCCH}}{K} \right\rceil \bmod N & \text{if } n_{index} \geq \left\lceil \frac{R_{PUCCH}}{K} \right\rceil \bmod N \end{cases}$$

when $\Delta_{PRI} < R_{PUCCH} \bmod K$ and $\left\lceil \frac{R_{PUCCH}}{K} \right\rceil \leq N$, $$r_{PUCCH} = \left\lfloor \frac{n_{index} \cdot \lceil R_{PUCCH}/K \rceil}{N} \right\rfloor + \Delta_{PRI} \cdot \left\lceil \frac{R_{PUCCH}}{K} \right\rceil$$

when $\Delta_{PRI} \geq R_{PUCCH} \bmod K$ and $\left\lfloor \frac{R_{PUCCH}}{K} \right\rfloor > N$, $$r_{PUCCH} = \begin{cases} \left\lfloor \frac{n_{index} \cdot \lfloor R_{PUCCH}/K \rfloor}{N} \right\rfloor + \left\lfloor \frac{n_{CCE,p} \cdot \lceil \lfloor R_{PUCCH}/K \rfloor / N \rceil}{N_{CCE,p}} \right\rfloor + \Delta_{PRI} \cdot \left\lfloor \frac{R_{PUCCH}}{K} \right\rfloor & \text{if } n_{index} < \left\lfloor \frac{R_{PUCCH}}{K} \right\rfloor \bmod N \\ \left\lfloor \frac{n_{index} \cdot \lfloor R_{PUCCH}/K \rfloor}{N} \right\rfloor + \left\lfloor \frac{n_{CCE,p} \cdot \lceil \lfloor R_{PUCCH}/K \rfloor / N \rceil}{N_{CCE,p}} \right\rfloor + \Delta_{PRI} \cdot \left\lfloor \frac{R_{PUCCH}}{K} \right\rfloor + \left\lfloor \frac{R_{PUCCH}}{K} \right\rfloor \bmod N + R_{PUCCH} \bmod K & \text{if } n_{index} \geq \left\lfloor \frac{R_{PUCCH}}{K} \right\rfloor \bmod N \end{cases}$$

and when $\Delta_{PRI} \geq R_{PUCCH} \bmod K$ and $\left\lfloor \frac{R_{PUCCH}}{K} \right\rfloor \leq N$, $$r_{PUCCH} = \left\lfloor \frac{n_{index} \cdot \lfloor R_{PUCCH}/K \rfloor}{N} \right\rfloor + \Delta_{PRI} \cdot \left\lfloor \frac{R_{PUCCH}}{K} \right\rfloor + R_{PUCCH} \bmod K;$$

wherein, $r_{PUCCH}$ is an index of each PUCCH resource in the target PUCCH resource set, $\Delta_{PRI}$ is a value of the PUCCH resource indicator, a range of the value is 0 to K−1, in a condition that the target is the sub-slot in which the PUCCH transmission is performed, $n_{index}$ is an index of each sub-slot in one slot, or in a condition that the target is the TRP corresponding to the PUCCH, $n_{index}$ is an index of each TRP in the N TRPs corresponding to the terminal, or in a condition that the target comprises the sub-slot in which the PUCCH transmission is performed and the TRP corresponding to the PUCCH, $n_{index}$ is a joint index of the sub-slots contained in one slot and the TRPs corresponding to the terminal;

wherein in a condition that the method 3 is performed an index of the finally determined PUCCH resource in the target PUCCH resource set is calculated according to one of the following formulas:

$r_{PUCCH} = n_{index} \cdot A + \Delta_{PRI}$, wherein $A = K$ or $\frac{R_{PUCCH}}{N}$ or $\left\lceil \frac{R_{PUCCH}}{N} \right\rceil$ or $\left\lfloor \frac{R_{PUCCH}}{N} \right\rfloor$; 　　　　　Formula 5

$$r_{PUCCH} = \begin{cases} n_{index} \cdot \left\lceil \frac{R_{PUCCH}}{N} \right\rceil + \Delta_{PRI} & \text{if } n_{index} < R_{PUCCH} \bmod N \\ n_{index} \cdot \left\lfloor \frac{R_{PUCCH}}{N} \right\rfloor + R_{PUCCH} \bmod N + \Delta_{PRI} & \text{if } n_{index} \geq R_{PUCCH} \bmod N \end{cases};$$ 　Formula 6 or when $n_{index} < R_{PUCCH} \bmod N$ and $\left\lceil \frac{R_{PUCCH}}{N} \right\rceil > K$, 　　　　　Formula 7

$$r_{PUCCH} = \begin{cases} n_{index} \cdot \left\lceil \frac{R_{PUCCH}}{N} \right\rceil + \left\lfloor \frac{n_{CCE,p} \cdot \lceil \lceil R_{PUCCH}/N \rceil / K \rceil}{N_{CCE,p}} \right\rfloor + \Delta_{PRI} \cdot \lceil \lceil R_{PUCCH}/N \rceil / K \rceil & \text{if } \Delta_{PRI} < \left\lceil \frac{R_{PUCCH}}{N} \right\rceil \bmod K \\ n_{index} \cdot \left\lceil \frac{R_{PUCCH}}{N} \right\rceil + \left\lfloor \frac{n_{CCE,p} \cdot \lfloor \lceil R_{PUCCH}/N \rceil / K \rfloor}{N_{CCE,p}} \right\rfloor + \Delta_{PRI} \cdot \lfloor \lceil R_{PUCCH}/N \rceil / K \rfloor + \left\lceil \frac{R_{PUCCH}}{N} \right\rceil \bmod K & \text{if } \Delta_{PRI} \geq \left\lceil \frac{R_{PUCCH}}{N} \right\rceil \bmod K \end{cases};$$

when $n_{index} < R_{PUCCH} \bmod N$ and $\left\lceil \frac{R_{PUCCH}}{N} \right\rceil \leq K$, $r_{PUCCH} = n_{index} \cdot \left\lceil \frac{R_{PUCCH}}{N} \right\rceil + \Delta_{PRI}$;

when $n_{index} \geq R_{PUCCH} \bmod N$ and $\left\lfloor \frac{R_{PUCCH}}{N} \right\rfloor > K$, $$r_{PUCCH} = \begin{cases} n_{index} \cdot \left\lfloor \frac{R_{PUCCH}}{N} \right\rfloor + R_{PUCCH} \bmod N + \left\lfloor \frac{n_{CCE,p} \cdot \lceil \lfloor R_{PUCCH}/N \rfloor / K \rceil}{N_{CCE,p}} \right\rfloor + \Delta_{PRI} \cdot \lceil \lfloor R_{PUCCH}/N \rfloor / K \rceil & \text{if } \Delta_{PRI} < \left\lfloor \frac{R_{PUCCH}}{N} \right\rfloor \bmod K \\ n_{index} \cdot \left\lfloor \frac{R_{PUCCH}}{N} \right\rfloor + R_{PUCCH} \bmod N + \left\lfloor \frac{n_{CCE,p} \cdot \lfloor \lfloor R_{PUCCH}/N \rfloor / K \rfloor}{N_{CCE,p}} \right\rfloor + \Delta_{PRI} \cdot \lfloor \lfloor R_{PUCCH}/N \rfloor / K \rfloor + \left\lfloor \frac{R_{PUCCH}}{N} \right\rfloor \bmod K & \text{if } \Delta_{PRI} \geq \left\lfloor \frac{R_{PUCCH}}{N} \right\rfloor \bmod K \end{cases};$$

and when $n_{index} \geq R_{PUCCH} \bmod N$ and $\left\lfloor \frac{R_{PUCCH}}{N} \right\rfloor \leq K$, $r_{PUCCH} = n_{index} \cdot \left\lfloor \frac{R_{PUCCH}}{N} \right\rfloor + R_{PUCCH} \bmod N + \Delta_{PRI}$;

wherein, $r_{PUCCH}$ is an index of each PUCCH resource in the target PUCCH resource set, $0 \leq r_{PUCCH} \leq R_{PUCCH}-1$, $R_{PUCCH}$ is a quantity of PUCCH resources contained in the target PUCCH resource set, $\Delta_{PRI}$ is a value of the PUCCH resource indicator, a vrange of the value is 0 to K−1, K is a preset positive integer value or a numerical value related to a quantity of bits of the PUCCH resource indicator; in a condition that the target is the sub-slot in which the PUCCH transmission is performed, $n_{index}$ is an index of each sub-slot in the one slot, or in a condition that the target is the TRP corresponding to the PUCCH, $n_{index}$ is an index of each TRP in the N TRPs corresponding to the terminal, or in a condition that the target is the sub-slot in which the PUCCH transmission is performed and the TRP corresponding to the PUCCH, $n_{index}$ is a joint index of the sub-slots contained in the one slot and the TRPs corresponding to the terminal.

8. The method according to claim 5, wherein the PUCCH resource set is shared for a plurality of sub-slots in one slot or configured for each of a plurality of sub-slots in one slot; or, the PUCCH resource set is shared for a plurality of TRPs corresponding to a terminal or configured for each of a plurality of TRPs.

9. A resource determination apparatus, comprising:
a memory, configured to store a program instruction; and
a processor, configured to call the program instruction stored in the memory to perform the method according to claim 5.

10. The apparatus according to claim 9, wherein the processor is configured to call the program instruction stored in the memory to perform one of the following methods:
method 1: in a condition that the target is the sub-slot in which the PUCCH transmission is performed: dividing M PUCCH resources in the target PUCCH resource set into N subsets, wherein each of the subsets corresponds to one sub-slot in one slot, and N is a quantity of sub-slots contained in one slot; determining a subset, corresponding to the sub-slot, in the target PUCCH resource set according to an index of the sub-slot in which the PUCCH transmission is performed; and determining one PUCCH resource from the determined subset according to the PUCCH resource indicator, wherein the PUCCH resource indicator indicates an index of the PUCCH resource in one subset; or in a condition that the target is the TRP corresponding to the PUCCH, dividing M PUCCH resources in the target PUCCH resource set into N subsets, wherein each of the subsets corresponds to one TRP in a plurality of TRPs, and N is a quantity of TRPs corresponding to a terminal; determining a subset, corresponding to the TRP, in the target PUCCH resource set according to an index of the TRP corresponding to the PUCCH; and determining one PUCCH resource from the determined subset according to the PUCCH resource indicator, wherein the PUCCH resource indicator indicates an index of the PUCCH resource in one subset; or in a condition that the target comprises the sub-slot in which the PUCCH transmission is performed and the TRP corresponding to the PUCCH, dividing M PUCCH resources in the target PUCCH resource set into N1*N2 subsets, wherein each of the subsets corresponds to one sub-slot in one slot and one TRP, N1 is a quantity of sub-slots contained in one slot, and N2 is a quantity of TRPs corresponding to a terminal; determining one joint index according to an index of the sub-slot in which the PUCCH transmission is performed and an index of the TRP corresponding to the PUCCH; determining a subset, corresponding to the TRP and the sub-slot, in the target PUCCH resource set according to the joint index; and determining one PUCCH resource from the determined subset according to the PUCCH resource indicator, wherein the PUCCH resource indicator indicates an index of the PUCCH resource in one subset;

method 2: determining P PUCCH resources from the target PUCCH resource set according to the PUCCH resource indicator, wherein one state of the PUCCH resource indicator corresponds to $$P = \left\lceil \frac{R_{PUCCH}}{K} \right\rceil \text{ or } \left\lfloor \frac{R_{PUCCH}}{K} \right\rfloor \text{ or } \frac{R_{PUCCH}}{K}$$

PUCCH resources, and determining one PUCCH resource from the P PUCCH resources according to the index of the target corresponding to the PUCCH, wherein $R_{PUCCH}$ is a quantity of PUCCH resources contained in the target PUCCH resource set, and K is a preset positive integer or a numerical value related to a quantity of bits of the PUCCH resource indicator;

or method 3: determining T PUCCH resources corresponding to K states of the PUCCH resource indicator according to the index of the target, wherein $$T = \left\lceil \frac{R_{PUCCH}}{N} \right\rceil \text{ or } \left\lfloor \frac{R_{PUCCH}}{N} \right\rfloor \text{ or } \frac{R_{PUCCH}}{N},$$

and determining one PUCCH resource from the T PUCCH resources according to the PUCCH resource indicator;

wherein, in a condition that the target is the sub-slot in which the PUCCH transmission is performed, N is a quantity of sub-slots contained in one slot; or in a condition that the target is the TRP corresponding to the PUCCH, N is a quantity of TRPs corresponding to a terminal; or in a condition that the target comprises the sub-slot in which the PUCCH transmission is performed and the TRP corresponding to the PUCCH, N is a product of a quantity of sub-slots contained in one slot and a quantity of TRPs corresponding to a terminal.

11. The apparatus according to claim 10, wherein in a condition that the method 1 is performed, the dividing the M PUCCH resources in the target PUCCH resource set into the N subsets, comprises one of the following manners:

Manner 1: the M PUCCH resources contained in the target PUCCH resource set are evenly divided into the N subsets, wherein M is an integer multiple of N;

Manner 2: a first or last subset comprises $$M - \left\lfloor \frac{M}{N} \right\rfloor$$

PUCCH resources, and remaining subsets comprise $$\left\lfloor \frac{M}{N} \right\rfloor$$

PUCCH resources; or

Manner 3: first (M mod N) or last (M mod N) subsets comprise $$\left\lceil \frac{M}{N} \right\rceil$$

PUCCH resources, and remaining subsets comprise $$\left\lfloor \frac{M}{N} \right\rfloor$$

PUCCH resources;

wherein in a condition that the method 2 is performed:
in a condition of P>N, a one-to-many relationship is between the index of the target and multiple PUCCH resources in the P PUCCH resources, and the processor is configured to call the program instruction stored in the memory to determine one PUCCH resource from the one-to-many relationship according to an index of a control channel element (CCE) of a PDCCH carrying the PUCCH resource indicator; or in a condition of P=N, a one-to-one relationship is between the index of the target and one PUCCH resource in the P PUCCH resources, determining one PUCCH resource corresponding to the index of the target according to the one-to-one relationship; or in a condition of P<N, multiple indexes of multiple targets corresponding to a plurality of PUCCHs correspond to one PUCCH resource in the P PUCCH resources, and the processor is configured to call the program instruction stored in the memory to determine, according to an index of one of the targets and N, a correspondence relationship between the multiple indexes of the multiple targets and one PUCCH resource of the P PUCCH resources;

wherein, in a condition that the target is the sub-slot in which the PUCCH transmission is performed, N is a quantity of sub-slots contained in one slot; or in a condition that the target is the TRP corresponding to the PUCCH, N is a quantity of TRPs corresponding to a terminal; or in a condition that the target is the sub-slot in which the PUCCH transmission is performed and the TRP corresponding to the PUCCH, N is a product of a quantity of sub-slots contained in one slot and a quantity of TRPs corresponding to a terminal;

in a condition that the method 3 is performed:
in a condition of T>K, the processor is configured to call the program instruction stored in the memory to determine, according to an index of a control channel element (CCE) of a PDCCH carrying the PUCCH resource indicator, one PUCCH resource corresponding to the index of the CCE from the T PUCCH resources; or in a condition of T=K, a one-to-one relationship is between the K states of the PUCCH resource indicator and the T PUCCH resources, and the processor is configured to call the program instruction stored in the memory to determine one PUCCH resource according to the one-to-one relationship; or in a condition of T<K, some of the K states of the PUCCH resource indicator are reserved and a one-to-one relationship is between T states of the K states and the T PUCCH resources, and the processor is configured to call the program instruction stored in the memory to determine one PUCCH resource according to the one-to-one relationship.

12. The apparatus according to claim 11, in a condition that the method 2 is performed an index of the finally determined PUCCH resource in the target PUCCH resource set is calculated according to one of the following formulas:

$$r_{PUCCH} = \begin{cases} \left\lfloor \dfrac{n_{index} \cdot \lceil R_{PUCCH}/K \rceil}{N} \right\rfloor + \Delta_{PRI} \cdot \left\lceil \dfrac{R_{PUCCH}}{K} \right\rceil & \text{if } \Delta_{PRI} < R_{PUCCH} \bmod K \\ \left\lfloor \dfrac{n_{index} \cdot \lceil R_{PUCCH}/K \rceil}{N} \right\rfloor + \Delta_{PRI} \cdot \left\lfloor \dfrac{R_{PUCCH}}{K} \right\rfloor + R_{PUCCH} \bmod K & \text{if } \Delta_{PRI} \geq R_{PUCCH} \bmod K \end{cases} \quad \text{Formula 1}$$

$$r_{PUCCH} = \left\lfloor \dfrac{n_{index} \cdot \lfloor R_{PUCCH}/K \rfloor}{N} \right\rfloor + \Delta_{PRI} \cdot \left\lfloor \dfrac{R_{PUCCH}}{K} \right\rfloor \quad \text{Formula 2}$$

$$r_{PUCCH} = \left\lfloor \dfrac{n_{index} \cdot R_{PUCCH}/K}{N} \right\rfloor + \Delta_{PRI} \cdot \dfrac{R_{PUCCH}}{K} \quad \text{or} \quad \text{Formula 3}$$

when $\Delta_{PRI} < R_{PUCCH} \bmod K$ and $\left\lceil \dfrac{R_{PUCCH}}{K} \right\rceil > N$, Formula 4

$$r_{PUCCH} = \begin{cases} \left\lfloor \dfrac{n_{index} \cdot \lceil R_{PUCCH}/K \rceil}{N} \right\rfloor + \\ \left\lfloor \dfrac{n_{CCE,p} \cdot \lceil \lceil R_{PUCCH}/K \rceil / N \rceil}{N_{CCE,p}} \right\rfloor + \Delta_{PRI} \cdot \left\lceil \dfrac{R_{PUCCH}}{K} \right\rceil & \text{if } n_{index} < \left\lceil \dfrac{R_{PUCCH}}{K} \right\rceil \bmod N \\ \left\lfloor \dfrac{n_{index} \cdot \lceil R_{PUCCH}/K \rceil}{N} \right\rfloor + \\ \left\lfloor \dfrac{n_{CCE,p} \cdot \lfloor \lceil R_{PUCCH}/K \rceil / N \rfloor}{N_{CCE,p}} \right\rfloor + \Delta_{PRI} \cdot \left\lceil \dfrac{R_{PUCCH}}{K} \right\rceil + \left\lceil \dfrac{R_{PUCCH}}{K} \right\rceil \bmod N & \text{if } n_{index} < \left\lceil \dfrac{R_{PUCCH}}{K} \right\rceil \bmod N \end{cases}$$

when $\Delta_{PRI} < R_{PUCCH} \bmod K$ and $\left\lceil \dfrac{R_{PUCCH}}{K} \right\rceil \leq N$, $$r_{PUCCH} = \left\lfloor \dfrac{n_{index} \cdot \lceil R_{PUCCH}/K \rceil}{N} \right\rfloor + \Delta_{PRI} \cdot \left\lceil \dfrac{R_{PUCCH}}{K} \right\rceil$$

when $\Delta_{PRI} \geq R_{PUCCH} \bmod K$ and $\left\lfloor \dfrac{R_{PUCCH}}{K} \right\rfloor > N$, $$r_{PUCCH} = \begin{cases} \left\lfloor \dfrac{n_{index} \cdot \lfloor R_{PUCCH}/K \rfloor}{N} \right\rfloor + \\ \left\lfloor \dfrac{n_{CCE,p} \cdot \lceil \lfloor R_{PUCCH}/K \rfloor / N \rceil}{N_{CCE,p}} \right\rfloor + \Delta_{PRI} \cdot \left\lfloor \dfrac{R_{PUCCH}}{K} \right\rfloor & \text{if } n_{index} < \left\lfloor \dfrac{R_{PUCCH}}{K} \right\rfloor \bmod N \\ \left\lfloor \dfrac{n_{index} \cdot \lfloor R_{PUCCH}/K \rfloor}{N} \right\rfloor + \left\lfloor \dfrac{n_{CCE,p} \cdot \lfloor \lfloor R_{PUCCH}/K \rfloor / N \rfloor}{N_{CCE,p}} \right\rfloor + \\ \Delta_{PRI} \cdot \left\lfloor \dfrac{R_{PUCCH}}{K} \right\rfloor + \left\lfloor \dfrac{R_{PUCCH}}{K} \right\rfloor \bmod N + R_{PUCCH} \bmod K & \text{if } n_{index} \geq \left\lfloor \dfrac{R_{PUCCH}}{K} \right\rfloor \bmod N \end{cases}$$

and when $\Delta_{PRI} \geq R_{PUCCH} \bmod K$ and $\left\lfloor \dfrac{R_{PUCCH}}{K} \right\rfloor \leq N$, $$r_{PUCCH} = \left\lfloor \dfrac{n_{index} \cdot \lfloor R_{PUCCH}/K \rfloor}{N} \right\rfloor + \Delta_{PRI} \cdot \left\lfloor \dfrac{R_{PUCCH}}{K} \right\rfloor + R_{PUCCH} \bmod K;$$

wherein, $r_{PUCCH}$ is an index of each PUCCH resource in the target PUCCH resource set, $\Delta_{PRI}$ is a value of the PUCCH resource indicator, a range of the value is 0 to K−1, in a condition that the target is the sub-slot in which the PUCCH transmission is performed, $n_{index}$ is an index of each sub-slot in one slot, or in a condition that the target is the TRP corresponding to the PUCCH, $n_{index}$ is an index of each TRP in the N TRPs corresponding to the terminal, or in a condition that the target comprises the sub-slot in which the PUCCH transmission is performed and the TRP corresponding to the PUCCH, $n_{index}$ is a joint index of the sub-slots contained in one slot and the TRPs corresponding to the terminal;

wherein in a condition that the method 3 is performed an index of the finally determined PUCCH resource in the target PUCCH resource set is calculated according to one of the following formulas:

$$r_{PUCCH} = n_{index} \cdot A + \Delta_{PRI}, \quad \text{Formula 5}$$

wherein $A = K$ or $\dfrac{R_{PUCCH}}{N}$ or $\left\lceil \dfrac{R_{PUCCH}}{N} \right\rceil$ or $\left\lfloor \dfrac{R_{PUCCH}}{N} \right\rfloor$;

$$r_{PUCCH} = \begin{cases} n_{index} \cdot \left\lceil \dfrac{R_{PUCCH}}{N} \right\rceil + \Delta_{PRI} & \text{if } n_{index} < R_{PUCCH} \bmod N \\ n_{index} \cdot \left\lfloor \dfrac{R_{PUCCH}}{N} \right\rfloor + R_{PUCCH} \bmod N + \Delta_{PRI} & \text{if } n_{index} \geq R_{PUCCH} \bmod N \end{cases}; \quad \text{Formula 6}$$

or

-continued when $n_{index} < R_{PUCCH} \bmod N$ and $\left\lceil \frac{R_{PUCCH}}{N} \right\rceil > K$, Formula 7

$$r_{PUCCH} = \begin{cases} n_{index} \cdot \left\lceil \frac{R_{PUCCH}}{N} \right\rceil + \left\lceil \frac{n_{CCE,p} \cdot \lceil \lceil R_{PUCCH}/N \rceil / K \rceil}{N_{CCE,p}} \right\rceil + & \text{if } \Delta_{PRI} < \left\lceil \frac{R_{PUCCH}}{N} \right\rceil \bmod K \\ \Delta_{PRI} \cdot \lceil \lceil R_{PUCCH}/N \rceil / K \rceil & \\ n_{index} \cdot \left\lceil \frac{R_{PUCCH}}{N} \right\rceil + \left\lceil \frac{n_{CCE,p} \cdot \lfloor \lceil R_{PUCCH}/N \rceil / K \rfloor}{N_{CCE,p}} \right\rceil + & \text{if } \Delta_{PRI} \geq \left\lceil \frac{R_{PUCCH}}{N} \right\rceil \bmod K \\ \Delta_{PRI} \cdot \lfloor \lceil R_{PUCCH}/N \rceil / K \rfloor + \left\lceil \frac{R_{PUCCH}}{N} \right\rceil \bmod K & \end{cases};$$

when $n_{index} < R_{PUCCH} \bmod N$ and $\left\lceil \frac{R_{PUCCH}}{N} \right\rceil \leq K$, $$r_{PUCCH} = n_{index} \cdot \left\lceil \frac{R_{PUCCH}}{N} \right\rceil + \Delta_{PRI};$$

when $n_{index} \geq R_{PUCCH} \bmod N$ and $\left\lfloor \frac{R_{PUCCH}}{N} \right\rfloor > K$, $$r_{PUCCH} = \begin{cases} n_{index} \cdot \left\lfloor \frac{R_{PUCCH}}{N} \right\rfloor + R_{PUCCH} \bmod N + \\ \left\lceil \frac{n_{CCE,p} \cdot \lceil \lfloor R_{PUCCH}/N \rfloor / K \rceil}{N_{CCE,p}} \right\rceil + & \text{if } \Delta_{PRI} < \left\lfloor \frac{R_{PUCCH}}{N} \right\rfloor \bmod K \\ \Delta_{PRI} \cdot \lceil \lfloor R_{PUCCH}/N \rfloor / K \rceil & \\ n_{index} \cdot \left\lfloor \frac{R_{PUCCH}}{N} \right\rfloor + R_{PUCCH} \bmod N + \\ \left\lfloor \frac{n_{CCE,p} \cdot \lfloor \lfloor R_{PUCCH}/N \rfloor / K \rfloor}{N_{CCE,p}} \right\rfloor + & \text{if } \Delta_{PRI} \geq \left\lfloor \frac{R_{PUCCH}}{N} \right\rfloor \bmod K \\ \Delta_{PRI} \cdot \lfloor \lfloor R_{PUCCH}/N \rfloor / K \rfloor + \left\lfloor \frac{R_{PUCCH}}{N} \right\rfloor \bmod K & \end{cases};$$

and when $n_{index} \geq R_{PUCCH} \bmod N$ and $\left\lfloor \frac{R_{PUCCH}}{N} \right\rfloor \leq K$, $$r_{PUCCH} = n_{index} \cdot \left\lfloor \frac{R_{PUCCH}}{N} \right\rfloor + R_{PUCCH} \bmod N + \Delta_{PRI};$$

wherein, $r_{PUCCH}$ is an index of each PUCCH resource in the target PUCCH resource set, $0 \leq r_{PUCCH} \leq R_{PUCCH} - 1$, $R_{PUCCH}$ is a quantity of PUCCH resources contained in the target PUCCH resource set, $\Delta_{PRI}$ is a value of the PUCCH resource indicator, a vrange of the value is 0 to K−1, K is a preset positive integer value or a numerical value related to a quantity of bits of the PUCCH resource indicator; in a condition that the target is the sub-slot in which the PUCCH transmission is performed, $n_{index}$ is an index of each sub-slot in the one slot, or in a condition that the target is the TRP corresponding to the PUCCH, $n_{index}$ is an index of each TRP in the N TRPs corresponding to the terminal, or in a condition that the target is the sub-slot in which the PUCCH transmission is performed and the TRP corresponding to the PUCCH, $n_{index}$ is a joint index of the sub-slots contained in the one slot and the TRPs corresponding to the terminal.

13. The apparatus according to claim 9, wherein the PUCCH resource set is shared for a plurality of sub-slots in one slot or configured for each of a plurality of sub-slots in one slot; or, the PUCCH resource set is shared for a plurality of TRPs corresponding to a terminal or configured for each of a plurality of TRPs.

14. A resource determination apparatus, comprising:
a memory, configured to store a program instruction; and
a processor, configured to call the program instruction stored in the memory to:

receive configuration signaling;
obtain at least one physical uplink control channel (PUCCH) resource set according to the configuration signaling;
determine a target PUCCH resource set in the at least one PUCCH resource set; and
determine a PUCCH resource from the target PUCCH resource set according to an index of a target corresponding to a PUCCH and a PUCCH resource indicator, wherein the target is a sub-slot in which PUCCH transmission is performed and/or a transmission reception point (TRP) corresponding to the PUCCH, wherein the processor is further configured to call the program instruction stored in the memory to perform one of the following methods:
method 1: in a condition that the target is the sub-slot in which the PUCCH transmission is performed: dividing M PUCCH resources in the target PUCCH resource set into N subsets, wherein each of the subsets corresponds to one sub-slot in one slot, and N is a quantity of sub-slots contained in one slot; determining a subset, corresponding to the sub-slot, in the target PUCCH resource set according to an index of the sub-slot in which the PUCCH transmission is performed; and determining one PUCCH resource from the determined subset according to the PUCCH resource indicator, wherein the PUCCH resource indicator indicates an index of the PUCCH resource in one subset; or
in a condition that the target is the TRP corresponding to the PUCCH, dividing M PUCCH resources in the target PUCCH resource set into N subsets, wherein each of the subsets corresponds to one TRP in a plurality of TRPs, and N is a quantity of TRPs corresponding to a terminal; determining a subset, corresponding to the TRP, in the target PUCCH resource set according to an index of the TRP corresponding to the PUCCH; and determining one PUCCH resource from the determined subset according to the PUCCH resource indicator, wherein the PUCCH resource indicator indicates an index of the PUCCH resource in one subset; or in a condition that the target comprises the sub-slot in which the PUCCH transmission is performed and the TRP corresponding to the PUCCH, dividing M PUCCH resources in the target PUCCH resource set into N1*N2 subsets, wherein each of the subsets corresponds to one sub-slot in one slot and one TRP, N1 is a quantity of sub-slots contained in one slot, and N2 is a quantity of TRPs corresponding to a terminal; determining one joint index according to an index of the sub-slot in which the PUCCH transmission is performed and an index of the TRP corresponding to the PUCCH; determining a subset, corresponding to the TRP and the sub-slot, in the target PUCCH resource set according to the joint index; and determining one PUCCH resource from the determined subset according to the PUCCH resource indicator, wherein the PUCCH resource indicator indicates an index of the PUCCH resource in one subset;

method 2: determining P PUCCH resources from the target PUCCH resource set according to the PUCCH resource indicator, wherein one state of the PUCCH resource indicator corresponds to $$P = \left\lceil \frac{R_{PUCCH}}{K} \right\rceil \text{ or } \left\lfloor \frac{R_{PUCCH}}{K} \right\rfloor \text{ or } \frac{R_{PUCCH}}{K}$$

PUCCH resources, and determining one PUCCH resource from the P PUCCH resources according to the index of the target corresponding to the PUCCH, wherein $R_{PUCCH}$ is a quantity of PUCCH resources contained in the target PUCCH resource set, and K is a preset positive integer or a numerical value related to a quantity of bits of the PUCCH resource indicator;

or method 3: determining T PUCCH resources corresponding to K states of the PUCCH resource indicator according to the index of the target, wherein $$T = \left\lceil \frac{R_{PUCCH}}{N} \right\rceil \text{ or } \left\lfloor \frac{R_{PUCCH}}{N} \right\rfloor \text{ or } \frac{R_{PUCCH}}{N},$$

and determining one PUCCH resource from the T PUCCH resources according to the PUCCH resource indicator;

wherein, in a condition that the target is the sub-slot in which the PUCCH transmission is performed, N is a quantity of sub-slots contained in one slot; or in a condition that the target is the TRP corresponding to the PUCCH, N is a quantity of TRPs corresponding to a terminal; or in a condition that the target comprises the sub-slot in which the PUCCH transmission is performed and the TRP corresponding to the PUCCH, N is a product of a quantity of sub-slots contained in one slot and a quantity of TRPs corresponding to a terminal.

15. The apparatus according to claim 14, wherein in a condition that the method 1 is performed, the dividing the M PUCCH resources in the target PUCCH resource set into the N subsets, comprises one of the following manners:

Manner 1: the M PUCCH resources contained in the target PUCCH resource set are evenly divided into the N subsets, wherein M is an integer multiple of N;

Manner 2: a first or last subset comprises $$M - \left\lfloor \frac{M}{N} \right\rfloor$$

PUCCH resources, and remaining subsets comprise $$\left\lfloor \frac{M}{N} \right\rfloor$$

PUCCH resources; or

Manner 3: first (M mod N) or last (M mod N) subsets comprise $$\left\lceil \frac{M}{N} \right\rceil$$

PUCCH resources, and remaining subsets comprise $$\left\lfloor \frac{M}{N} \right\rfloor$$

PUCCH resources;

wherein in a condition that the method 2 is performed:

in a condition of P>N, a one-to-many relationship is between the index of the target and multiple PUCCH resources in the P PUCCH resources, and the processor is further configured to call the program instruction stored in the memory to determine one PUCCH resource from the one-to-many relationship according to an index of a control channel element (CCE) of a PDCCH carrying the PUCCH resource indicator; or in a condition of P=N, a one-to-one relationship is between the index of the target and one PUCCH resource in the P PUCCH resources, and the processor is further configured to call the program instruction stored in the memory to determine one PUCCH resource corresponding to the index of the target according to the one-to-one relationship; or in a condition of P<N, multiple indexes of multiple targets corresponding to a plurality of PUCCHs correspond to one PUCCH resource in the P PUCCH resources, and the processor is further configured to call the program instruction stored in the memory to determine, according to an index of one of the targets and N, a correspondence relationship between the multiple indexes of the multiple targets and one PUCCH resource of the P PUCCH resources;

wherein, in a condition that the target is the sub-slot in which the PUCCH transmission is performed, N is a quantity of sub-slots contained in one slot; or in a condition that the target is the TRP corresponding to the PUCCH, N is a quantity of TRPs corresponding to a terminal; or in a condition that the target is the sub-slot in which the PUCCH transmission is performed and the TRP corresponding to the PUCCH, N is a product of a quantity of sub-slots contained in one slot and a quantity of TRPs corresponding to a terminal;

wherein in a condition that the method 3 is performed:
in a condition of T>K, and the processor is further configured to call the program instruction stored in the memory to determine, according to an index of a control channel element (CCE) of a PDCCH carrying the PUCCH resource indicator, one PUCCH resource corresponding to the index of the CCE from the T PUCCH resources; or in a condition of T=K, a one-to-one relationship is between the K states of the PUCCH resource indicator and the T PUCCH resources, and the processor is further configured to call the program instruction stored in the memory to determine one PUCCH resource according to the one-to-one relationship; or in a condition of T<K, some of the K states of the PUCCH resource indicator are reserved and a one-to-one relationship is between T states of the K states and the T PUCCH resources, and the processor is further configured to call the program instruction stored in the memory to determine one PUCCH resource according to the one-to-one relationship.

16. The apparatus according to claim 15, wherein in a condition that the method 2 is performed, an index of the finally determined PUCCH resource in the target PUCCH resource set is calculated according to one of the following formulas:

$$r_{PUCCH} = \begin{cases} \left\lfloor \frac{n_{index} \cdot \lceil R_{PUCCH}/K \rceil}{N} \right\rfloor + \Delta_{PRI} \cdot \left\lceil \frac{R_{PUCCH}}{K} \right\rceil & \text{if } \Delta_{PRI} < R_{PUCCH} \bmod K \\ \left\lfloor \frac{n_{index} \cdot \lfloor R_{PUCCH}/K \rfloor}{N} \right\rfloor + \Delta_{PRI} \cdot \left\lfloor \frac{R_{PUCCH}}{K} \right\rfloor + R_{PUCCH} \bmod K & \text{if } \Delta_{PRI} \geq R_{PUCCH} \bmod K \end{cases};$$

Formula 1

$$r_{PUCCH} = \left\lfloor \frac{n_{index} \cdot \lfloor R_{PUCCH}/K \rfloor}{N} \right\rfloor + \Delta_{PRI} \cdot \left\lfloor \frac{R_{PUCCH}}{K} \right\rfloor;$$

Formula 2

$$r_{PUCCH} = \left\lfloor \frac{n_{index} \cdot R_{PUCCH}/K}{N} \right\rfloor + \Delta_{PRI} \cdot \frac{R_{PUCCH}}{K}; \text{ or,}$$

Formula 3 when $\Delta_{PRI} < R_{PUCCH} \bmod K$ and $\left\lceil \frac{R_{PUCCH}}{K} \right\rceil > N$, Formula 4

$$r_{PUCCH} = \begin{cases} \left\lfloor \frac{n_{index} \cdot \lceil R_{PUCCH}/K \rceil}{N} \right\rfloor + \\ \left\lfloor \frac{n_{CCE_p} \cdot \lceil \lceil R_{PUCCH}/K \rceil /N \rceil}{N_{CCE,p}} \right\rfloor + \Delta_{PRI} \cdot \left\lceil \frac{R_{PUCCH}}{K} \right\rceil & \text{if } n_{index} < \left\lceil \frac{R_{PUCCH}}{K} \right\rceil \bmod N \\ \left\lfloor \frac{n_{index} \cdot \lceil R_{PUCCH}/K \rceil}{N} \right\rfloor + \\ \left\lfloor \frac{n_{CCE_p} \cdot \lfloor \lceil R_{PUCCH}/K \rceil /N \rfloor}{N_{CCE,p}} \right\rfloor + \Delta_{PRI} \cdot \left\lceil \frac{R_{PUCCH}}{K} \right\rceil + \left\lceil \frac{R_{PUCCH}}{K} \right\rceil \bmod N & \text{if } n_{index} \geq \left\lceil \frac{R_{PUCCH}}{K} \right\rceil \bmod N \end{cases};$$

when $\Delta_{PRI} < R_{PUCCH} \bmod K$ and $\left\lceil \frac{R_{PUCCH}}{K} \right\rceil \leq N$, $$r_{PUCCH} = \left\lfloor \frac{n_{index} \cdot \lceil R_{PUCCH}/K \rceil}{N} \right\rfloor + \Delta_{PRI} \cdot \left\lceil \frac{R_{PUCCH}}{K} \right\rceil;$$

when $\Delta_{PRI} \geq R_{PUCCH} \bmod K$ and $\left\lfloor \frac{R_{PUCCH}}{K} \right\rfloor > N$, $$r_{PUCCH} = \begin{cases} \left\lfloor \frac{n_{index} \cdot \lfloor R_{PUCCH}/K \rfloor}{N} \right\rfloor + \\ \left\lfloor \frac{n_{CCE_p} \cdot \lceil \lfloor R_{PUCCH}/K \rfloor /N \rceil}{N_{CCE,p}} \right\rfloor + \Delta_{PRI} \cdot \left\lfloor \frac{R_{PUCCH}}{K} \right\rfloor & \text{if } n_{index} < \left\lfloor \frac{R_{PUCCH}}{K} \right\rfloor \bmod N \\ \left\lfloor \frac{n_{index} \cdot \lfloor R_{PUCCH}/K \rfloor}{N} \right\rfloor + \left\lfloor \frac{n_{CCE_p} \cdot \lfloor \lfloor R_{PUCCH}/K \rfloor /N \rfloor}{N_{CCE,p}} \right\rfloor + \\ \Delta_{PRI} \cdot \left\lfloor \frac{R_{PUCCH}}{K} \right\rfloor + \left\lfloor \frac{R_{PUCCH}}{K} \right\rfloor \bmod N + R_{PUCCH} \bmod K & \text{if } n_{index} \geq \left\lfloor \frac{R_{PUCCH}}{K} \right\rfloor \bmod N \end{cases};$$

or when $\Delta_{PRI} \geq R_{PUCCH} \bmod K$ and $\left\lfloor \frac{R_{PUCCH}}{K} \right\rfloor \leq N$, $$r_{PUCCH} = \left\lfloor \frac{n_{index} \cdot \lfloor R_{PUCCH}/K \rfloor}{N} \right\rfloor + \Delta_{PRI} \cdot \left\lfloor \frac{R_{PUCCH}}{K} \right\rfloor + R_{PUCCH} \bmod K;$$

wherein, $r_{PUCCH}$ is an index of each PUCCH resource in the target PUCCH resource set, $\Delta_{PRI}$ is a value of the PUCCH resource indicator, a range of the value is 0 to K−1, in a condition that the target is the sub-slot in which the PUCCH transmission is performed, $n_{index}$ is an index of each sub-slot in one slot, or in a condition that the target is the TRP corresponding to the PUCCH, $n_{index}$ is an index of each TRP in the N TRPs corresponding to the terminal, or in a condition that the target comprises the sub-slot in which the PUCCH transmission is performed and the TRP corresponding to the PUCCH, $n_{index}$ is a joint index of the sub-slots contained in one slot and the TRPs corresponding to the terminal;

wherein in a condition that the method 3 is performed, an index of the finally determined PUCCH resource in the target PUCCH resource set is calculated according to one of the following formulas:

$$r_{PUCCH} = n_{index} \cdot A + \Delta_{PRI}, \quad \text{Formula 5}$$

wherein $A = K$ or $\dfrac{R_{PUCCH}}{N}$ or $\left\lceil \dfrac{R_{PUCCH}}{N} \right\rceil$ or $\left\lfloor \dfrac{R_{PUCCH}}{N} \right\rfloor$;

$$r_{PUCCH} = \begin{cases} n_{index} \cdot \left\lceil \dfrac{R_{PUCCH}}{N} \right\rceil + \Delta_{PRI} & \text{if } n_{index} < R_{PUCCH} \bmod N \\ n_{index} \cdot \left\lfloor \dfrac{R_{PUCCH}}{N} \right\rfloor + R_{PUCCH} \bmod N + \Delta_{PRI} & \text{if } n_{index} \geq R_{PUCCH} \bmod N \end{cases}; \text{ or,} \quad \text{Formula 6}$$

when $n_{index} < R_{PUCCH} \bmod N$ and $\left\lceil \dfrac{R_{PUCCH}}{N} \right\rceil > K$, Formula 7

$$r_{PUCCH} = \begin{cases} n_{index} \cdot \left\lceil \dfrac{R_{PUCCH}}{N} \right\rceil + \left\lfloor \dfrac{n_{CCE_p} \cdot \lceil \lceil R_{PUCCH}/N \rceil / K \rceil}{N_{CCE,p}} \right\rfloor + & \text{if } \Delta_{PRI} < \left\lceil \dfrac{R_{PUCCH}}{N} \right\rceil \bmod K \\ \Delta_{PRI} \cdot \lceil \lceil R_{PUCCH}/N \rceil / K \rceil & \\ n_{index} \cdot \left\lceil \dfrac{R_{PUCCH}}{N} \right\rceil + \left\lfloor \dfrac{n_{CCE_p} \cdot \lfloor \lceil R_{PUCCH}/N \rceil / K \rfloor}{N_{CCE,p}} \right\rfloor + & \text{if } \Delta_{PRI} \geq \left\lceil \dfrac{R_{PUCCH}}{N} \right\rceil \bmod K \\ \Delta_{PRI} \cdot \lfloor \lceil R_{PUCCH}/N \rceil / K \rfloor + \left\lceil \dfrac{R_{PUCCH}}{N} \right\rceil \bmod K & \end{cases};$$

when $n_{index} < R_{PUCCH} \bmod N$ and $\left\lceil \dfrac{R_{PUCCH}}{N} \right\rceil \leq K$, $$r_{PUCCH} = n_{index} \cdot \left\lceil \dfrac{R_{PUCCH}}{N} \right\rceil + \Delta_{PRI};$$

when $n_{index} \geq R_{PUCCH} \bmod N$ and $\left\lfloor \dfrac{R_{PUCCH}}{N} \right\rfloor > K$, $$r_{PUCCH} = \begin{cases} n_{index} \cdot \left\lfloor \dfrac{R_{PUCCH}}{N} \right\rfloor + R_{PUCCH} \bmod N + & \\ \left\lfloor \dfrac{n_{CCE_p} \cdot \lceil \lfloor R_{PUCCH}/N \rfloor / K \rceil}{N_{CCE,p}} \right\rfloor + & \text{if } \Delta_{PRI} < \left\lfloor \dfrac{R_{PUCCH}}{N} \right\rfloor \bmod K \\ \Delta_{PRI} \cdot \lceil \lfloor R_{PUCCH}/N \rfloor / K \rceil & \\ n_{index} \cdot \left\lfloor \dfrac{R_{PUCCH}}{N} \right\rfloor + R_{PUCCH} \bmod N + & \\ \left\lfloor \dfrac{n_{CCE_p} \cdot \lfloor \lfloor R_{PUCCH}/N \rfloor / K \rfloor}{N_{CCE,p}} \right\rfloor + & \text{if } \Delta_{PRI} \geq \left\lfloor \dfrac{R_{PUCCH}}{N} \right\rfloor \bmod K \\ \Delta_{PRI} \cdot \lfloor \lfloor R_{PUCCH}/N \rfloor / K \rfloor + \left\lfloor \dfrac{R_{PUCCH}}{N} \right\rfloor \bmod K & \end{cases};$$

and when $n_{index} \geq R_{PUCCH} \bmod N$ and $\left\lfloor \dfrac{R_{PUCCH}}{N} \right\rfloor \leq K$, $$r_{PUCCH} = n_{index} \cdot \left\lfloor \dfrac{R_{PUCCH}}{N} \right\rfloor + R_{PUCCH} \bmod N + \Delta_{PRI};$$

wherein, $r_{PUCCH}$ is an index of each PUCCH resource in the target PUCCH resource set, $0 \leq r_{PUCCH} \leq R_{PUCCH} - 1$, $R_{PUCCH}$ is a quantity of PUCCH resources contained in the target PUCCH resource set, $\Delta_{PRI}$ is a value of the PUCCH resource indicator, a vrange of the value is 0 to K−1, K is a preset positive integer value or a numerical value related to a quantity of bits of the PUCCH resource indicator; in a condition that the target is the sub-slot in which the PUCCH transmission is performed, $n_{index}$ is an index of each sub-slot in the one slot, or in a condition that the target is the TRP corresponding to the PUCCH, $n_{index}$ is an index of each TRP in the N TRPs corresponding to the terminal, or in a condition that the target is the sub-slot in which the PUCCH transmission is performed and the TRP corresponding to the PUCCH, $n_{index}$ is a joint index of the sub-slots contained in the one slot and the TRPs corresponding to the terminal.

17. The apparatus according to claim 14, wherein the PUCCH resource set is shared for a plurality of sub-slots in one slot or configured for each of a plurality of sub-slots in one slot; or, the PUCCH resource set is shared for a plurality of TRPs corresponding to a terminal or configured for each of a plurality of TRPs.

* * * * *